(12) United States Patent
Hill et al.

(10) Patent No.: US 10,995,034 B2
(45) Date of Patent: *May 4, 2021

(54) COMPOSITE HEXAGONAL FERRITE MATERIALS

(71) Applicant: Skyworks Solutions, Inc., Irvine, CA (US)

(72) Inventors: Michael David Hill, Frederick, MD (US); Srinivas Polisetty, Frederick, MD (US); Constance M. Griffith, Harpers Ferry, WV (US)

(73) Assignee: Skyworks Solutions, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/795,943

(22) Filed: Feb. 20, 2020

(65) Prior Publication Data

US 2020/0325074 A1 Oct. 15, 2020

Related U.S. Application Data

(63) Continuation of application No. 15/683,500, filed on Aug. 22, 2017, now Pat. No. 10,604,450.

(60) Provisional application No. 62/380,225, filed on Aug. 26, 2016.

(51) Int. Cl.
| | | |
|---|---|---|
| H01F 1/34 | (2006.01) |
| H01F 1/11 | (2006.01) |
| C01G 51/00 | (2006.01) |
| C01F 11/00 | (2006.01) |
| C04B 35/26 | (2006.01) |
| H01Q 7/06 | (2006.01) |
| C01F 17/30 | (2020.01) |
| C01F 7/02 | (2006.01) |
| C01B 33/20 | (2006.01) |

(52) U.S. Cl.
CPC .......... C04B 35/2683 (2013.01); C01F 11/00 (2013.01); C01F 17/30 (2020.01); C01G 51/68 (2013.01); C04B 35/2633 (2013.01); H01F 1/11 (2013.01); C01B 33/20 (2013.01); C01F 7/02 (2013.01); C01P 2002/77 (2013.01); C01P 2004/82 (2013.01); C01P 2006/42 (2013.01); C04B 2235/3274 (2013.01); C04B 2235/767 (2013.01)

(58) Field of Classification Search
CPC ......... H01F 1/348; H01F 1/11; C01G 51/006; C01G 51/68; C01G 49/009; C04B 35/26; C04B 35/2633; C04B 2235/767; C01F 11/00; C01F 7/02; C01P 2006/42; C01P 2002/52; H01Q 7/06
USPC ............ 252/62.6, 62.57, 62.58, 62.62, 62.63
See application file for complete search history.

(56) References Cited

U.S. PATENT DOCUMENTS

| | | |
|---|---|---|
| 8,524,190 B2 | 9/2013 | Hill |
| 10,032,547 B2 | 7/2018 | Hill |
| 10,049,796 B2 | 8/2018 | Hill |

(Continued)

*Primary Examiner* — Matthew E. Hoban
*Assistant Examiner* — Lynne Edmondson
(74) *Attorney, Agent, or Firm* — Knobbe, Martens, Olson & Bear, LLP

(57) ABSTRACT

Disclosed herein are embodiments of composite hexagonal ferrite materials formed from a combination of Y phase and Z phase hexagonal ferrite materials. Advantageously, embodiments of the material can have a high resonant frequency as well as a high permeability. In some embodiments, the materials can be useful for magnetodielectric antennas.

20 Claims, 42 Drawing Sheets

(56) References Cited

U.S. PATENT DOCUMENTS

| | | |
|---|---|---|
| 10,276,287 B2 | 4/2019 | Hill |
| 10,604,450 B2 * | 3/2020 | Hill .................. C04B 35/64 423/594.2 |
| 2010/0156733 A1 | 6/2010 | Kato |
| 2013/0115160 A1 | 5/2013 | Hill |

* cited by examiner

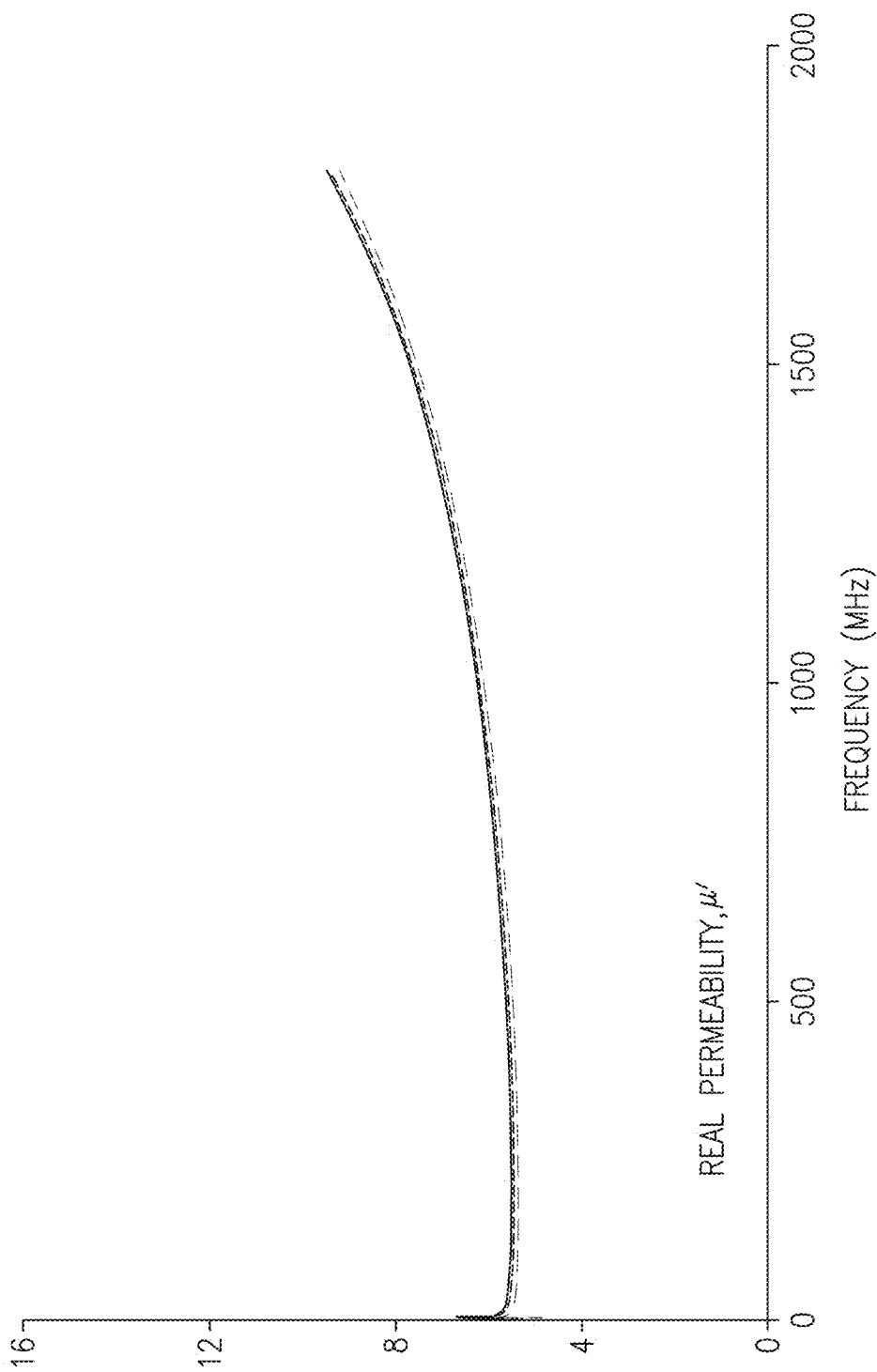

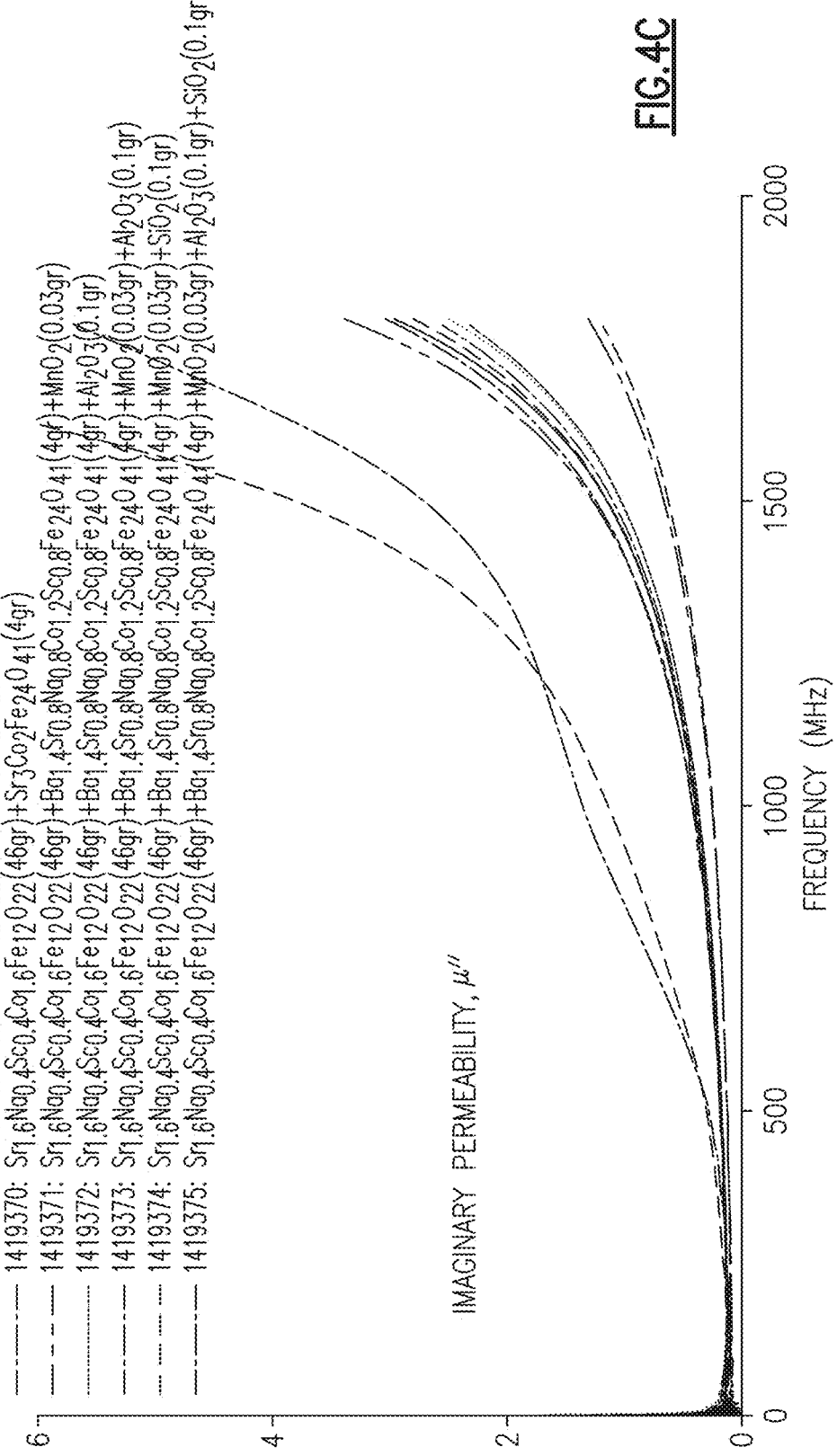

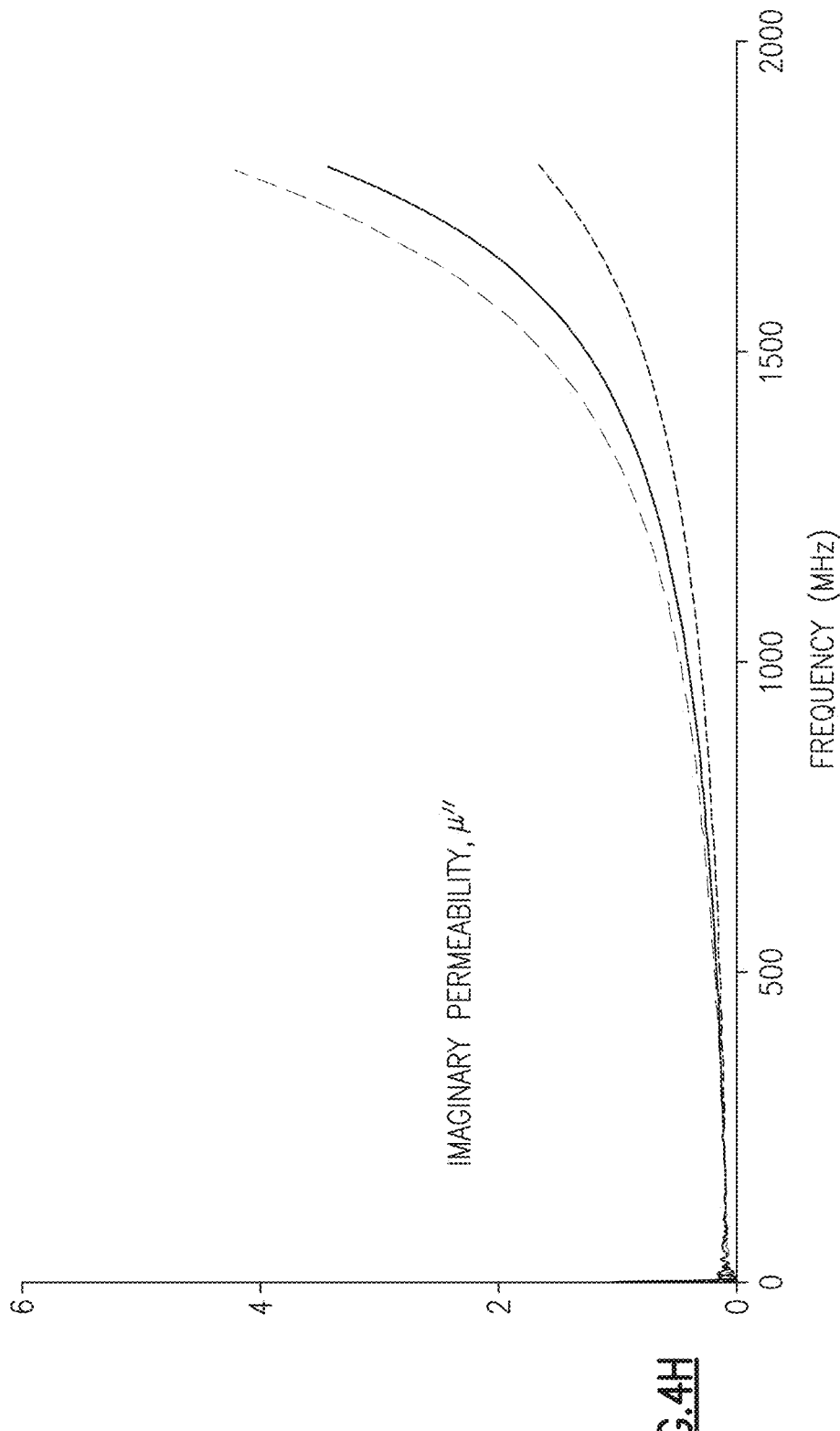

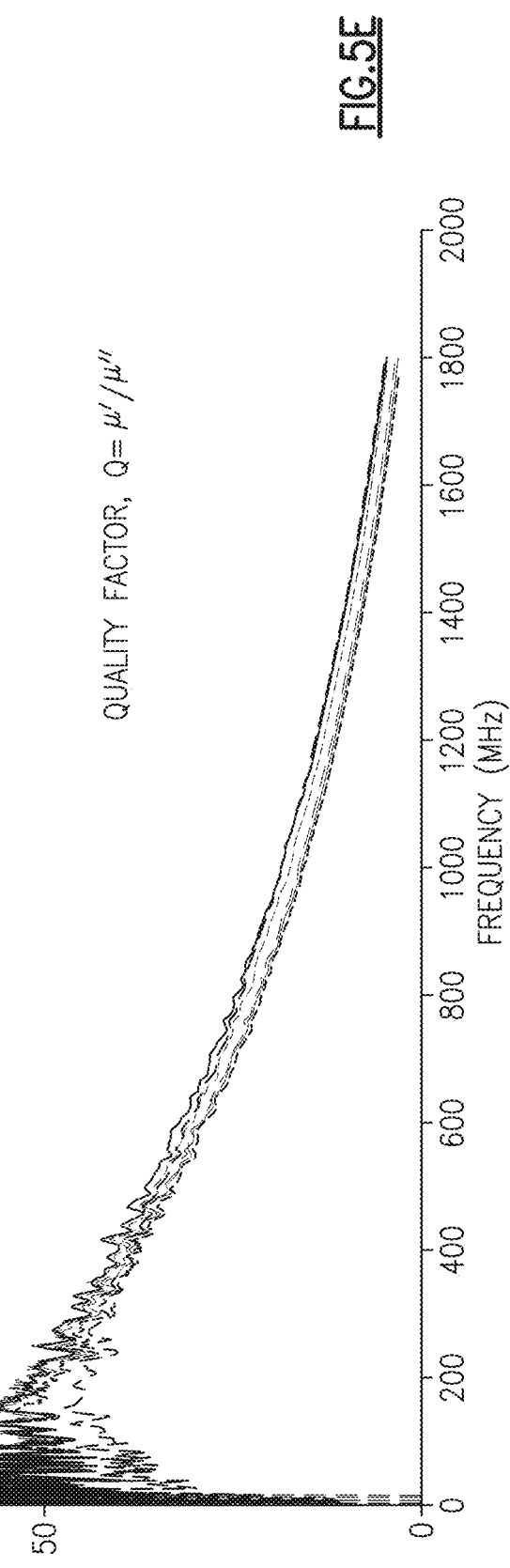

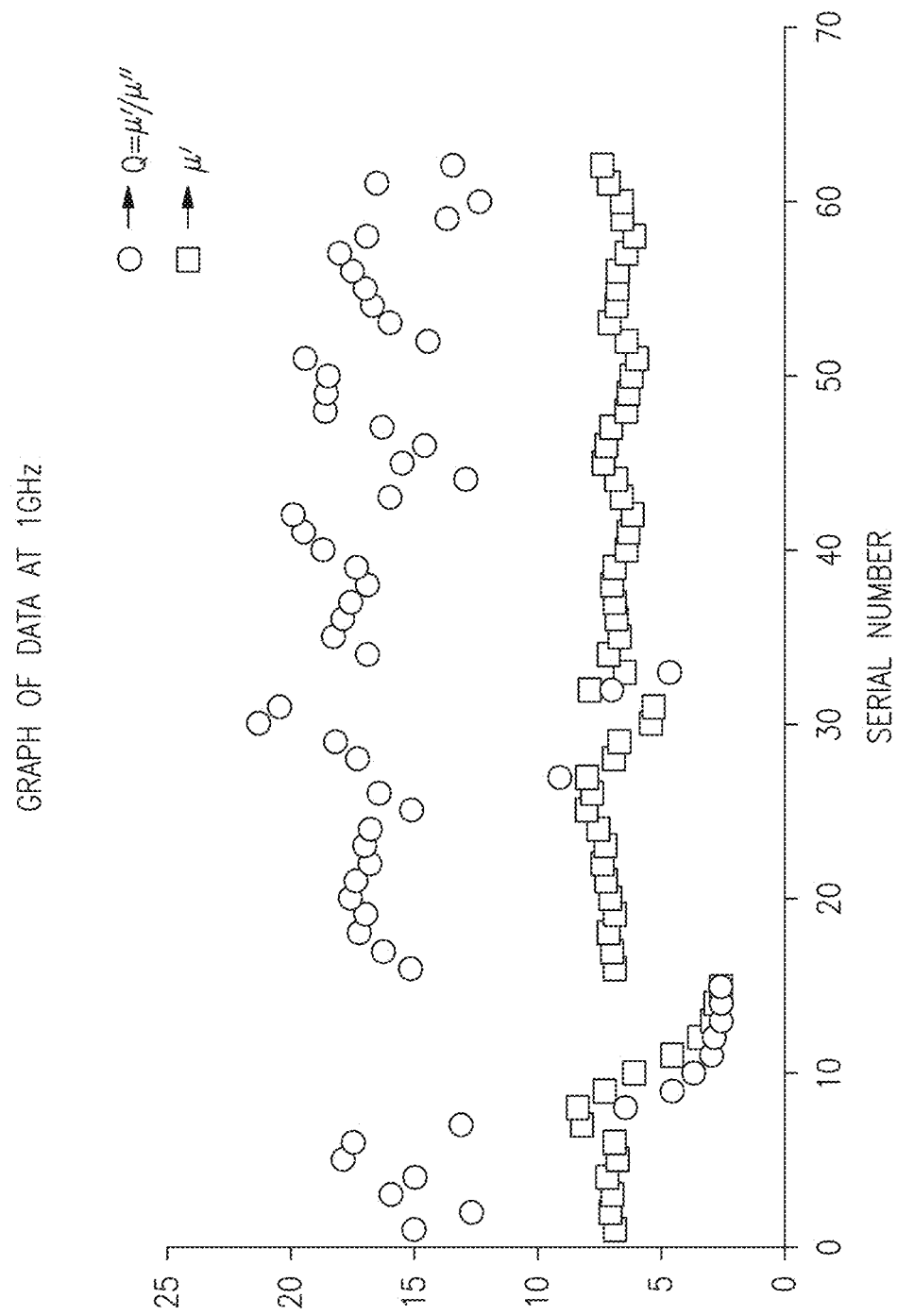

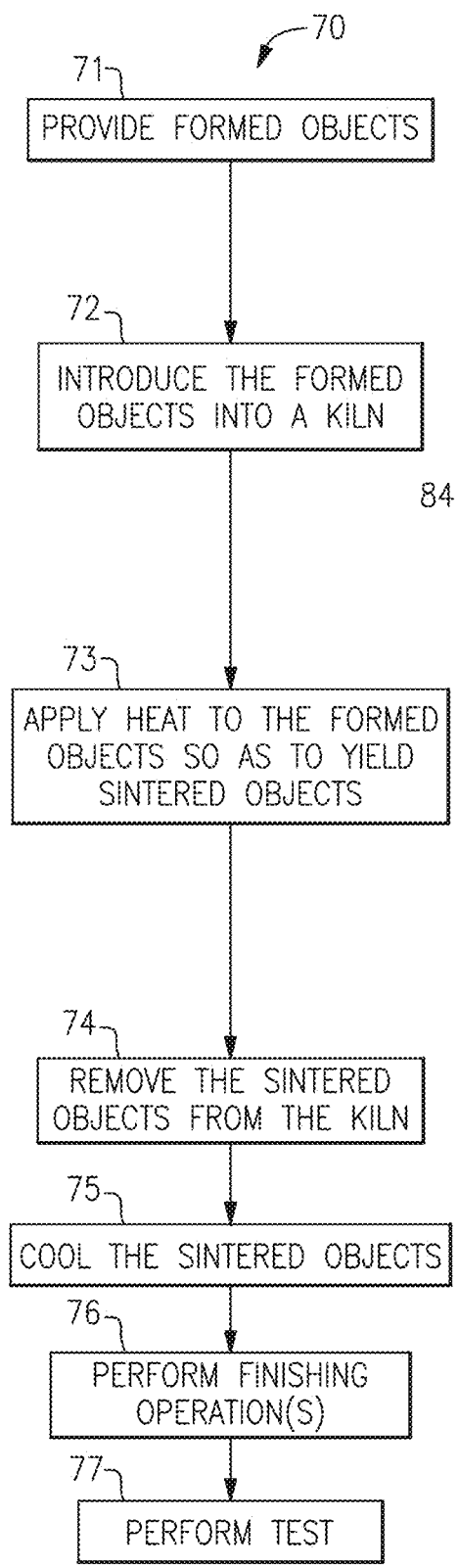

COMPOSITE HEXAGONAL FERRITE MATERIALS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the disclosure relate to methods of preparing compositions and materials useful in electronic applications, and in particular, useful in radio frequency (RF) electronics and antennas.

SUMMARY

Disclosed herein are embodiments of a composite hexagonal ferrite material, the material comprising a base y-phase hexagonal ferrite composition having a formula $Sr_{2-x}Na_xCo_{2-x}Sc_xFe_{12}O_{22}$, and a doped-in z-phase hexagonal ferrite composition to form the composite hexagonal ferrite material, the composite hexagonal ferrite material having a Q value of greater than about 15 at 1 GHz.

In some embodiments, the material can have a Q value of greater than about 20 at 1 GHz. In some embodiments, the material can have a real permeability of between 3 and 7 at 1 GHz. In some embodiments, the material can have a real permeability of greater than 6.

In some embodiments, the z-phase hexagonal ferrite composition can comprise $Ba_{1.4}Sr_{0.8}Na_{0.8}Co_{1.2}Sc_{0.8}Fe_{24}O_{41}$. In some embodiments, the y-phase hexagonal ferrite composition can comprise $Sr_{1.6}Na_{0.4}Sc_{0.4}Co_{1.6}Fe_{12}O_{22}$. In some embodiments, the composite hexagonal ferrite material can further include $Ba_3Co_2Fe_{24}O_{41}$, $Sr_3Co_2Fe_{24}O_{41}$, $MnO_2$, $Al_2O_3$, or $SiO_2$.

Also disclosed herein are embodiments of a method of forming a composite hexagonal ferrite material the method comprising combing a y-phase hexagonal ferrite composition having a formula $Sr_{2-x}Na_xCo_{2-x}Sc_xFe_{12}O_{22}$ at least partially with a z-phase hexagonal ferrite composition, thereby forming a composite hexagonal ferrite material having a Q value of greater than about 15 at 1 GHz.

In some embodiments, the method can further include doping the material with indium or zirconium to reduce strontium levels.

In some embodiments, the composite hexagonal ferrite material can have a Q value of greater than about 20 at 1 GHz. In some embodiments, the composite hexagonal ferrite material can have a real permeability of between 3 and 7 at 1 GHz.

In some embodiments, the z-phase hexagonal ferrite composition can comprise $Ba_{1.4}Sr_{0.8}Na_{0.8}Co_{1.2}Sc_{0.8}Fe_{24}O_{41}$. In some embodiments, the y-phase hexagonal ferrite composition can comprise $Sr_{1.6}Na_{0.4}Sc_{0.4}Co_{1.6}Fe_{12}O_{22}$.

Further disclosed herein are embodiments of an antenna formed from a composite hexagonal ferrite material, the antenna comprising a base y-phase hexagonal ferrite composition having a formula $Sr_{2-x}Na_xCo_{2-x}Sc_xFe_{12}O_{22}$, and a doped-in z-phase hexagonal ferrite composition to form the composite hexagonal ferrite material, the composite hexagonal ferrite material having a Q value of greater than about 15 at 1 GHz.

In some embodiments, the antenna can be part of a wireless device. In some embodiments, the antenna can be part of a tablet. In some embodiments, the antenna can be usable at frequencies of 1 GHz and above.

In some embodiments, the composite hexagonal ferrite material can have a Q value of greater than about 20 at 1 GHz and a real permeability of between 3 and 7 at 1 GHz. In some embodiments, the z-phase hexagonal ferrite composition can comprise $Ba_{1.4}Sr_{0.8}Na_{0.8}Co_{1.2}Sc_{0.8}Fe_{24}O_{41}$.

In some embodiments, the y-phase hexagonal ferrite composition can comprise $Sr_{1.6}Na_{0.4}Sc_{0.4}Co_{1.6}Fe_{12}O_{22}$.

BRIEF DESCRIPTION OF THE DRAWINGS

FIGS. 3A-I illustrate real permeability of embodiments of the disclosure.

FIGS. 4A-I illustrate imaginary permeability of embodiments of the disclosure.

FIGS. 5A-I illustrate the quality factor of embodiments of the disclosure.

FIG. 6 illustrates μ and Q at 1 GHz for embodiments of the disclosure.

FIG. 16 shows an embodiment of a process that can be implemented to sinter formed objects such as those formed in the example of FIGS. 14 and 15.

FIG. 17 shows examples of various stages of the process of FIG. 16.

DETAILED DESCRIPTION

Figure 1:
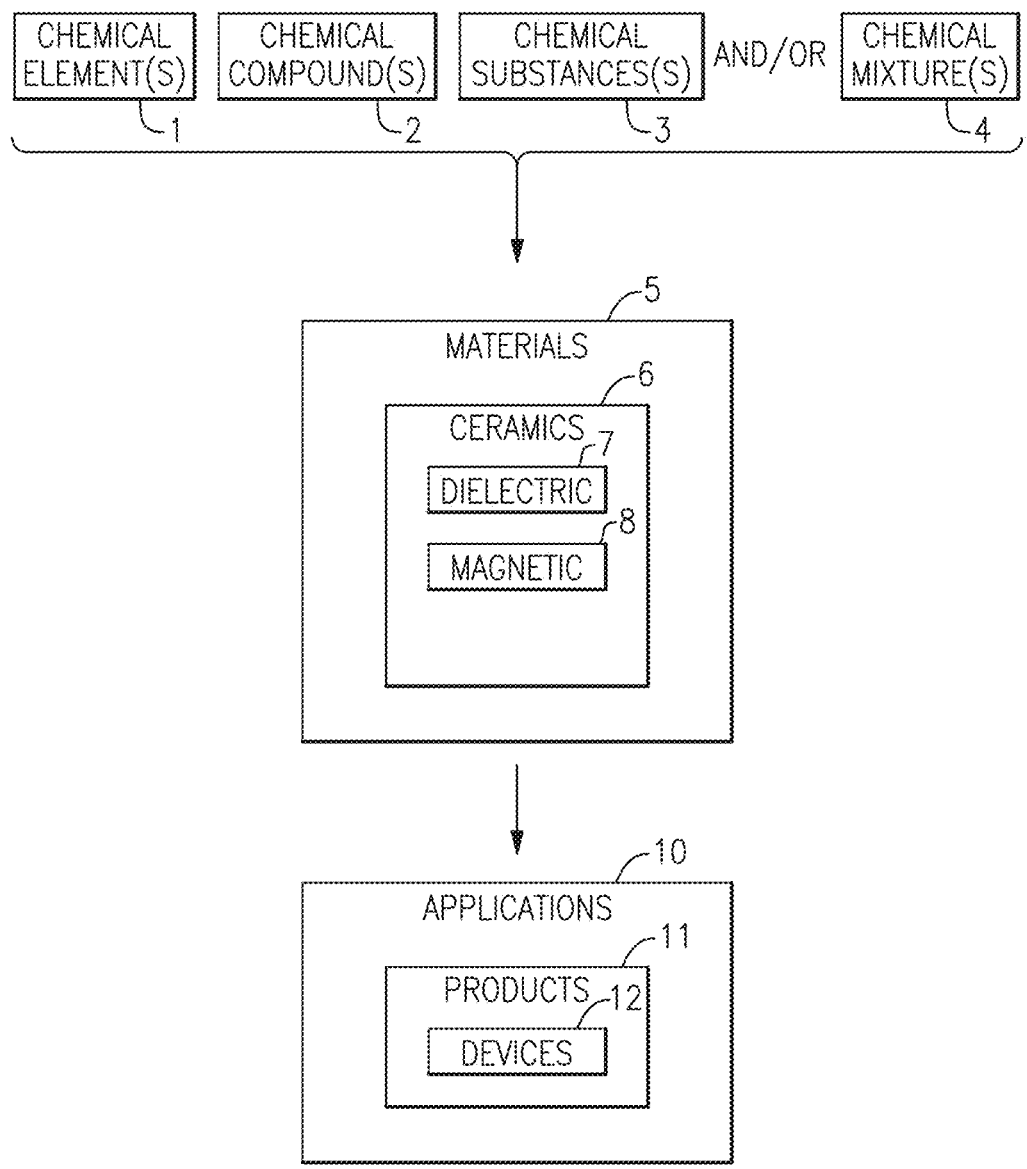
FIG. 1 schematically shows how materials having one or more features described herein can be designed, fabricated, and used.

Disclosed herein are embodiments of materials that can be advantageous as magnetodielectric materials, such as magnetodielectric antennas. Specifically, disclosed herein are embodiments of composite hexagonal ferrite materials. Embodiments of the composite hexagonal ferrite can be made of both y-phase and z-phase hexagonal ferrites. In particular, the composites hexagonal ferrite materials disclosed herein can have a high resonant frequency, allowing for a higher maximum operating frequency, while maintaining a high permeability, which allows for easier miniaturization and impedance matching.

Magnetodielectric materials can be particularly useful in radiofrequency (RF) devices such as antennas, transformers, inductors, circulators, and absorbers because of certain favorable material properties. For example, magnetodielectric materials can be useful for increasing the upper frequency limits of an antenna, which is largely determined by the resonant frequency of the material used. Additionally, some of the properties afforded by magnetic materials can be favorable miniaturizing factors, reduced field concentration, and better impedance match, all of which are advantageous for radiofrequency devices.

Advantageously, embodiments of the disclosure can be used in particular for the formation of antennas. Specifically, embodiments of the disclosure can be used at GHz frequencies, in some embodiments greater than 1, 2, or 3 GHz and can be used for WiFi, such as in cell phones, tablets, etc.

In some embodiments, the disclosed material can have a permeability of 10 at 1 GHz along with Q values of 50 or above. In some embodiments, the disclosed material can have a permeability of at least 5 at 3 GHz and a Q value of at least 30.

Recent advances in magnetodielectric materials are driven in part by the desire to miniaturize high frequency antennas, thus reducing the overall footprint of the antenna, while maintaining desirable bandwidth, impedance, and low dielectric loss. Disclosed herein are materials and methods of making magnetodielectric materials that have improved resonant frequencies as well as low dielectric loss, thus providing for materials that are advantageous for use in, at least, radiofrequency electronics. Two figures of merit for antenna performance include the miniaturization factor and the bandwidth. First, the miniaturization factor is determined by the formula:

$$d_{eff} = d_o(\varepsilon_r \mu_r)^{-1/2}$$

where $d_{eff}/d_o$ is the miniaturization factor, $\varepsilon_r$ is the dielectric constant of the antenna material, and $\mu_r$ is the magnetic permeability of the antenna material. Both $\varepsilon_r$ and $\mu_r$ are dependent on frequency in magnetic oxide antennas. Second the effective bandwidth (or efficiency) is determined by the formula:

$$\eta = \eta_o(\mu_r/\varepsilon_r)^{1/2}$$

where $\eta/\eta_o$ describes the efficiency (or bandwidth) of the material. This efficiency is maximized if $\mu_r$ is maximized. In addition if $\mu_r = \varepsilon_r$ there is a perfect impedance match to free space.

FIG. 1 schematically shows how one or more chemical elements (block 1), chemical compounds (block 2), chemical substances (block 3) and/or chemical mixtures (block 4) can be processed to yield one or more materials (block 5) having one or more features described herein. In some embodiments, such materials can be formed into ceramic materials (block 6) configured to include a desirable dielectric property (block 7), a magnetic property (block 8).

In some embodiments, a material having one or more of the foregoing properties can be implemented in applications (block 10) such as radio-frequency (RF) application. Such applications can include implementations of one or more features as described herein in devices 12. In some applications, such devices can further be implemented in products 11. Examples of such devices and/or products are described herein.

Hexagonal Ferrite

One class of materials that can have advantageous magnetic properties for magnetodielectric applications are hexagonal ferrites. Hexagonal ferrites, or hexaferrites, have magnetic properties that are directly linked to their crystal structure. For example, hexagonal ferrites all have magnetocrystalline anisotropy, where the response to an induced magnetic field has a preferred orientation through the crystal structure. Additionally, hexagonal ferrite systems, in particular, are desirable because of their high magnetic permeability and absorption at microwave (100 MHz-20 GHz) frequencies.

Figure 2:
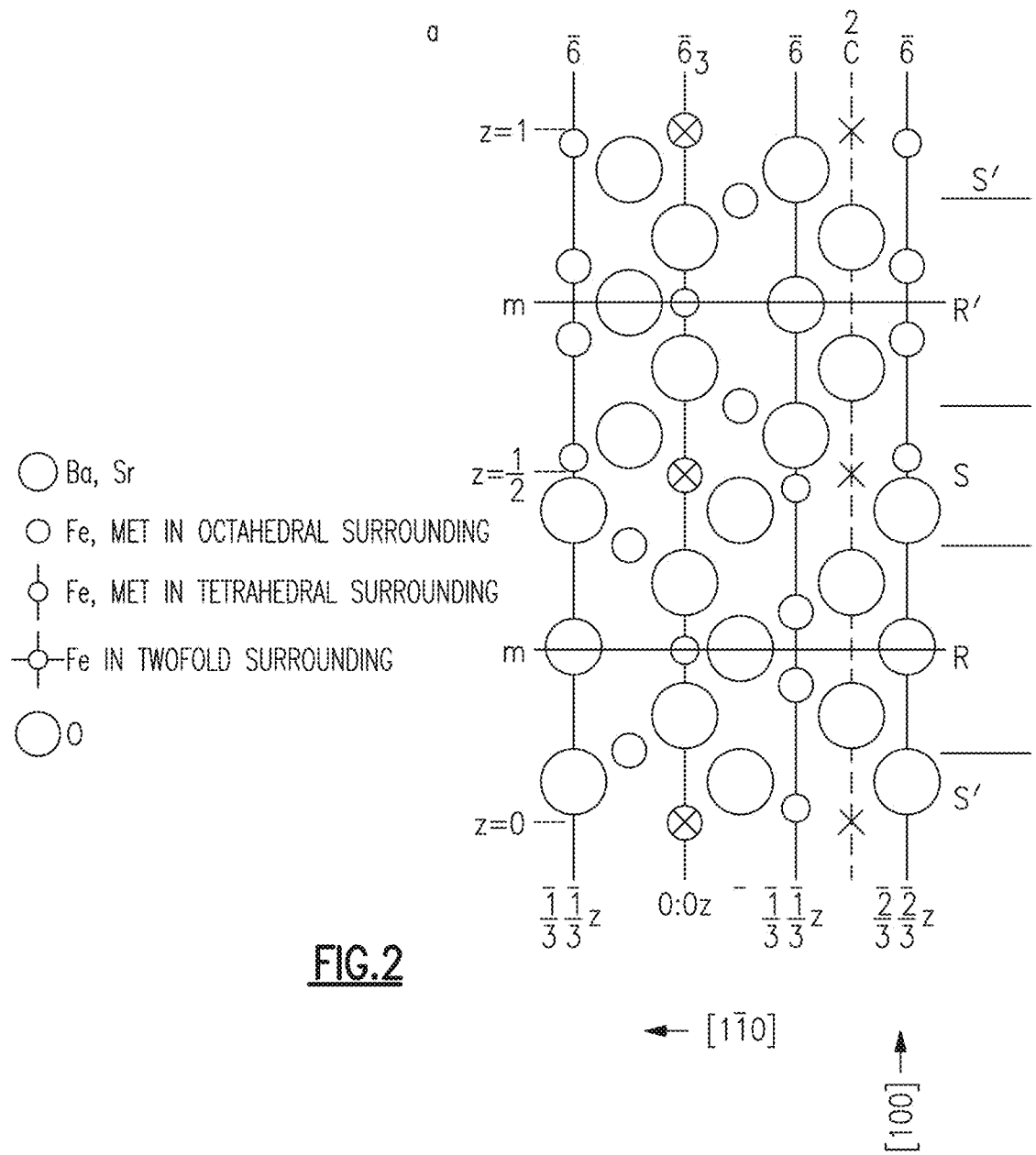
FIG. 2 illustrates the crystal structure of an embodiment of a Y-phase hexagonal ferrite.
Figure 3A:
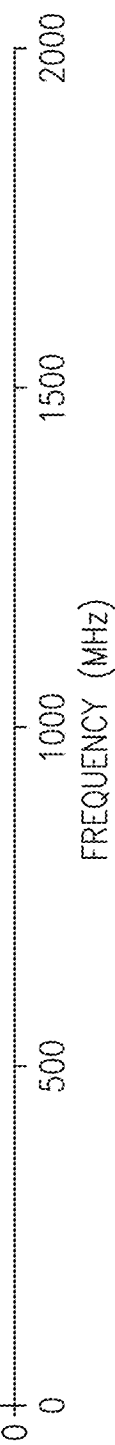
Figure 3B:
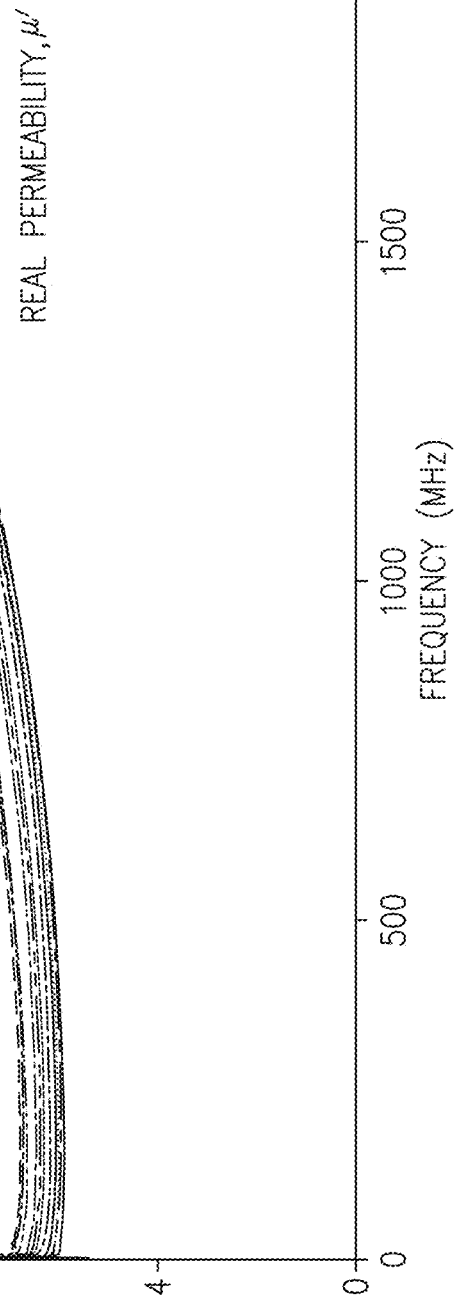
Figure 3C:
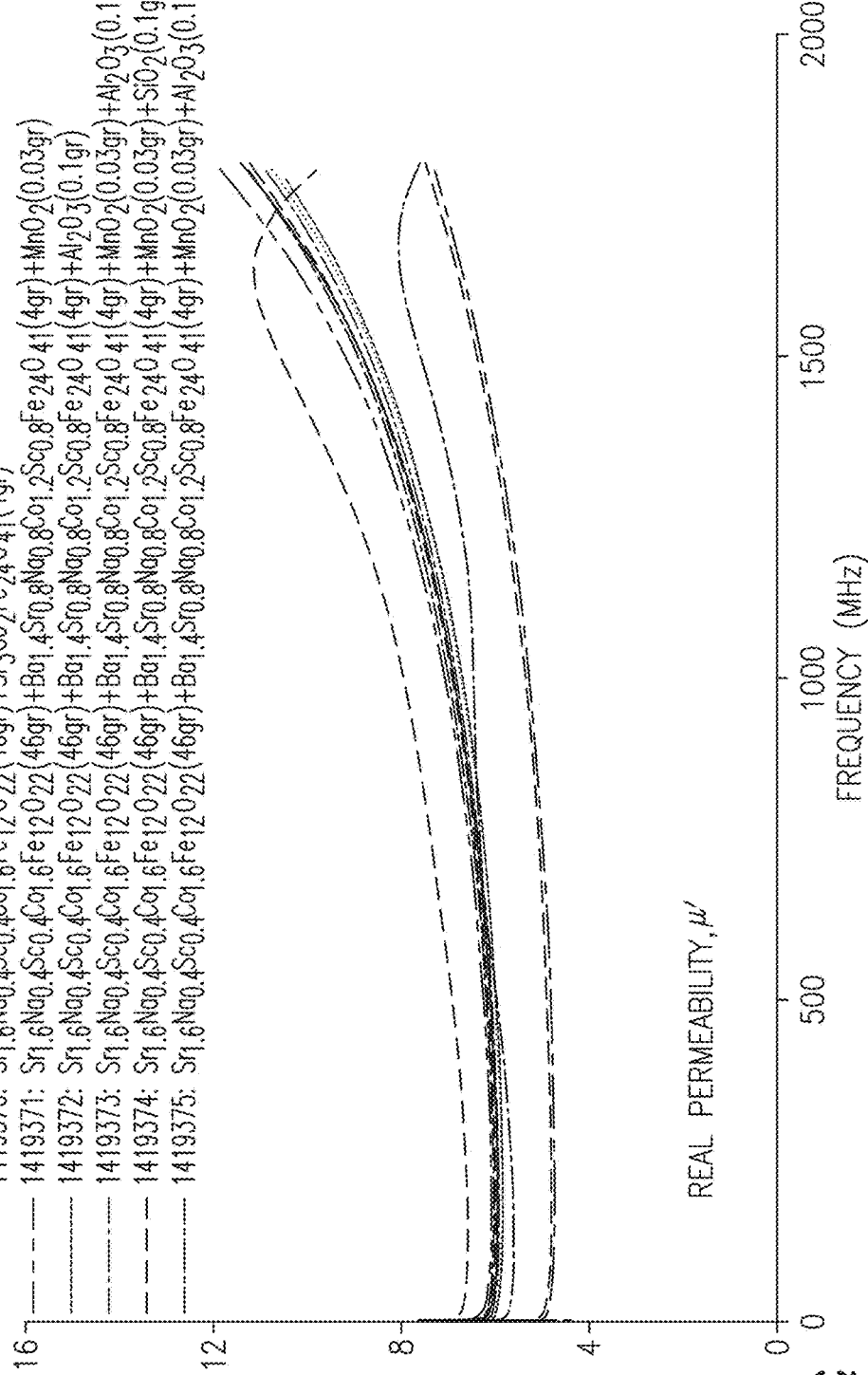
Figure 3D:
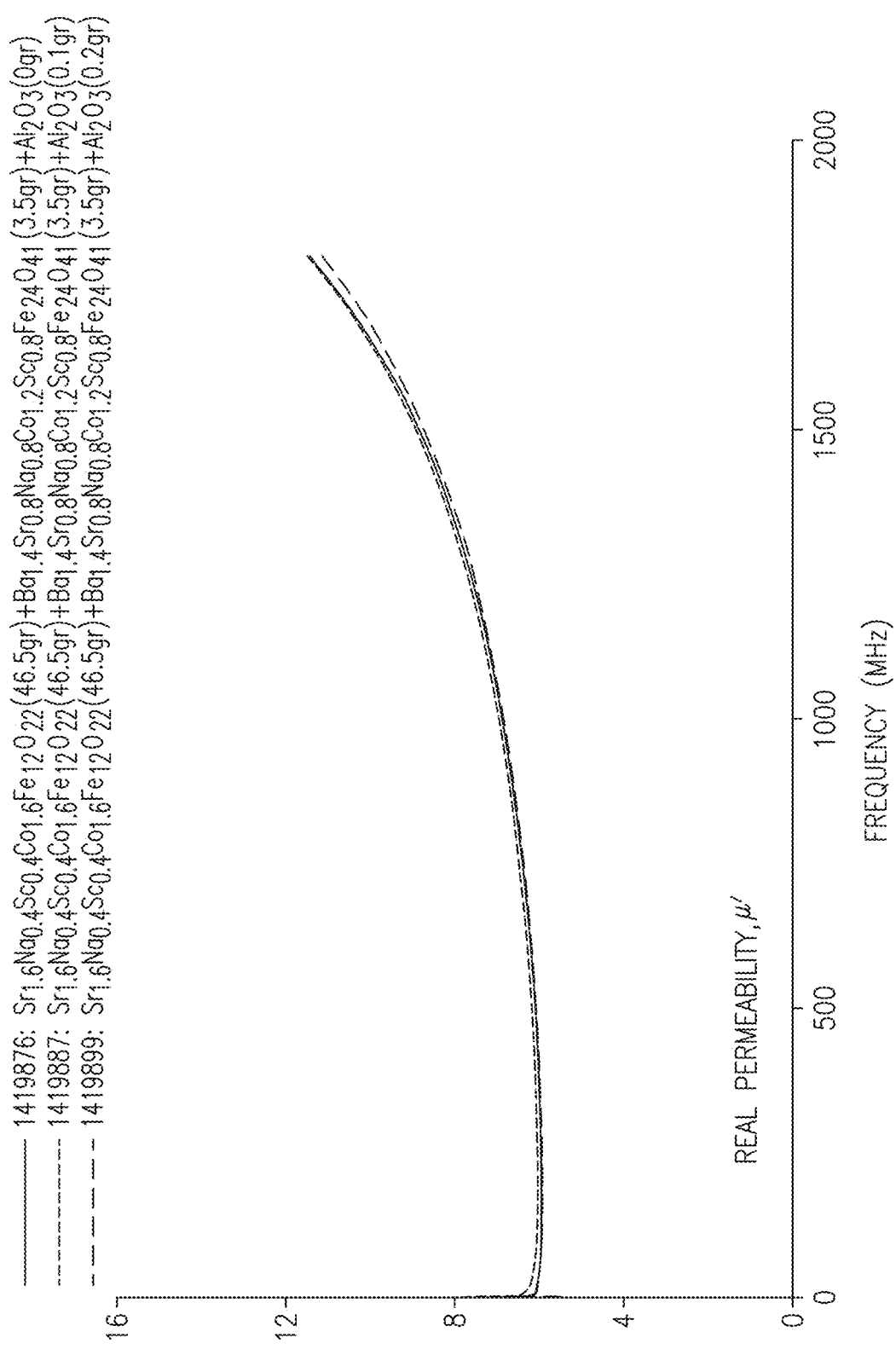
Figure 3E:
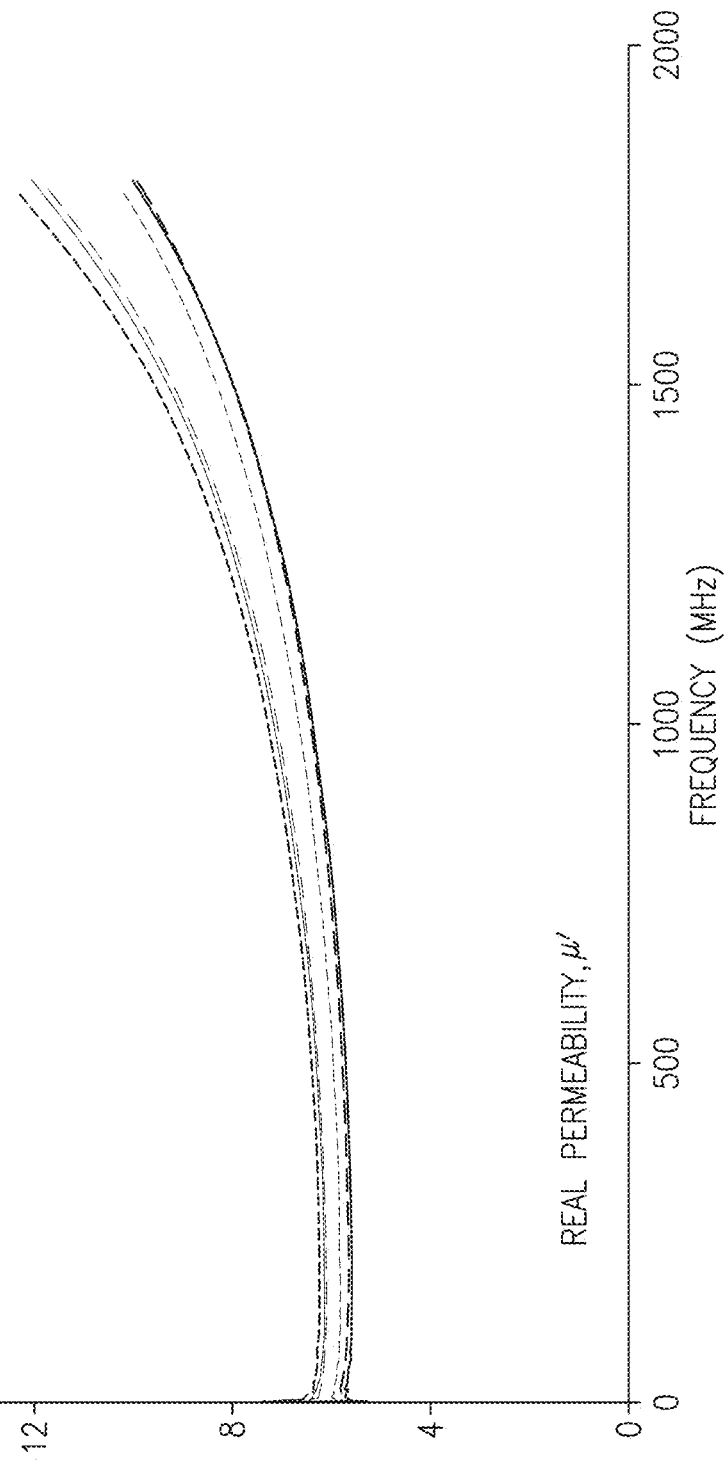
Figure 3F:
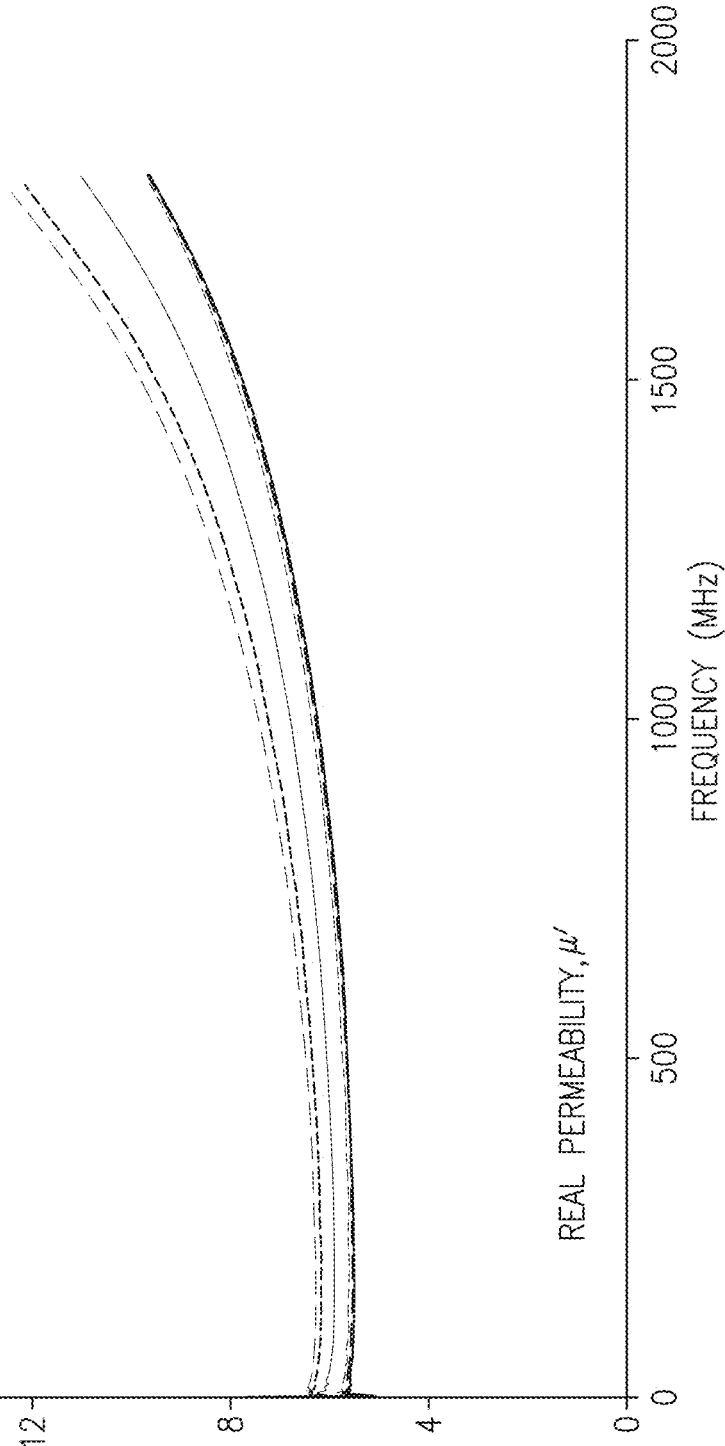
Figure 3H:
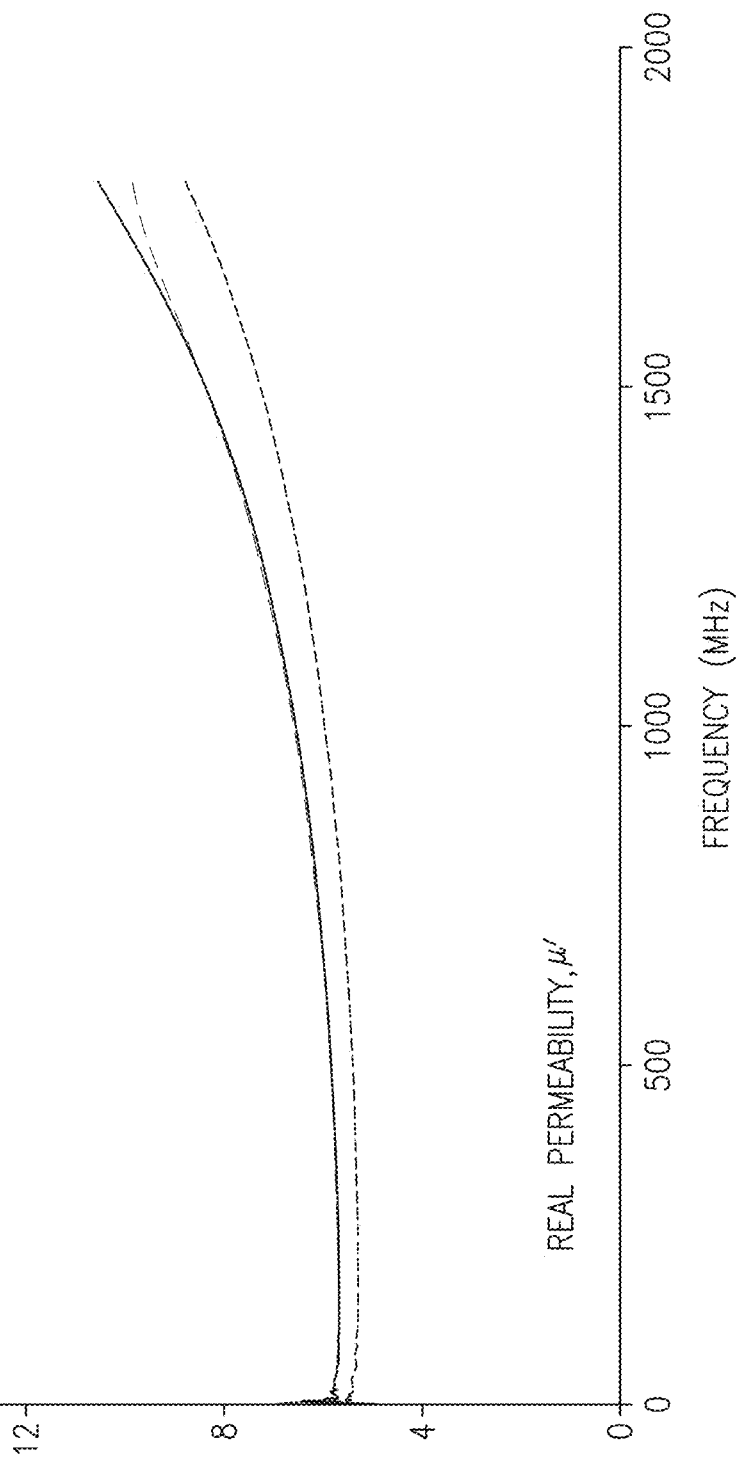
Figure 3I:
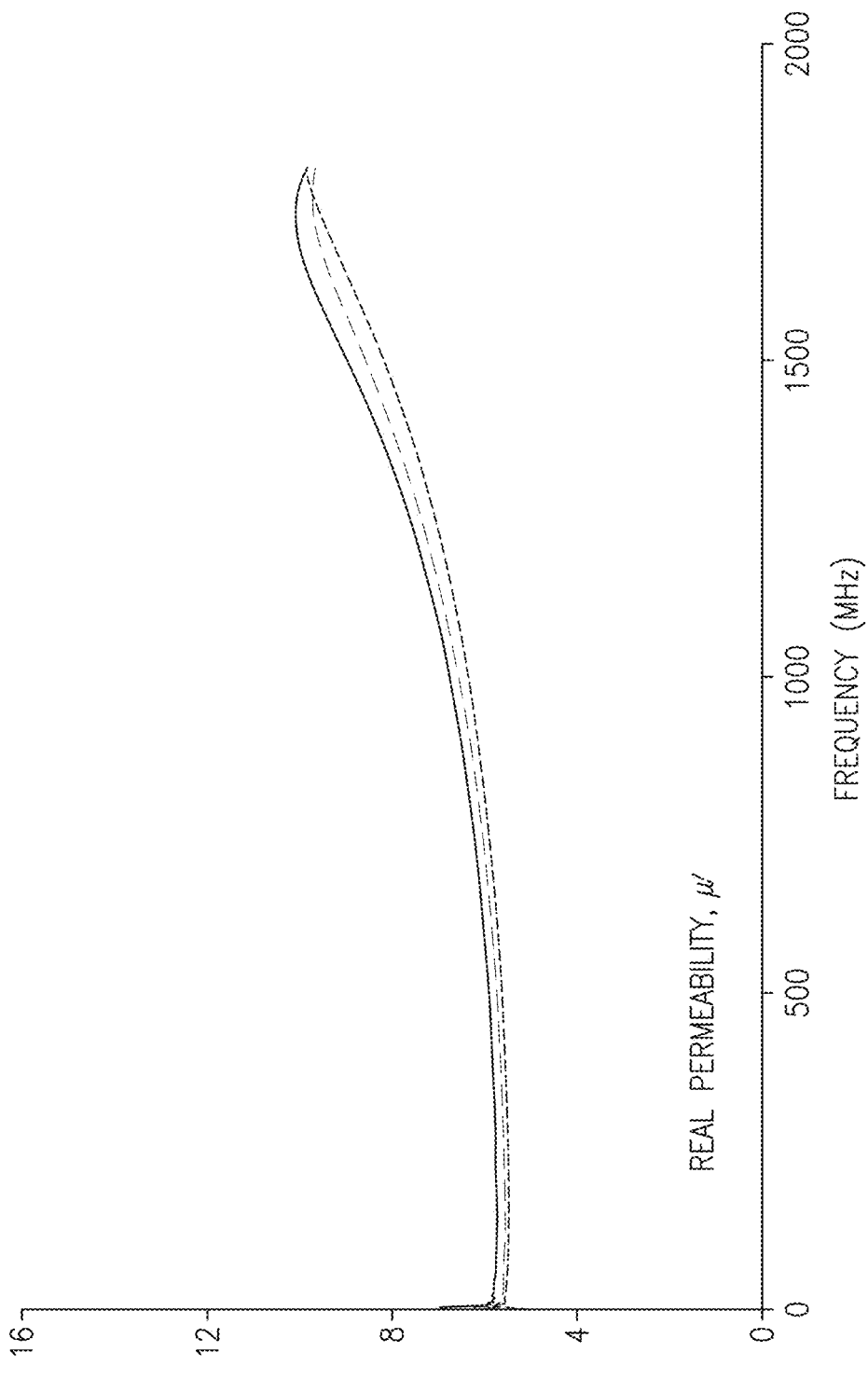
Figure 4A:
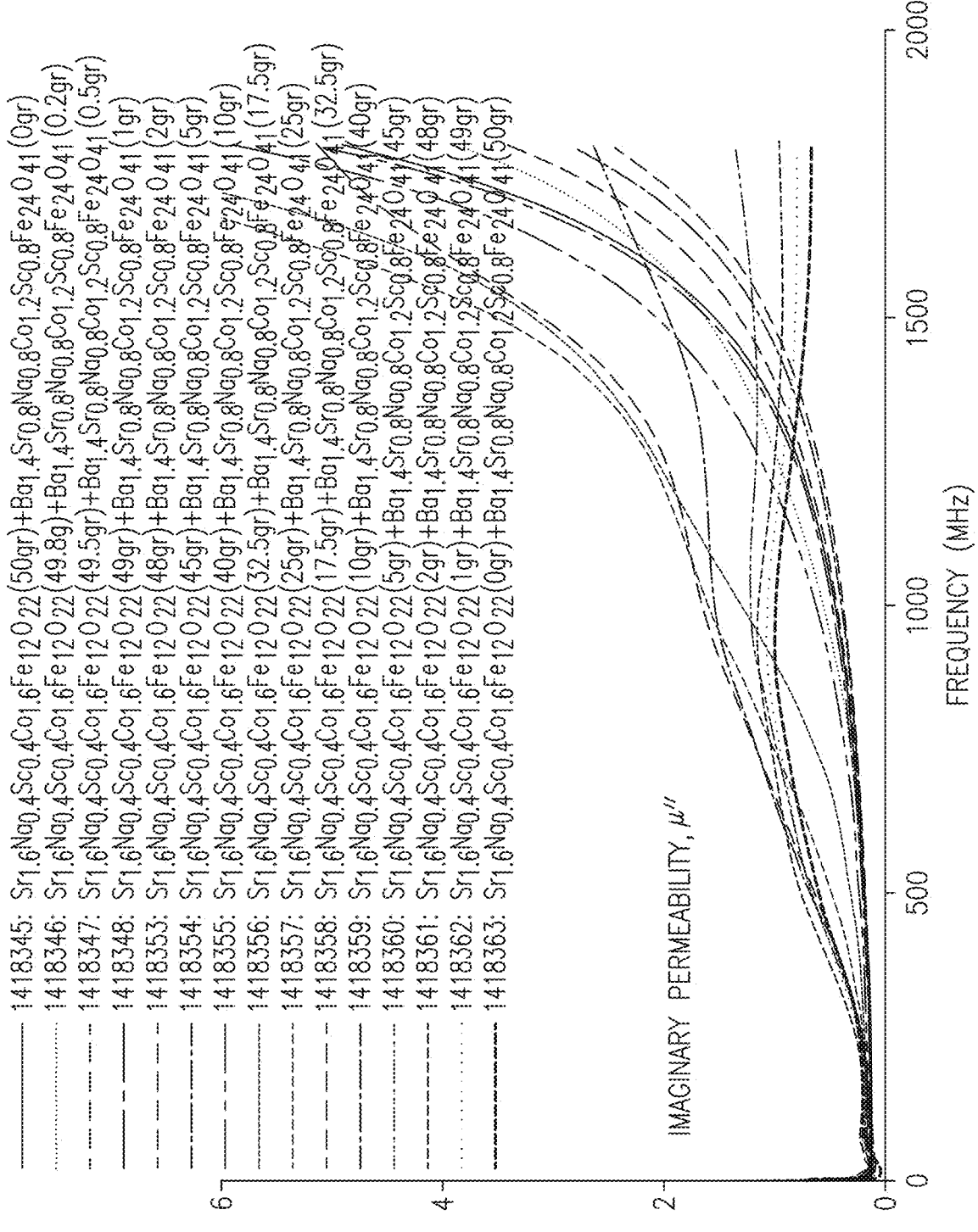
Figure 4B:
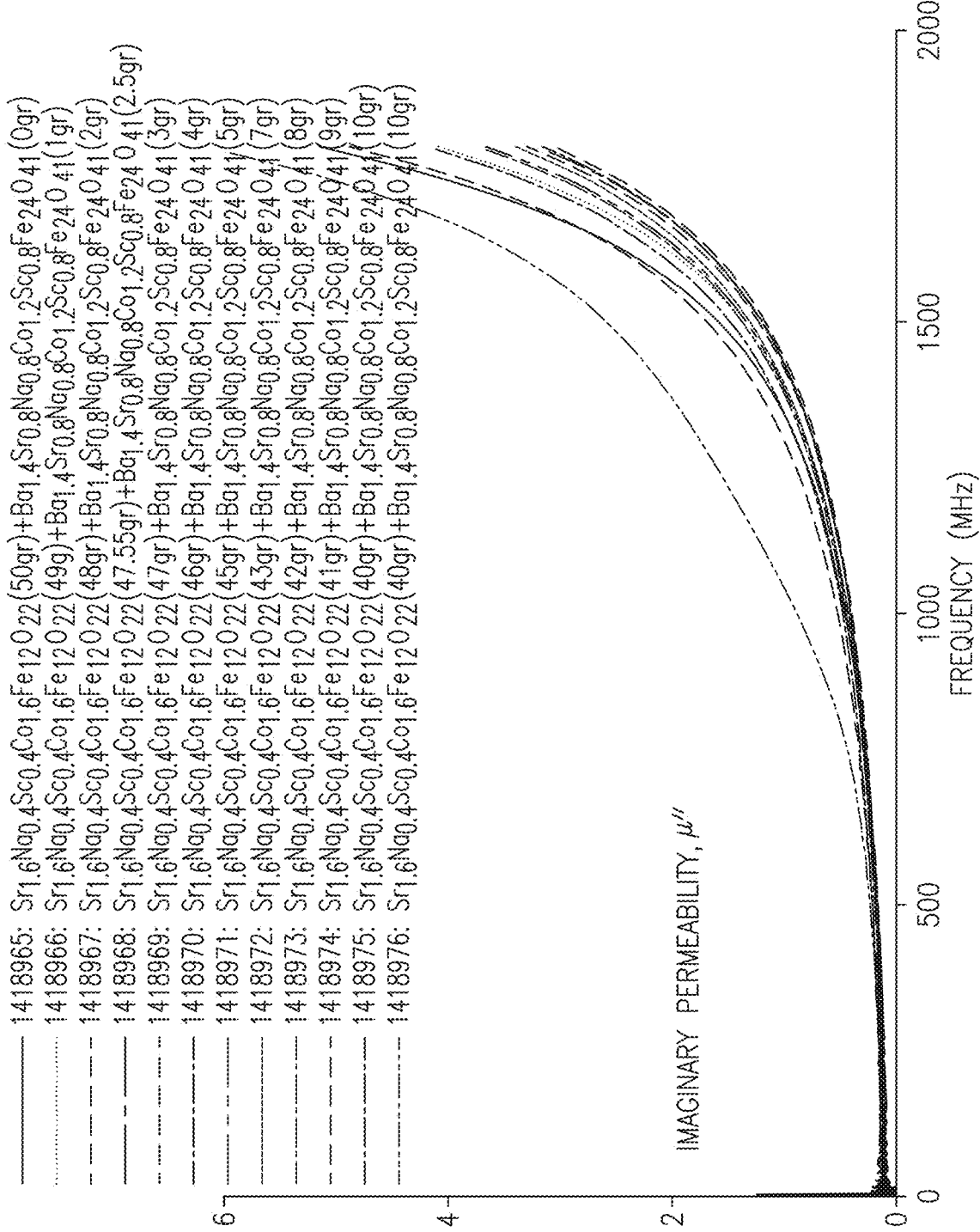
Figure 4D:
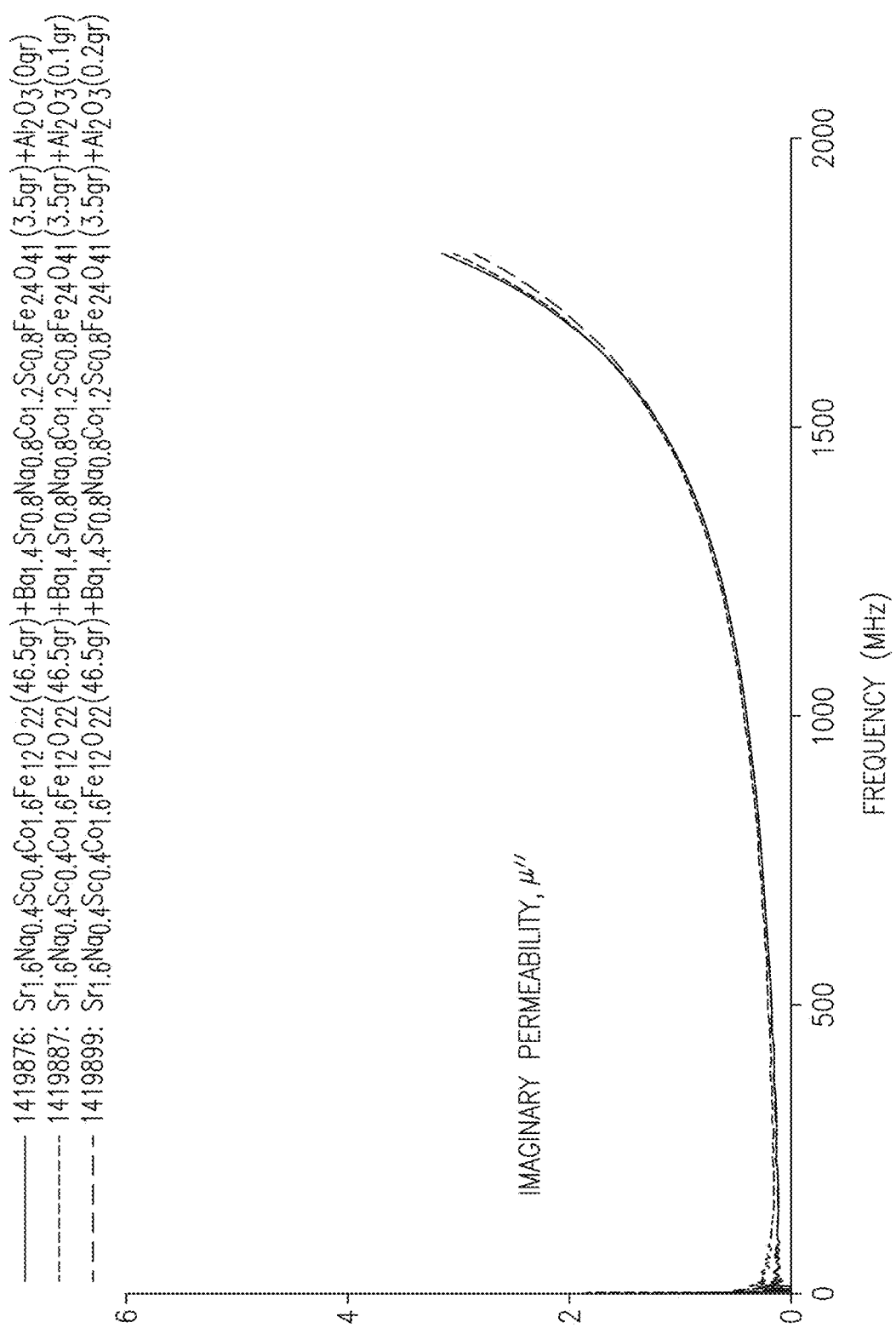
Figure 4E:
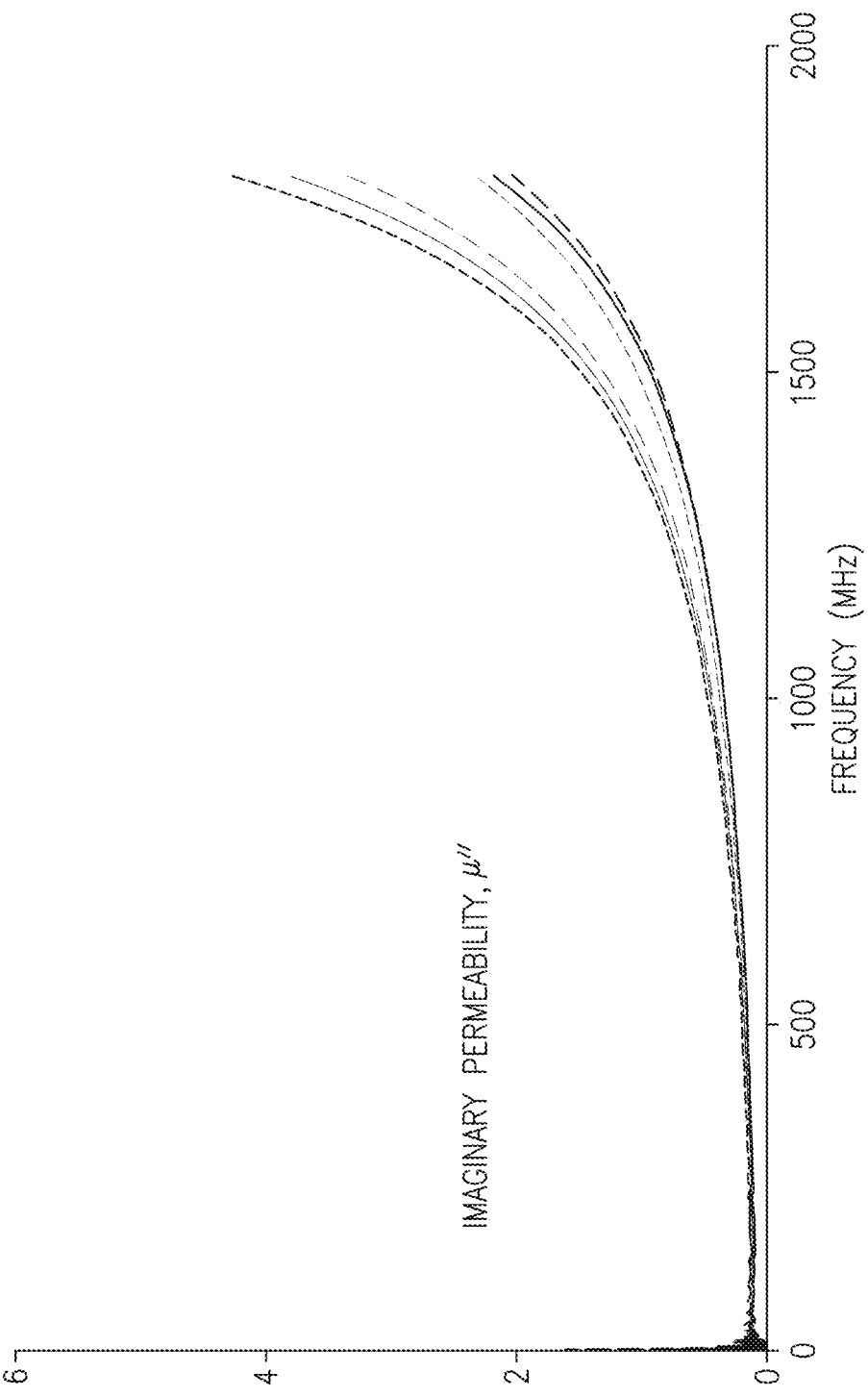
Figure 4F:
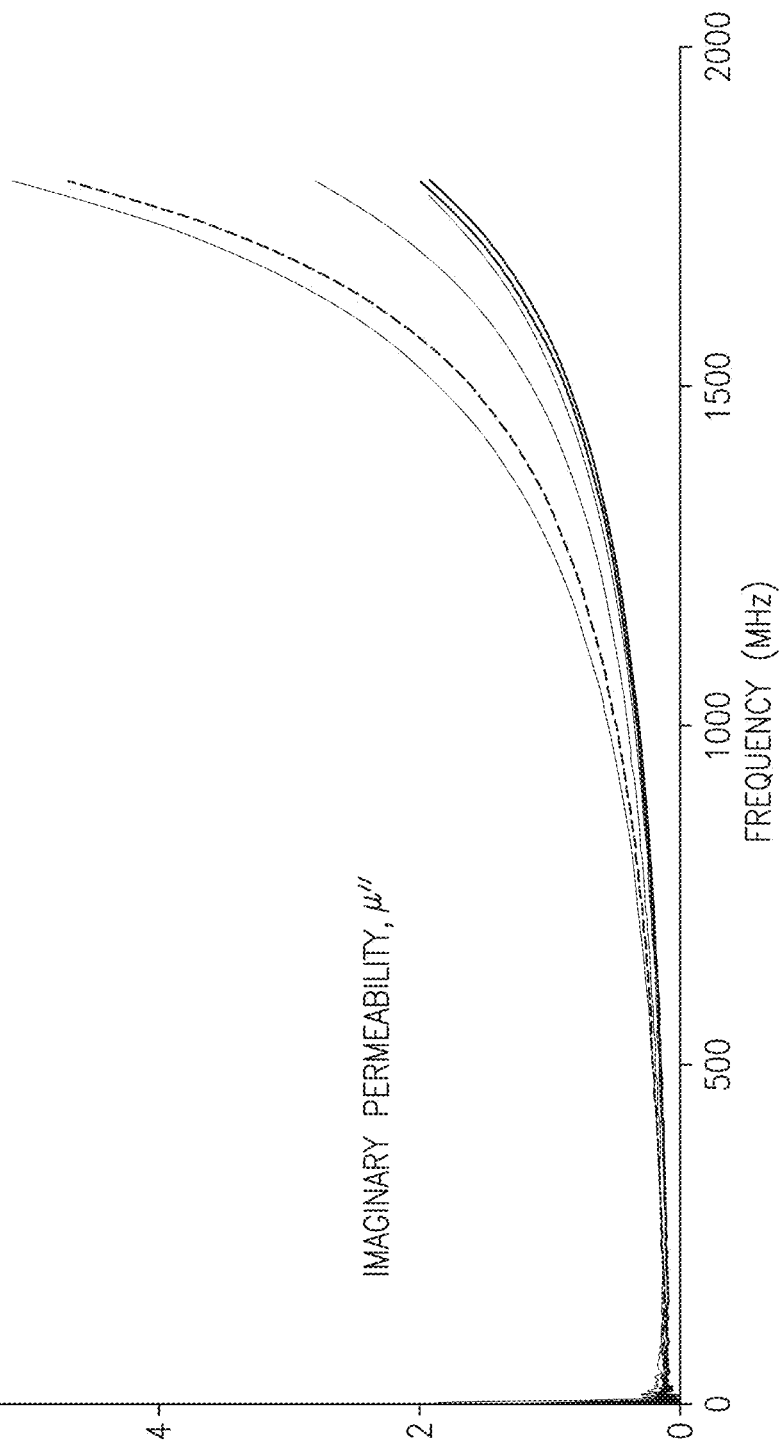
Figure 4G:
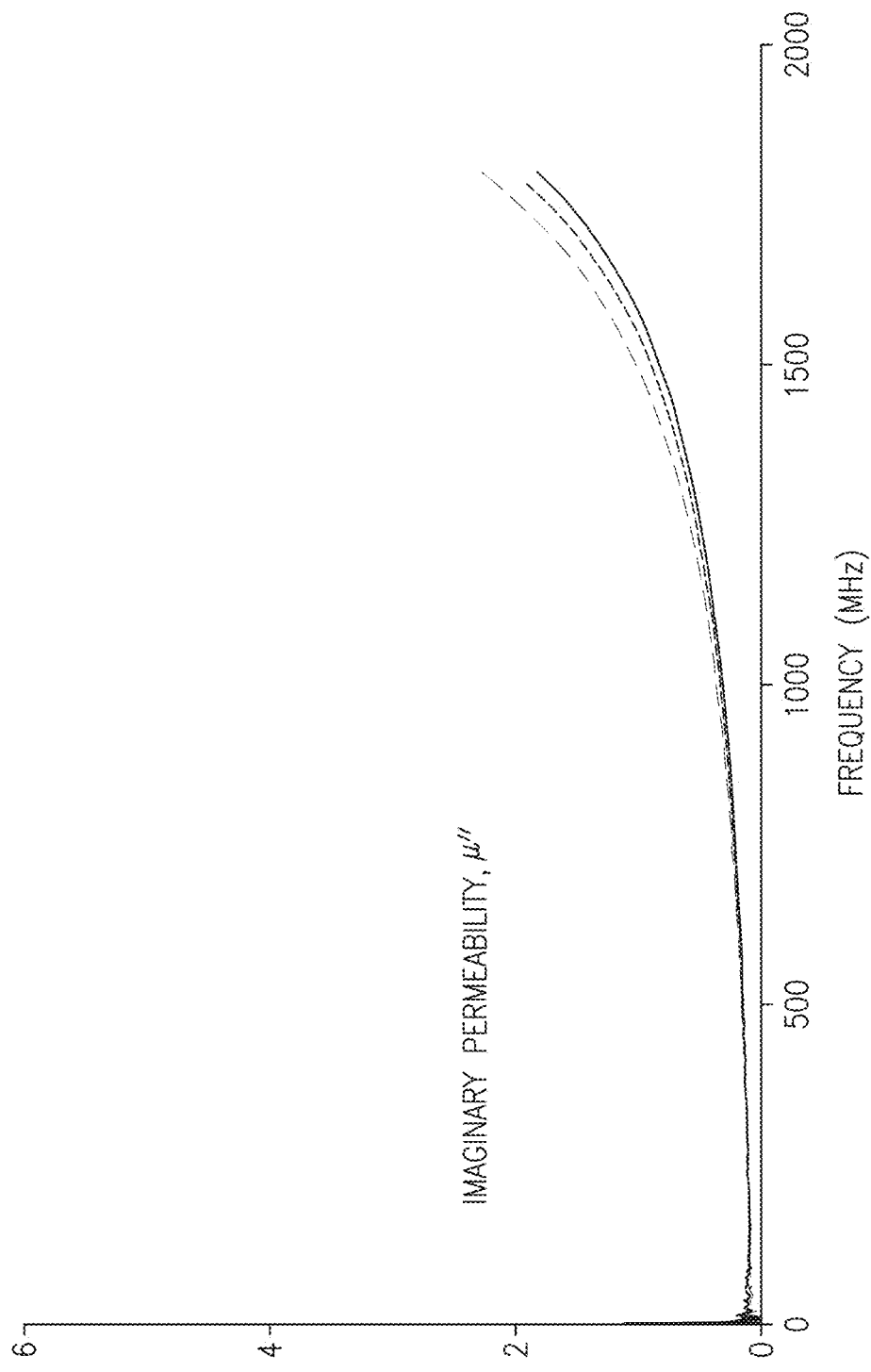
Figure 4I:
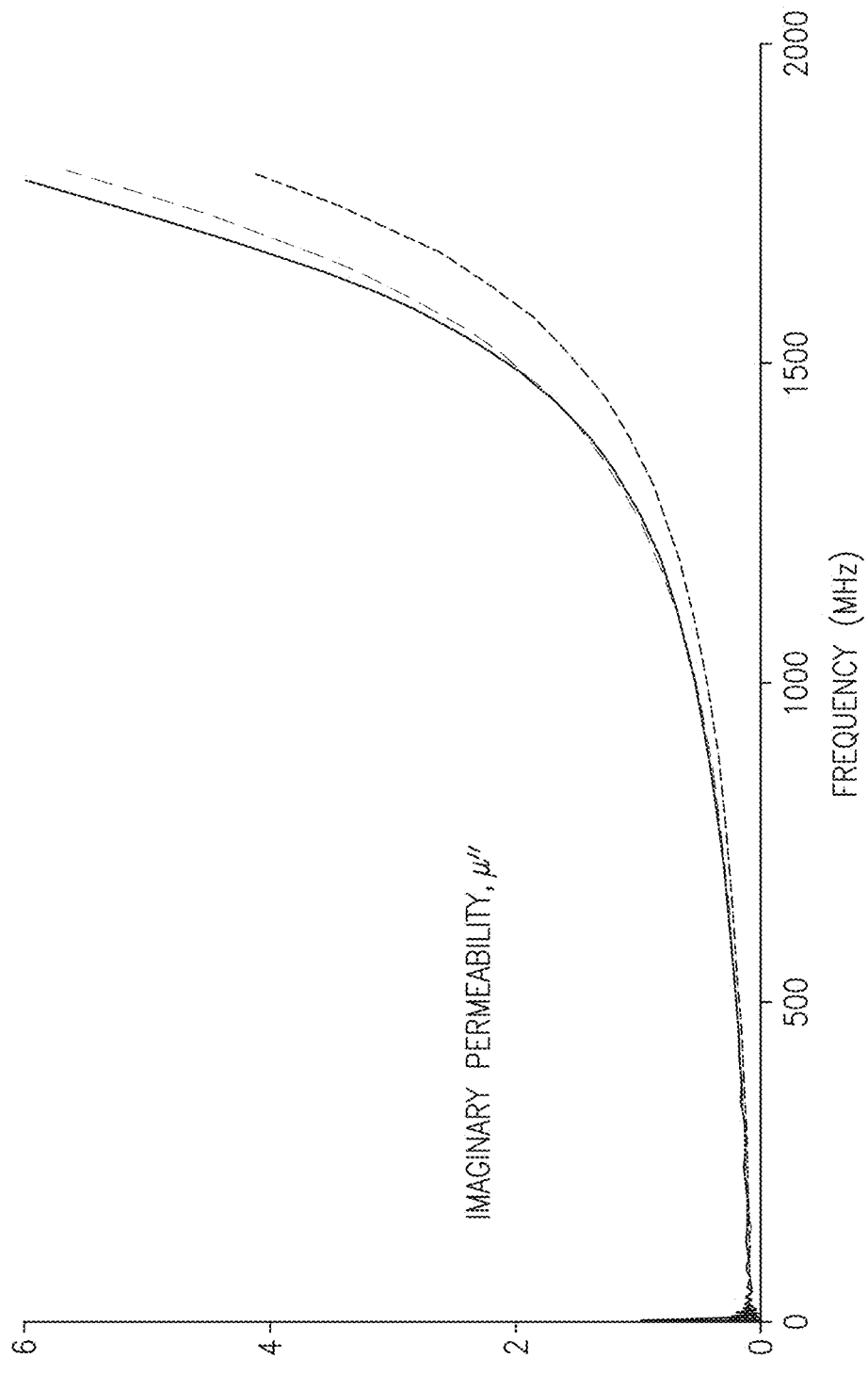
Figure 5A:
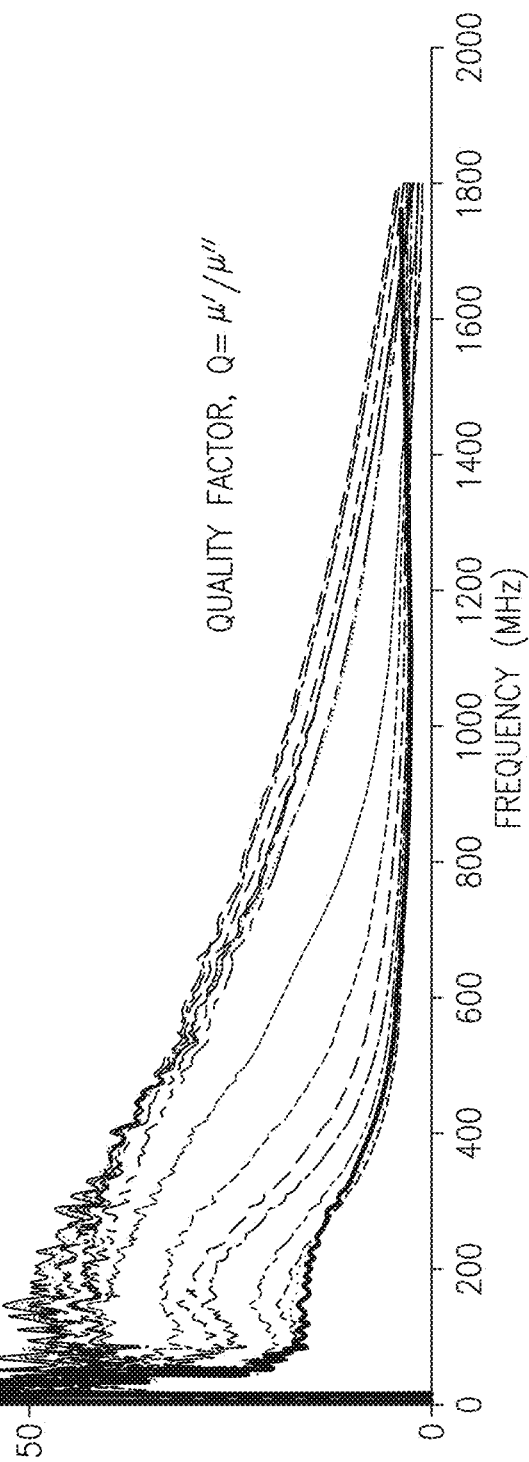
Figure 5B:
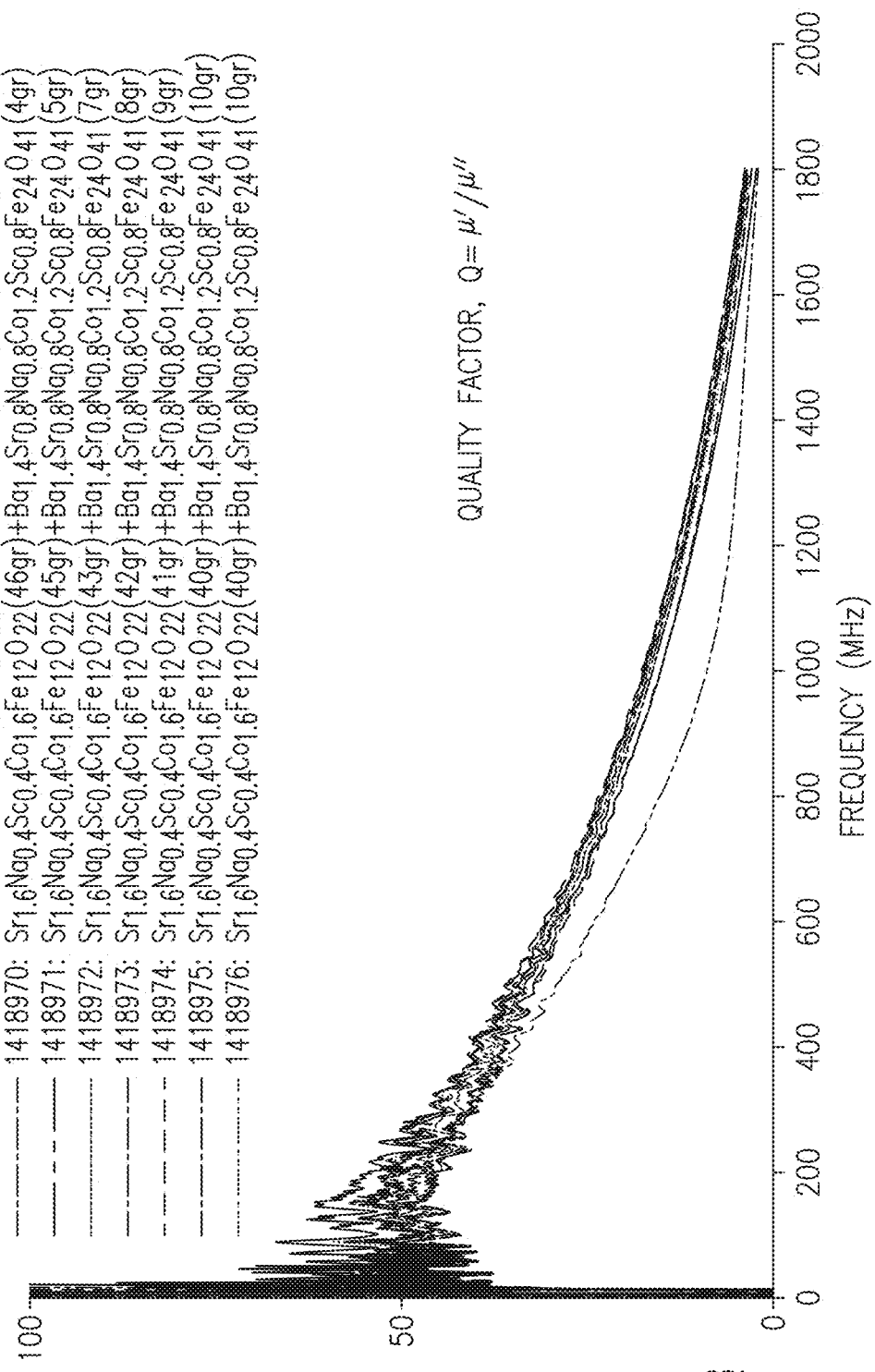
Figure 5C:
Figure 5D:
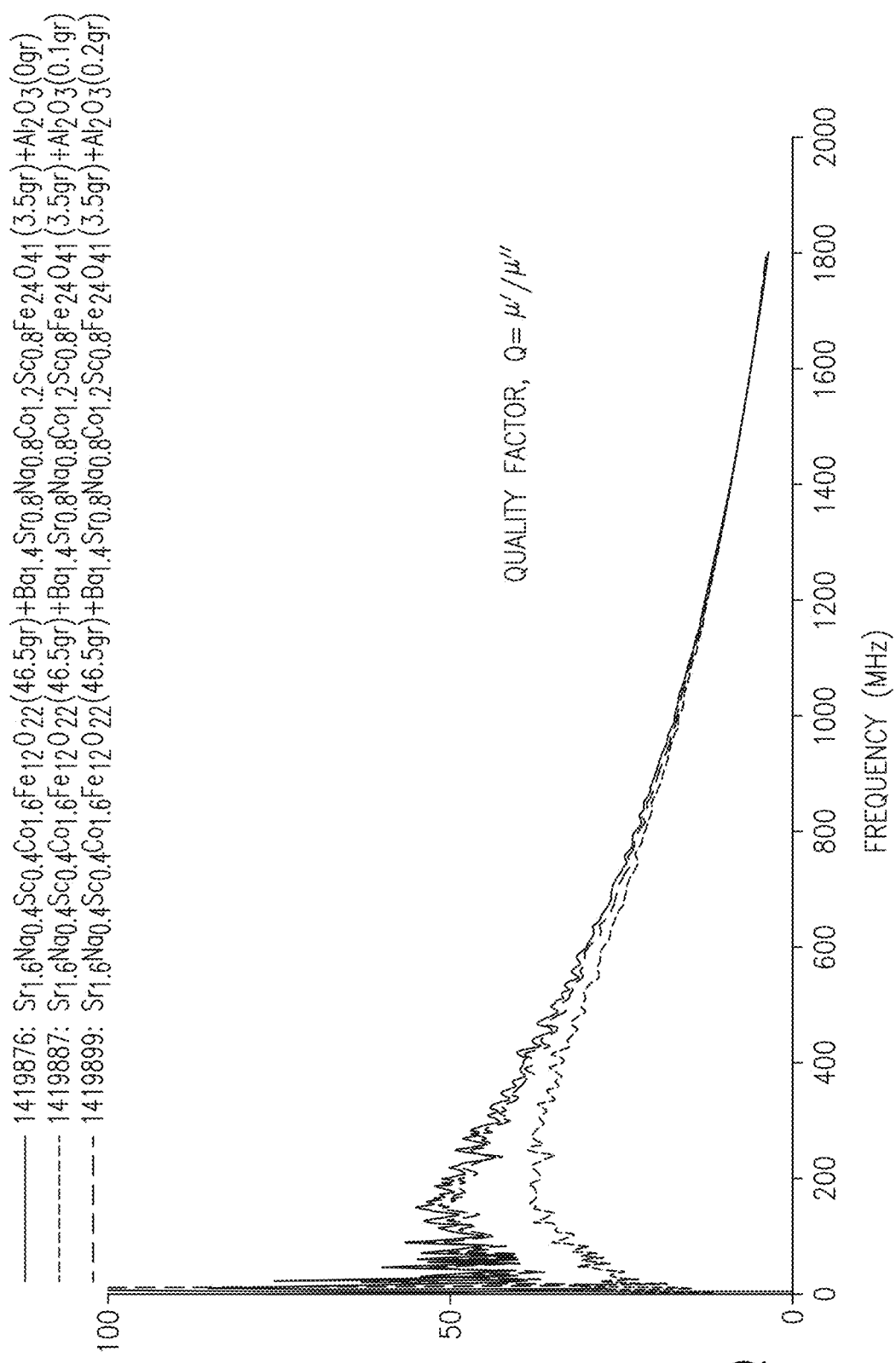
Figure 5G:
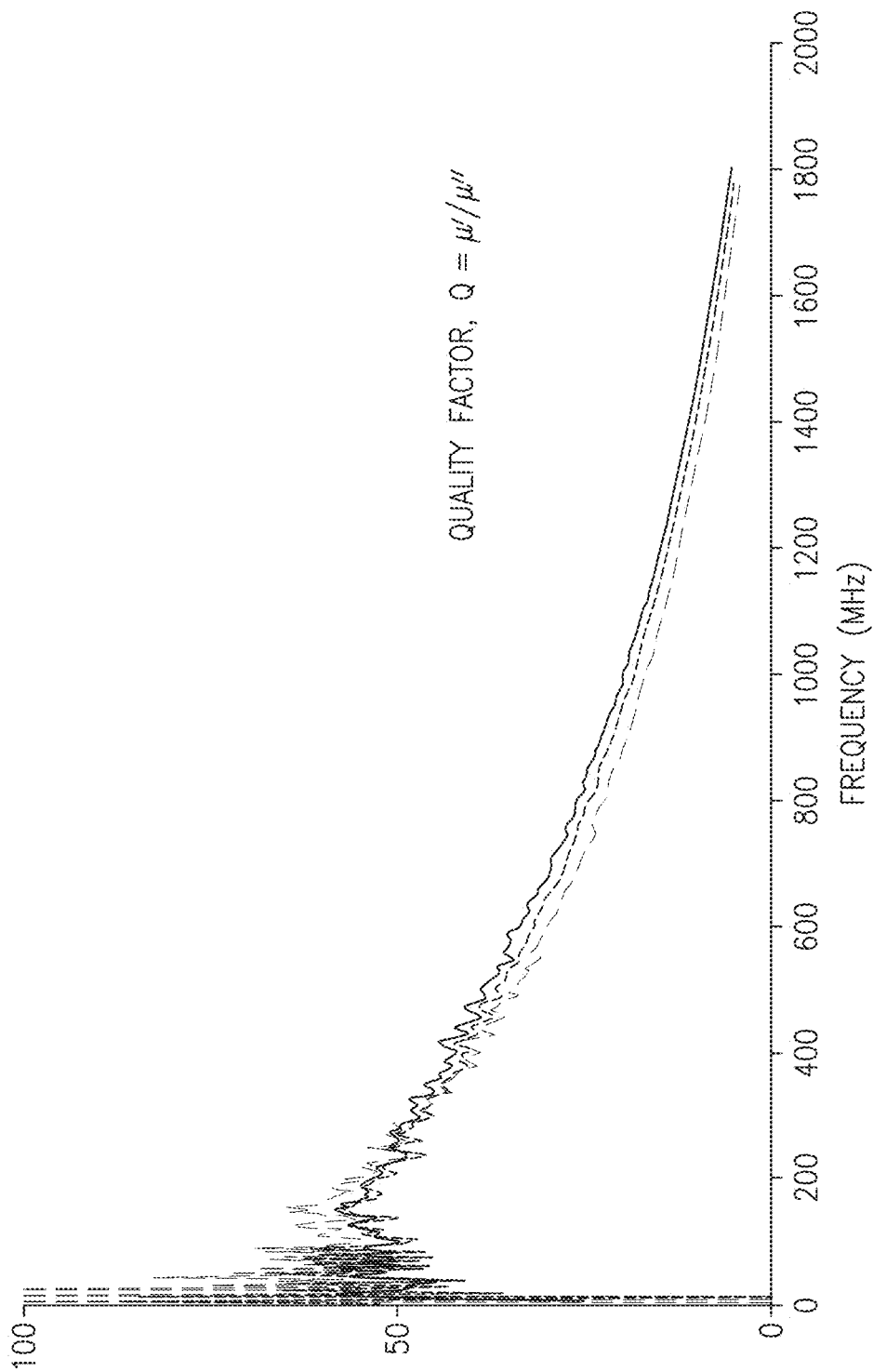
Figure 5H:
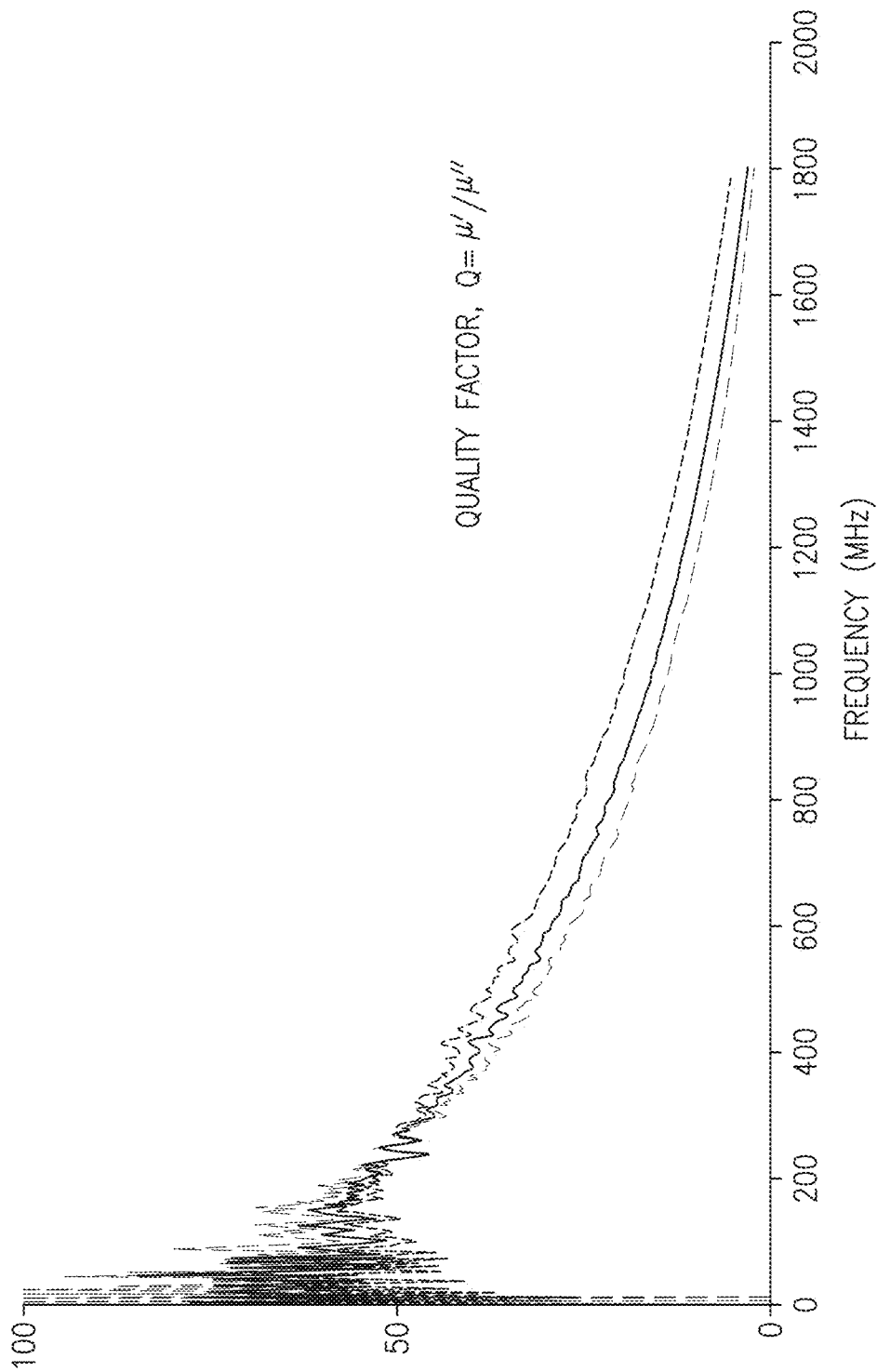
Figure 5I:
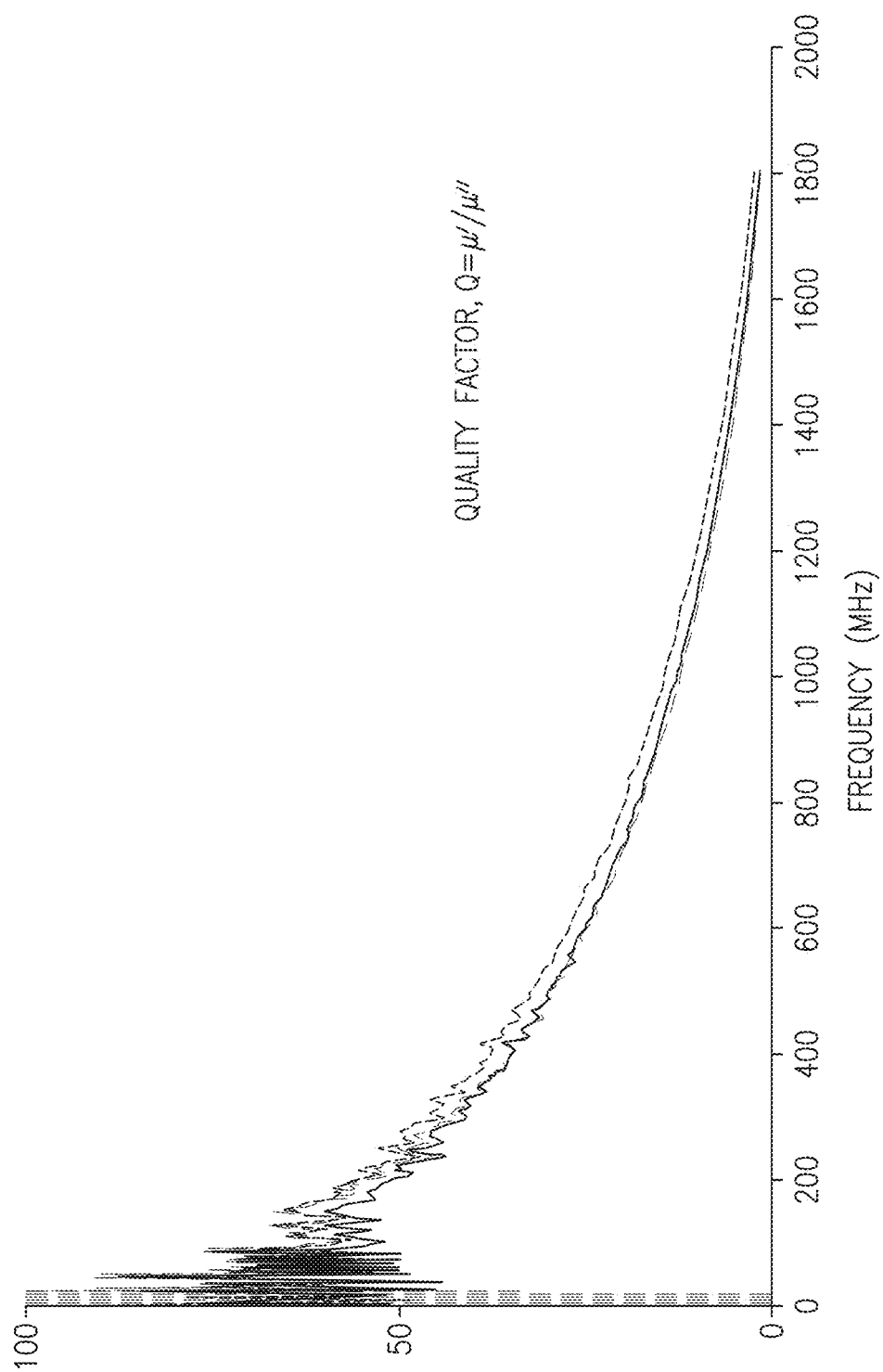

Hexagonal ferrite crystal systems can include crystal structures that are generally intergrowths between magnetoplumbite and spinel structures containing strontium (Sr) or barium (Ba), a divalent cation such as iron (Fe), cobalt (Co), nickel (Ni) or manganese (Mn) and trivalent Fe. The hexagonal ferrite may be formed in a variety of different crystal structures based on the magnetoplumbite cell. These structures include M-phase ($SrFe_{12}O_{19}$), W-phase ($BaMe_2Fe_{16}O_{27}$), Y-phase ($Sr_2Me_2Fe_{12}O_{22}$) and Z-phase ($Ba_3Me_2Fe_{24}O_{42}$), as well as combinations of the structures. FIG. 2 illustrates the crystal structure of Y-phase hexagonal ferrite.

While typical hexagonal ferrites contain barium, the barium atoms can be substituted out for an atom of a similar size, such as strontium. Accordingly, the substitution of the barium atoms with strontium atoms should not negatively impact the properties of the material as the structure should retain generally the same shape. In fact, as shown below, the use of strontium instead of barium can allow for other processing methods that improve the magnetodielectric properties of the hexagonal ferrite.

One example hexagonal ferrite that can be particularly advantageous as a magnetodielectric material for use in, for example, high frequency antennas or other RF devices, is Y-phase strontium cobalt ferrite ($Sr_2Co_2Fe_{12}O_{22}$), commonly abbreviated as $Co_2Y$. Disclosed herein are embodiments of this a class of Y-phase hexagonal ferrites, as well as methods of manufacturing them, having improved magnetic properties useful for RF applications, such as improved resonant frequencies, low magnetic loss, and high Q factor values.

Embodiments of the present disclosure, teach methods and processing techniques for improving performance characteristics of hexagonal ferrite materials used in high frequency applications. Certain embodiments provide improved methods and processing techniques for manufacturing Y-phase hexagonal ferrite systems $Sr_2Co_2Fe_{12}O_{22}$ ($Co_2Y$) that have reduced magnetostriction, improved resonant frequency, and extended magnetic permeability at higher frequencies.

Magnetodielectric Properties

Certain properties of a material can be advantageous for use in magnetodielectric applications, such as radio frequency antennas. These properties include, but are not limited to, magnetic permeability, permittivity, magnetic anisotropy, magnetic loss, and magnetic Q values.

Permeability is the measure of the ability of a material to support the formation of a magnetic field within itself. In other words, magnetic permeability is the degree of magnetization that a material obtains in response to an applied magnetic field. Accordingly, a higher magnetic permeability, or mu' or µ', allows for a material to support a higher magnetic field. Accordingly, it can be advantageous to have high magnetic permeability for use with radio frequency applications.

Relative permeability and relative permittivity are properties indicative of the performance of a magnetic material in high frequency antenna applications. Relative permeability is a measure of the degree of magnetization of a material that responds linearly to an applied magnetic field relative to that of free space ($\mu_r=\mu/\mu_o$). Relative permittivity ($\varepsilon_r$) is a relative measure of the electronic polarizability of a material relative to the polarizability of free space ($\varepsilon_r=\varepsilon/\varepsilon_o$). Generally, permeability (µ') can be separated into two components: spin rotational $X_{sp}$ which is in response for high frequency, and domain wall motion $X_{dw}$ which is damped out at microwave frequencies. Permeability can be generally represented by $\mu'=1+X_{dw}+X_{sp}$.

Unlike spinels, $Co_2Y$ systems typically have a non-cubic unit cell, planar magnetization, and an anisotropic spin-rotation component to permeability. Spin rotation anisotropy is also a consideration in preparing $Co_2Y$ for high frequency applications. Large anisotropy fields ($H_\theta$) are similar to applying an external magnetic field which increases resonant frequency, whereas small anisotropy fields ($H_\varphi$) improve permeability. Ho is generally strong in hexagonal ferrites, such as $Co_2Y$. As such, domain formation out of the basal plane is suppressed and the material becomes self-magnetizing. The relationship between the permeability and the rotational stiffness can be represented by the formula ($\mu_o-1)/4\pi=(1/3)(M_s/H_\theta^A+M_s/H_o^A)$. For isotropic rotational stiffness (as in spinels), the relationship can be represented as follows: $(\mu_o-1)/4\pi=(2/3)(M_s/H^A)$. For cases where HO does not equal to $H_o^A$: $f_{res}$ ($\mu_o-1$)=4/3 $\psi M_s$ [1/2 ($H_\theta^A/H_\varphi^A$)+1/2 ($H_\varphi^A/H_\theta^A$)]. It is believed that the larger the difference in rotational stiffness, the greater the self-magnetization field, which could push the resonant frequency into the microwave region. Permeability drops quickly above the resonance frequency.

Another property of magnetodielectric antenna materials is the magnetic loss factor. The magnetic loss tangent describes the ability of the magnetic response in a material to be in phase with the frequency of the applied magnetic field (in this case from electromagnetic radiation) at a certain frequency. This is represented as tan $\delta_m=\mu''/\mu'$. The Magnetic Q is the inverse of the magnetic loss tangent. Q=1/tan $\delta_m$. For example, if a loss factor is high at a certain frequency, the material would not be able to operate at that frequency. Accordingly, it can be advantageous for a magnetodielectric material to have low magnetic loss tangent up to higher frequencies, such as those above 500 MHz, above 800 MHz, or above 1 GHz, as the material could then be used in applications at those high frequencies. Magnetic Q factors of above 20 are advantageous for some applications. This can be especially useful for antennas to select particular high frequency signals without interference from other signals at around the selected range.

Composite Y and Z Phase Hexagonal Ferrites

Disclosed herein are embodiments of composite hexagonal ferrites which can have particularly advantageous properties for use in radiofrequency applications. In particular, embodiments of the disclosed materials can be especially useful as magnetodielectric antennas due to their high resonant frequency along with their high permeability. The materials can include a combination of different hexagonal ferrites to increase the overall properties. For example, the material can include a combination of strontium hexagonal ferrite along with barium hexagonal ferrite. Further, embodiments of the material can include a combination of Y phase and Z phase hexagonal ferrites. In some embodiments, two different hexagonal ferrites having the same phase can be combined. The added in Z phase hexagonal ferrite can be considered to be "doped in" to the Y phase hexagonal ferrite material.

Previously, while resonant frequency could be raised in certain materials, these materials tend to have low permeability. For example, $Sr_52Co_2Fe_{12}O_{22}$ (Sr—Co—Y phase hexagonal ferrite) has a resonant frequency well above 1 GHz, but a permeability of only 2. By using the coupled substitution disclosed herein, the permeability can be at least doubled, making for enhanced performance of the material in the 500 MHz to 1 GHz range. For example, high permeability allows for a better miniaturization factor and impedance match to free space, thereby allowing for a reduction of size of components used for radiofrequency equipment.

Example previous solutions have been trying to increase the resonant frequency of $Co_2$—Z phase hexagonal ferrite $(Ba_3Co_2Fe_{24}O_{41})$ by substituting alkali metals for barium, such as disclosed in U.S. Pat. App. No. 2009/0297432, hereby incorporated by reference in its entirety. While $Co_2$—Z material has a permeability in the 8-12 range, it has a maximum useable frequency of about 500 MHz which is below the newer frequency spectrums. Although modest improvements in the resonant frequency are detailed in that application, they have not significantly extended the useable frequency range for $Co_2$—Z phase materials.

Accordingly, disclosed herein are embodiments of hexagonal ferrites that can have high permeability for use in high frequency applications.

In some embodiments, the composite hexagonal ferrite material can be formed from an optimized Y-phase composition, such as having the formula $Sr_{2-x}Na_xCo_{2-x}Sc_xFe_{12}O_{22}$ (0<x<1). Further, Z-phase materials of variations formulations can be added into the y-phase composition to form a material showing optimal properties including Q values >20 at 1 GHz. In some embodiments, the Z-phase and Y-phase can stay as separate phases. The advantage of the two phase blend over previous solutions is the magnetic Q values >20 at 1 GHz were obtained with these stoichiometric deviations. The z-phase material can have the general formula: $Sr_{3-x-y}Ba_xNa_yCo_{2-y}Sc_yFe_{24}O_{41}$ (0<x<3, 0<y<1.5).

The combination of the two material phases can be performed in a number of different ways. In some embodiments, each of these two phases can be initially formed from their precursor materials of appropriate amount and blended separately. Once the proper phase is formed and verified, then both Y-phase and Z-phase may be mixed thoroughly. In some embodiments, the initial oxide blend may be formulated so that the Y and Z phases are those which form naturally upon heating.

Embodiments of the composite material can be incorporated into magnetodielectric antennas, providing them with high efficiency, high bandwidth, and excellent impedance match to free space. For example, embodiments of the disclosure can form high efficiency and high bandwidth antenna materials in the 100 MHz-1 GHz range.

Thus, as shown above, coupled substitutions of elements, such as Na or Sc, into a Sr—Co—Y phase can be performed. This can double the permeability into the 4 to 8 (or about 4 to about 8) range. This can make for enhanced performance in the 500 MHz to 1 GHz range. In addition, an amount of material with Z-phase stoichiometry can improve the magnetic loss at 1 GHz.

As embodiments of the material can contain large amounts of Sc, which tends to be expensive to purchase, it can be advantageous to replace the Sc with less expensive elements such as In and Zr. The Y-phase material incorporating Zr or In can have the following compositions: $Sr_{2-2x}Na_{2x}Zr_xCo_{2-x}Fe_{12}O_{22}$ ($0 \leq x < 1$) and $Sr_{2-x}Na_xIn_x Co_{2-x}Fe_{12}O_{22}$ ($0 \leq x < 1$). The Z-phase material incorporating Zr or In can have the following compositions: $Sr_{3-x-2y}Ba^xNa_{2y}Co_{2-y}Zr_yFe_{24}O_{41}$ ($0 \leq x < 3$ and $0 \leq y < 1$) and $Sr_{3-x-y}Ba_xNa_yCo_{2-y}In_yFe_{24}O_{41}$ ($0 \leq x < 3$ and $0 \leq y < 1$). Thus, combinations of those four materials can improve properties of the final composite hexagonal ferrite material.

Table 1 shows different compositions that can be incorporated into the material, weight being in grams.

TABLE 1

Composite Material Compositions

| Comp-1 | W-1 | Comp-2 | W-2 | Comp-3 | W-3 | Comp-4 | W-4 |
|---|---|---|---|---|---|---|---|
| $Sr_{1.6}Na_{0.4}Sc_{0.4}Co_{1.6}Fe_{12}O_{22}$ | 50 | $Ba_{1.4}Sr_{0.8}Na_{0.8}Co_{1.2}Sc_{0.8}Fe_{24}O_{41}$ | 0 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 49.8 | $Ba_{1.4}Sr_{0.8}Na_{0.8}Co_{1.2}Sc_{0.8}Fe_{24}O_{41}$ | 0.2 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 49.5 | $Ba_{1.4}Sr_{0.8}Na_{0.8}Co_{1.2}Sc_{0.8}Fe_{24}O_{41}$ | 0.5 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 49 | $Ba_{1.4}Sr_{0.8}Na_{0.8}Co_{1.2}Sc_{0.8}Fe_{24}O_{41}$ | 1 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 48 | $Ba_{1.4}Sr_{0.8}Na_{0.8}Co_{1.2}Sc_{0.8}Fe_{24}O_{41}$ | 2 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 45 | $Ba_{1.4}Sr_{0.8}Na_{0.8}Co_{1.2}Sc_{0.8}Fe_{24}O_{41}$ | 5 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 40 | $Ba_{1.4}Sr_{0.8}Na_{0.8}Co_{1.2}Sc_{0.8}Fe_{24}O_{41}$ | 10 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 32.5 | $Ba_{1.4}Sr_{0.8}Na_{0.8}Co_{1.2}Sc_{0.8}Fe_{24}O_{41}$ | 18 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 25 | $Ba_{1.4}Sr_{0.8}Na_{0.8}Co_{1.2}Sc_{0.8}Fe_{24}O_{41}$ | 25 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 17.5 | $Ba_{1.4}Sr_{0.8}Na_{0.8}Co_{1.2}Sc_{0.8}Fe_{24}O_{41}$ | 33 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 10 | $Ba_{1.4}Sr_{0.8}Na_{0.8}Co_{1.2}Sc_{0.8}Fe_{24}O_{41}$ | 40 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 5 | $Ba_{1.4}Sr_{0.8}Na_{0.8}Co_{1.2}Sc_{0.8}Fe_{24}O_{41}$ | 45 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 2 | $Ba_{1.4}Sr_{0.8}Na_{0.8}Co_{1.2}Sc_{0.8}Fe_{24}O_{41}$ | 48 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 1 | $Ba_{1.4}Sr_{0.8}Na_{0.8}Co_{1.2}Sc_{0.8}Fe_{24}O_{41}$ | 49 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 0 | $Ba_{1.4}Sr_{0.8}Na_{0.8}Co_{1.2}Sc_{0.8}Fe_{24}O_{41}$ | 50 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 50 | $Ba_{1.4}Sr_{0.8}Na_{0.8}Co_{1.2}Sc_{0.8}Fe_{24}O_{41}$ | 0 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 49 | $Ba_{1.4}Sr_{0.8}Na_{0.8}Co_{1.2}Sc_{0.8}Fe_{24}O_{41}$ | 1 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 48 | $Ba_{1.4}Sr_{0.8}Na_{0.8}Co_{1.2}Sc_{0.8}Fe_{24}O_{41}$ | 2 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 47.5 | $Ba_{1.4}Sr_{0.8}Na_{0.8}Co_{1.2}Sc_{0.8}Fe_{24}O_{41}$ | 2.5 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 47 | $Ba_{1.4}Sr_{0.8}Na_{0.8}Co_{1.2}Sc_{0.8}Fe_{24}O_{41}$ | 3 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 46 | $Ba_{1.4}Sr_{0.8}Na_{0.8}Co_{1.2}Sc_{0.8}Fe_{24}O_{41}$ | 4 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 45 | $Ba_{1.4}Sr_{0.8}Na_{0.8}Co_{1.2}Sc_{0.8}Fe_{24}O_{41}$ | 5 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 44 | $Ba_{1.4}Sr_{0.8}Na_{0.8}Co_{1.2}Sc_{0.8}Fe_{24}O_{41}$ | 6 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 43 | $Ba_{1.4}Sr_{0.8}Na_{0.8}Co_{1.2}Sc_{0.8}Fe_{24}O_{41}$ | 7 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 42 | $Ba_{1.4}Sr_{0.8}Na_{0.8}Co_{1.2}Sc_{0.8}Fe_{24}O_{41}$ | 8 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 41 | $Ba_{1.4}Sr_{0.8}Na_{0.8}Co_{1.2}Sc_{0.8}Fe_{24}O_{41}$ | 9 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 40 | $Ba_{1.4}Sr_{0.8}Na_{0.8}Co_{1.2}Sc_{0.8}Fe_{24}O_{41}$ | 10 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 47 | $Ba_{1.4}Sr_{0.8}Na_{0.8}Co_{1.2}Sc_{0.8}Fe_{24}O_{41}$ | 3 | $Ba_3Co_2Fe_{24}O_{41}$ | 3 | $Sr_3Co_2Fe_{24}O_{41}$ | |
| $Sr_{1.6}Na_{0.4}Sc_{0.4}Co_{1.6}Fe_{12}O_{22}$ | 46 | $Ba_{1.4}Sr_{0.8}Na_{0.8}Co_{1.2}Sc_{0.8}Fe_{24}O_{41}$ | 4 | $Ba_3Co_2Fe_{24}O_{41}$ | 4 | $Sr_3Co_2Fe_{24}O_{41}$ | |
| $Sr_{1.6}Na_{0.4}Sc_{0.4}Co_{1.6}Fe_{12}O_{22}$ | 47 | $Ba_{1.4}Sr_{0.8}Na_{0.8}Co_{1.2}Sc_{0.8}Fe_{24}O_{41}$ | | $Ba_3Co_2Fe_{24}O_{41}$ | | $Sr_3Co_2Fe_{24}O_{41}$ | 3 |
| $Sr_{1.6}Na_{0.4}Sc_{0.4}Co_{1.6}Fe_{12}O_{22}$ | 46 | $Ba_{1.4}Sr_{0.8}Na_{0.8}Co_{1.2}Sc_{0.8}Fe_{24}O_{41}$ | | $Ba_3Co_2Fe_{24}O_{41}$ | | $Sr_3Co_2Fe_{24}O_{41}$ | 4 |
| $Sr_{1.6}Na_{0.4}Sc_{0.4}Co_{1.6}Fe_{12}O_{22}$ | 47 | $Ba_{1.4}Sr_{0.8}Na_{0.8}Co_{1.2}Sc_{0.8}Fe_{24}O_{41}$ | | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 46 | $Ba_{1.4}Sr_{0.8}Na_{0.8}Co_{1.2}Sc_{0.8}Fe_{24}O_{41}$ | | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 46 | $Ba_{1.4}Sr_{0.8}Na_{0.8}Co_{1.2}Sc_{0.8}Fe_{24}O_{41}$ | 4 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 46 | $Ba_{1.4}Sr_{0.8}Na_{0.8}Co_{1.2}Sc_{0.8}Fe_{24}O_{41}$ | 4 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 46 | $Ba_{1.4}Sr_{0.8}Na_{0.8}Co_{1.2}Sc_{0.8}Fe_{24}O_{41}$ | 4 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 46 | $Ba_{1.4}Sr_{0.8}Na_{0.8}Co_{1.2}Sc_{0.8}Fe_{24}O_{41}$ | 4 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 3.5 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 3.5 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 3.5 | $Ba_3Co_2Fe_{24}O_{41}$ | | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 2.8 | $Ba_3Co_2Fe_{24}O_{41}$ | 0.7 | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 2.8 | $Ba_3Co_2Fe_{24}O_{41}$ | | $Sr_3Co_2Fe_{24}O_{41}$ | 0.7 |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 2.8 | $Ba_3Co_2Fe_{24}O_{41}$ | 0.7 | $Sr_3Co_2Fe_{24}O_{41}$ | 0.7 |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 2.8 | $Ba_3Co_2Fe_{24}O_{41}$ | 0.7 | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 2.8 | $Ba_3Co_2Fe_{24}O_{41}$ | | $Sr_3Co_2Fe_{24}O_{41}$ | 0.7 |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 2.1 | $Ba_3Co_2Fe_{24}O_{41}$ | 1.4 | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 2.1 | $Ba_3Co_2Fe_{24}O_{41}$ | | $Sr_3Co_2Fe_{24}O_{41}$ | 1.4 |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 2.1 | $Ba_3Co_2Fe_{24}O_{41}$ | 1.4 | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 2.1 | $Ba_3Co_2Fe_{24}O_{41}$ | 1.4 | $Sr_3Co_2Fe_{24}O_{41}$ | 1.4 |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 2.1 | $Ba_3Co_2Fe_{24}O_{41}$ | | $Sr_3Co_2Fe_{24}O_{41}$ | 1.4 |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 1.4 | $Ba_3Co_2Fe_{24}O_{41}$ | 2.1 | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 1.4 | $Ba_3Co_2Fe_{24}O_{41}$ | 2.1 | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 1.4 | $Ba_3Co_2Fe_{24}O_{41}$ | 2.1 | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 0.7 | $Ba_3Co_2Fe_{24}O_{41}$ | 2.8 | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 0.7 | $Ba_3Co_2Fe_{24}O_{41}$ | 2.8 | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | 0.7 | $Ba_3Co_2Fe_{24}O_{41}$ | 2.8 | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | | $Ba_3Co_2Fe_{24}O_{41}$ | 3.5 | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | | $Ba_3Co_2Fe_{24}O_{41}$ | 3.5 | $Sr_3Co_2Fe_{24}O_{41}$ | |
| $Sr_{1.6}Na_{0.4}Sc_{0.4}Co_{1.6}Fe_{12}O_{22}$ | 46.5 | $Ba_{1.4}Sr_{0.8}Na_{0.8}Co_{1.2}Sc_{0.8}Fe_{24}O_{41}$ | | $Ba_3Co_2Fe_{24}O_{41}$ | 3.5 | $Sr_3Co_2Fe_{24}O_{41}$ | |

| Comp-5 | W-5 | Comp-6 | W-6 | Comp-7 | W-7 | Total W (gr) |
|---|---|---|---|---|---|---|
| $MnO_2$ | | $Al_2O_3$ | | $SiO_2$ | | 50 |
| $MnO_2$ | | $Al_2O_3$ | | $SiO_2$ | | 50 |

TABLE 1-continued

Composite Material Compositions

| | | | | | | | |
|---|---|---|---|---|---|---|---|
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | | Al$_2$O$_3$ | | SiO$_2$ | | | 50 |
| MnO$_2$ | 0.03 | Al$_2$O$_3$ | 0.1 | SiO$_2$ | | | 50 |
| MnO$_2$ | | Al$_2$O$_3$ | 0.1 | SiO$_2$ | | | 50.03 |
| MnO$_2$ | 0.03 | Al$_2$O$_3$ | | SiO$_2$ | | | 50.1 |
| MnO$_2$ | 0.03 | Al$_2$O$_3$ | 0.1 | SiO$_2$ | | | 50.13 |
| MnO$_2$ | 0.03 | Al$_2$O$_3$ | | SiO$_2$ | 0.1 | | 50.13 |
| MnO$_2$ | | Al$_2$O$_3$ | 0.1 | SiO$_2$ | 0.1 | | 50.23 |
| MnO$_2$ | | Al$_2$O$_3$ | 0.2 | SiO$_2$ | | | 50 |
| MnO$_2$ | | Al$_2$O$_3$ | | SiO$_2$ | | | 50.1 |
| MnO$_2$ | | Al$_2$O$_3$ | | SiO$_2$ | | | 50.2 |
| MnO$_2$ | | Al$_2$O$_3$ | 0.1 | SiO$_2$ | | | 50 |
| MnO$_2$ | | Al$_2$O$_3$ | 0.1 | SiO$_2$ | | | 50 |
| MnO$_2$ | | Al$_2$O$_3$ | 0.2 | SiO$_2$ | | | 50.1 |
| MnO$_2$ | | Al$_2$O$_3$ | 0.2 | SiO$_2$ | | | 50.1 |
| MnO$_2$ | | Al$_2$O$_3$ | | SiO$_2$ | | | 50.2 |
| MnO$_2$ | | Al$_2$O$_3$ | | SiO$_2$ | | | 50.2 |
| MnO$_2$ | | Al$_2$O$_3$ | 0.1 | SiO$_2$ | | | 50 |
| MnO$_2$ | | Al$_2$O$_3$ | 0.1 | SiO$_2$ | | | 50 |
| MnO$_2$ | | Al$_2$O$_3$ | 0.2 | SiO$_2$ | | | 50.1 |
| MnO$_2$ | | Al$_2$O$_3$ | 0.2 | SiO$_2$ | | | 50.1 |
| MnO$_2$ | | Al$_2$O$_3$ | | SiO$_2$ | | | 50.2 |
| MnO$_2$ | | Al$_2$O$_3$ | | SiO$_2$ | | | 50.2 |
| MnO$_2$ | | Al$_2$O$_3$ | | SiO$_2$ | | | 50 |
| MnO$_2$ | | Al$_2$O$_3$ | 0.1 | SiO$_2$ | | | 50.1 |
| MnO$_2$ | | Al$_2$O$_3$ | 0.2 | SiO$_2$ | | | 50.2 |
| MnO$_2$ | | Al$_2$O$_3$ | | SiO$_2$ | | | 50 |
| MnO$_2$ | | Al$_2$O$_3$ | 0.1 | SiO$_2$ | | | 50.1 |
| MnO$_2$ | | Al$_2$O$_3$ | 0.2 | SiO$_2$ | | | 50.2 |
| MnO$_2$ | | Al$_2$O$_3$ | | SiO$_2$ | | | 50 |
| MnO$_2$ | | Al$_2$O$_3$ | 0.1 | SiO$_2$ | | | 50.1 |
| MnO$_2$ | | Al$_2$O$_3$ | 0.2 | SiO$_2$ | | | 50.2 |

It will be understood that rounding off weight of precursor chemical substances made in to composition mixture sometimes gives slightly higher than 50 grams, and these numbers can be normalized to 50 grams.

As shown in the above table, a number of different compositions can fall within the scope of this disclosure. FIGS. 3A-I illustrate the real permeability of the compositions detailed above in Table 1. As shown, embodiments of the disclosure can have high real permeability at a range of frequencies, which can be advantageous for miniaturization and impedance match in free space. For example, embodiments of the material can have real permeability of above 4, 5, 6, 7, 8, 9, or 10 (or above about 4, about 5, about 6, about 7, about 8, about 9, or about 10). Embodiments of the material can have real permeability of 4, 5, 6, 7, 8, 9, or 10 (or about 4, about 5, about 6, about 7, about 8, about 9, or about 10). Embodiments of the material can have real permeability of below 4, 5, 6, 7, 8, 9, or 10 (or below about 4, about 5, about 6, about 7, about 8, about 9, or about 10).

FIGS. 4A-I show imaginary permeability for embodiments of the disclosed material compositions. As shown, the imaginary permeability can remain well under 1 (or under about 1) through at least 1 GHz, as well as above 1 GHz. In some embodiments, the imaginary permeability can be under 0.75, 0.5, 0.25, or 0.1 (or below about 0.75, about 0.5, about 0.25, or about 0.1). In some embodiments, the imaginary permeability can be 0.75, 0.5, 0.25, or 0.1 (or about 0.75, about 0.5, about 0.25, or about 0.1). In some embodiments, the imaginary permeability can be over 0.75, 0.5, 0.25, or 0.1 (or over about 0.75, about 0.5, about 0.25, or about 0.1). Imaginary permeability is associated with absorption of energy from applied magnetic field in to material or attenuation of electromagnetic signal as it transfer through magnetic material and ideally that needs to be zero. It can be advantageous to lower and/or remove imaginary permeability.

FIGS. 5A-I illustrate the quality factor (e.g., real permeability/imaginary permeability) for embodiments of the disclosure. The quality factor is the inverse of the loss tangent of the material. Accordingly, as the imaginary permeability increases, the overall quality factor of the material decreases. A lower quality factor is less useful an RF component than a higher quality factor. Thus, it can be advantageous to maintain a high quality factor at frequency ranges of desired applications. For instance, the quality factor can be above 5, 10, 15, 20, 25, 30, 35, 40, 45, or 50 (or above about 5, about 10, about 15, about 20, about 25, about 30, about 35, about 40, about 45, or about 50) depending on the particular frequency being tested, as shown in FIGS. 5A-I. Advantageously, embodiments of the material can have a quality factor of greater than 15 or greater than 20 (or great than about 15 or about 20) at 1 GHz, allowing for embodiments of the material to be used at these high frequencies (and beyond). Embodiments of the material can have a quality factor of 15 or 20 (or about 15 or about 20) at 1 GHz.

Table 2 summarizes certain embodiments of compositions, along with their respective real permeability and quality factor, at 1 GHz.

TABLE 2

| Serial No. | Composition | Weight (g) | $\mu'$ | $Q = (\mu'/\mu'')$ |
|---|---|---|---|---|
| 1 | $Sr_{1.6}Na_{0.4}Sc_{0.4}Co_{1.6}Fe_{12}O_{22}$ | 50 | 6.9 | 15 |
| 2 | $Sr_{1.6}Na_{0.4}Sc_{0.4}Co_{1.6}Fe_{12}O_{22}$ | 49.8 | 7.1 | 12.7 |
|  | $Ba_{1.4}Sr_{0.8}Na_{0.8}Co_{1.2}Sc_{0.8}Fe_{24}O_{41}$ | 0.2 |  |  |
| 3 | $Sr_{1.6}Na_{0.4}Sc_{0.4}Co_{1.6}Fe_{12}O_{22}$ | 49.5 | 7 | 15.9 |
|  | $Ba_{1.4}Sr_{0.8}Na_{0.8}Co_{1.2}Sc_{0.8}Fe_{24}O_{41}$ | 0.5 |  |  |
| 4 | $Sr_{1.6}Na_{0.4}Sc_{0.4}Co_{1.6}Fe_{12}O_{22}$ | 49 | 7.2 | 15 |
|  | $Ba_{1.4}Sr_{0.8}Na_{0.8}Co_{1.2}Sc_{0.8}Fe_{24}O_{41}$ | 1 |  |  |
| 5 | $Sr_{1.6}Na_{0.4}Sc_{0.4}Co_{1.6}Fe_{12}O_{22}$ | 48 | 6.8 | 17.9 |
|  | $Ba_{1.4}Sr_{0.8}Na_{0.8}Co_{1.2}Sc_{0.8}Fe_{24}O_{41}$ | 2 |  |  |
| 6 | $Sr_{1.6}Na_{0.4}Sc_{0.4}Co_{1.6}Fe_{12}O_{22}$ | 45 | 6.9 | 17.5 |
|  | $Ba_{1.4}Sr_{0.8}Na_{0.8}Co_{1.2}Sc_{0.8}Fe_{24}O_{41}$ | 5 |  |  |
| 7 | $Sr_{1.6}Na_{0.4}Sc_{0.4}Co_{1.6}Fe_{12}O_{22}$ | 40 | 8.2 | 13.1 |
|  | $Ba_{1.4}Sr_{0.8}Na_{0.8}Co_{1.2}Sc_{0.8}Fe_{24}O_{41}$ | 10 |  |  |
| 8 | $Sr_{1.6}Na_{0.4}Sc_{0.4}Co_{1.6}Fe_{12}O_{22}$ | 32.5 | 8.4 | 6.5 |
|  | $Ba_{1.4}Sr_{0.8}Na_{0.8}Co_{1.2}Sc_{0.8}Fe_{24}O_{41}$ | 18 |  |  |
| 9 | $Sr_{1.6}Na_{0.4}Sc_{0.4}Co_{1.6}Fe_{12}O_{22}$ | 25 | 7.3 | 4.6 |
|  | $Ba_{1.4}Sr_{0.8}Na_{0.8}Co_{1.2}Sc_{0.8}Fe_{24}O_{41}$ | 25 |  |  |
| 10 | $Sr_{1.6}Na_{0.4}Sc_{0.4}Co_{1.6}Fe_{12}O_{22}$ | 17.5 | 6.1 | 3.7 |
|  | $Ba_{1.4}Sr_{0.8}Na_{0.8}Co_{1.2}Sc_{0.8}Fe_{24}O_{41}$ | 33 |  |  |
| 11 | $Sr_{1.6}Na_{0.4}Sc_{0.4}Co_{1.6}Fe_{12}O_{22}$ | 10 | 4.6 | 3 |
|  | $Ba_{1.4}Sr_{0.8}Na_{0.8}Co_{1.2}Sc_{0.8}Fe_{24}O_{41}$ | 40 |  |  |
| 12 | $Sr_{1.6}Na_{0.4}Sc_{0.4}Co_{1.6}Fe_{12}O_{22}$ | 5 | 3.5 | 2.9 |
|  | $Ba_{1.4}Sr_{0.8}Na_{0.8}Co_{1.2}Sc_{0.8}Fe_{24}O_{41}$ | 45 |  |  |
| 13 | $Sr_{1.6}Na_{0.4}Sc_{0.4}Co_{1.6}Fe_{12}O_{22}$ | 2 | 3 | 2.6 |
|  | $Ba_{1.4}Sr_{0.8}Na_{0.8}Co_{1.2}Sc_{0.8}Fe_{24}O_{41}$ | 48 |  |  |
| 14 | $Sr_{1.6}Na_{0.4}Sc_{0.4}Co_{1.6}Fe_{12}O_{22}$ | 1 | 2.8 | 2.6 |
|  | $Ba_{1.4}Sr_{0.8}Na_{0.8}Co_{1.2}Sc_{0.8}Fe_{24}O_{41}$ | 49 |  |  |
| 15 | $Sr_{1.6}Na_{0.4}Sc_{0.4}Co_{1.6}Fe_{12}O_{22}$ | 0 | 2.6 | 2.6 |
|  | $Ba_{1.4}Sr_{0.8}Na_{0.8}Co_{1.2}Sc_{0.8}Fe_{24}O_{41}$ | 50 |  |  |
| 16 | $Sr_{1.6}Na_{0.4}Sc_{0.4}Co_{1.6}Fe_{12}O_{22}$ | 50 | 6.9 | 15.2 |
|  | $Ba_{1.4}Sr_{0.8}Na_{0.8}Co_{1.2}Sc_{0.8}Fe_{24}O_{41}$ | 0 |  |  |
| 17 | $Sr_{1.6}Na_{0.4}Sc_{0.4}Co_{1.6}Fe_{12}O_{22}$ | 49 | 7 | 16.3 |
|  | $Ba_{1.4}Sr_{0.8}Na_{0.8}Co_{1.2}Sc_{0.8}Fe_{24}O_{41}$ | 1 |  |  |
| 18 | $Sr_{1.6}Na_{0.4}Sc_{0.4}Co_{1.6}Fe_{12}O_{22}$ | 48 | 7.1 | 17.3 |
|  | $Ba_{1.4}Sr_{0.8}Na_{0.8}Co_{1.2}Sc_{0.8}Fe_{24}O_{41}$ | 2 |  |  |
| 19 | $Sr_{1.6}Na_{0.4}Sc_{0.4}Co_{1.6}Fe_{12}O_{22}$ | 47.5 | 6.9 | 17 |
|  | $Ba_{1.4}Sr_{0.8}Na_{0.8}Co_{1.2}Sc_{0.8}Fe_{24}O_{41}$ | 2.5 |  |  |
| 20 | $Sr_{1.6}Na_{0.4}Sc_{0.4}Co_{1.6}Fe_{12}O_{22}$ | 47 | 7 | 17.6 |
|  | $Ba_{1.4}Sr_{0.8}Na_{0.8}Co_{1.2}Sc_{0.8}Fe_{24}O_{41}$ | 3 |  |  |
| 21 | $Sr_{1.6}Na_{0.4}Sc_{0.4}Co_{1.6}Fe_{12}O_{22}$ | 46 | 7.2 | 17.4 |
|  | $Ba_{1.4}Sr_{0.8}Na_{0.8}Co_{1.2}Sc_{0.8}Fe_{24}O_{41}$ | 4 |  |  |
| 22 | $Sr_{1.6}Na_{0.4}Sc_{0.4}Co_{1.6}Fe_{12}O_{22}$ | 45 | 7.4 | 16.8 |
|  | $Ba_{1.4}Sr_{0.8}Na_{0.8}Co_{1.2}Sc_{0.8}Fe_{24}O_{41}$ | 5 |  |  |
| 23 | $Sr_{1.6}Na_{0.4}Sc_{0.4}Co_{1.6}Fe_{12}O_{22}$ | 44 | 7.3 | 17 |
|  | $Ba_{1.4}Sr_{0.8}Na_{0.8}Co_{1.2}Sc_{0.8}Fe_{24}O_{41}$ | 6 |  |  |
| 24 | $Sr_{1.6}Na_{0.4}Sc_{0.4}Co_{1.6}Fe_{12}O_{22}$ | 43 | 7.5 | 16.8 |
|  | $Ba_{1.4}Sr_{0.8}Na_{0.8}Co_{1.2}Sc_{0.8}Fe_{24}O_{41}$ | 7 |  |  |
| 25 | $Sr_{1.6}Na_{0.4}Sc_{0.4}Co_{1.6}Fe_{12}O_{22}$ | 42 | 8 | 15.1 |
|  | $Ba_{1.4}Sr_{0.8}Na_{0.8}Co_{1.2}Sc_{0.8}Fe_{24}O_{41}$ | 8 |  |  |
| 26 | $Sr_{1.6}Na_{0.4}Sc_{0.4}Co_{1.6}Fe_{12}O_{22}$ | 41 | 7.8 | 16.4 |
|  | $Ba_{1.4}Sr_{0.8}Na_{0.8}Co_{1.2}Sc_{0.8}Fe_{24}O_{41}$ | 9 |  |  |
| 27 | $Sr_{1.6}Na_{0.4}Sc_{0.4}Co_{1.6}Fe_{12}O_{22}$ | 40 | 8 | 9.1 |
|  | $Ba_{1.4}Sr_{0.8}Na_{0.8}Co_{1.2}Sc_{0.8}Fe_{24}O_{41}$ | 10 |  |  |
| 28 | $Sr_{1.6}Na_{0.4}Sc_{0.4}Co_{1.6}Fe_{12}O_{22}$ | 47 | 6.9 | 17.3 |
|  | $Ba_{1.4}Sr_{0.8}Na_{0.8}Co_{1.2}Sc_{0.8}Fe_{24}O_{41}$ | 3 |  |  |
| 29 | $Sr_{1.6}Na_{0.4}Sc_{0.4}Co_{1.6}Fe_{12}O_{22}$ | 46 | 6.7 | 18.2 |
|  | $Ba_{1.4}Sr_{0.8}Na_{0.8}Co_{1.2}Sc_{0.8}Fe_{24}O_{41}$ | 4 |  |  |
| 30 | $Sr_{1.6}Na_{0.4}Sc_{0.4}Co_{1.6}Fe_{12}O_{22}$ | 47 | 5.4 | 21.3 |
|  | $Ba_3Co_2Fe_{24}O_{41}$ | 3 |  |  |
| 31 | $Sr_{1.6}Na_{0.4}Sc_{0.4}Co_{1.6}Fe_{12}O_{22}$ | 46 | 5.3 | 20.5 |
|  | $Ba_3Co_2Fe_{24}O_{41}$ | 4 |  |  |
| 32 | $Sr_{1.6}Na_{0.4}Sc_{0.4}Co_{1.6}Fe_{12}O_{22}$ | 47 | 7.9 | 7 |
|  | $Sr_3Co_2Fe_{24}O_{41}$ | 3 |  |  |
| 33 | $Sr_{1.6}Na_{0.4}Sc_{0.4}Co_{1.6}Fe_{12}O_{22}$ | 46 | 6.5 | 4.7 |
|  | $Sr_3Co_2Fe_{24}O_{41}$ | 4 |  |  |
| 34 | $Sr_{1.6}Na_{0.4}Sc_{0.4}Co_{1.6}Fe_{12}O_{22}$ | 46 | 7.1 | 16.9 |
|  | $Ba_{1.4}Sr_{0.8}Na_{0.8}Co_{1.2}Sc_{0.8}Fe_{24}O_{41}$ | 4 |  |  |
| 35 | $Sr_{1.6}Na_{0.4}Sc_{0.4}Co_{1.6}Fe_{12}O_{22}$ | 46 | 6.7 | 18.3 |
|  | $Ba_{1.4}Sr_{0.8}Na_{0.8}Co_{1.2}Sc_{0.8}Fe_{24}O_{41}$ | 4 |  |  |
|  | $Al_2O_3$ | .1 |  |  |
| 36 | $Sr_{1.6}Na_{0.4}Sc_{0.4}Co_{1.6}Fe_{12}O_{22}$ | 46 | 6.8 | 17.9 |
|  | $Ba_{1.4}Sr_{0.8}Na_{0.8}Co_{1.2}Sc_{0.8}Fe_{24}O_{41}$ | 4 |  |  |
|  | $MnO_2$ | .03 |  |  |
|  | $Al_2O_3$ | .1 |  |  |
| 37 | $Sr_{1.6}Na_{0.4}Sc_{0.4}Co_{1.6}Fe_{12}O_{22}$ | 46 | 6.9 | 17.6 |
|  | $Ba_{1.4}Sr_{0.8}Na_{0.8}Co_{1.2}Sc_{0.8}Fe_{24}O_{41}$ | 4 |  |  |
|  | $MnO_2$ | .03 |  |  |
|  | $SiO_2$ | .1 |  |  |
| 38 | $Sr_{1.6}Na_{0.4}Sc_{0.4}Co_{1.6}Fe_{12}O_{22}$ | 46 | 7 | 16.9 |
|  | $Ba_{1.4}Sr_{0.8}Na_{0.8}Co_{1.2}Sc_{0.8}Fe_{24}O_{41}$ | 4 |  |  |
|  | $MnO_2$ | .03 |  |  |
|  | $Al_2O_3$ | .1 |  |  |
|  | $SiO_2$ | .1 |  |  |
| 39 | $Sr_{1.6}Na_{0.4}Sc_{0.4}Co_{1.6}Fe_{12}O_{22}$ | 46.5 | 6.9 | 17.4 |
|  | $Ba_{1.4}Sr_{0.8}Na_{0.8}Co_{1.2}Sc_{0.8}Fe_{24}O_{41}$ | 3.5 |  |  |
| 40 | $Sr_{1.6}Na_{0.4}Sc_{0.4}Co_{1.6}Fe_{12}O_{22}$ | 46.5 | 6.4 | 18.7 |
|  | $Ba_{1.4}Sr_{0.8}Na_{0.8}Co_{1.2}Sc_{0.8}Fe_{24}O_{41}$ | 2.8 |  |  |
|  | $Ba_3Co_2Fe_{24}O_{41}$ | .7 |  |  |
| 41 | $Sr_{1.6}Na_{0.4}Sc_{0.4}Co_{1.6}Fe_{12}O_{22}$ | 46.5 | 6.3 | 19.5 |
|  | $Ba_{1.4}Sr_{0.8}Na_{0.8}Co_{1.2}Sc_{0.8}Fe_{24}O_{41}$ | 2.1 |  |  |
|  | $Ba_3Co_2Fe_{24}O_{41}$ | 1.4 |  |  |
| 42 | $Sr_{1.6}Na_{0.4}Sc_{0.4}Co_{1.6}Fe_{12}O_{22}$ | 46.5 | 6.2 | 19.9 |
|  | $Ba_{1.4}Sr_{0.8}Na_{0.8}Co_{1.2}Sc_{0.8}Fe_{24}O_{41}$ | 1.4 |  |  |
|  | $Ba_3Co_2Fe_{24}O_{41}$ | 2.1 |  |  |
| 43 | $Sr_{1.6}Na_{0.4}Sc_{0.4}Co_{1.6}Fe_{12}O_{22}$ | 46.5 | 6.6 | 16 |
|  | $Ba_{1.4}Sr_{0.8}Na_{0.8}Co_{1.2}Sc_{0.8}Fe_{24}O_{41}$ | .7 |  |  |
|  | $Ba_3Co_2Fe_{24}O_{41}$ | 2.8 |  |  |
| 44 | $Sr_{1.6}Na_{0.4}Sc_{0.4}Co_{1.6}Fe_{12}O_{22}$ | 46.5 | 6.8 | 12.9 |
|  | $Ba_3Co_2Fe_{24}O_{41}$ | 3.5 |  |  |
| 45 | $Sr_{1.6}Na_{0.4}Sc_{0.4}Co_{1.6}Fe_{12}O_{22}$ | 46.5 | 7.3 | 15.5 |
|  | $Ba_{1.4}Sr_{0.8}Na_{0.8}Co_{1.2}Sc_{0.8}Fe_{24}O_{41}$ | 2.8 |  |  |
|  | $Sr_3Co_2Fe_{24}O_{41}$ | .7 |  |  |
| 46 | $Sr_{1.6}Na_{0.4}Sc_{0.4}Co_{1.6}Fe_{12}O_{22}$ | 46.5 | 7.2 | 14.6 |
|  | $Ba_{1.4}Sr_{0.8}Na_{0.8}Co_{1.2}Sc_{0.8}Fe_{24}O_{41}$ | 2.1 |  |  |
|  | $Sr_3Co_2Fe_{24}O_{41}$ | 1.4 |  |  |

TABLE 2-continued

Compositional Data at 1 GHz

| Serial No. | Composition | Weight (g) | µ' | Q = (µ'/µ'') |
|---|---|---|---|---|
| 47 | $Sr_{1.6}Na_{0.4}Sc_{0.4}Co_{1.6}Fe_{12}O_{22}$ | 46.5 | 7 | 16.3 |
|  | $Ba_{1.4}Sr_{0.8}Na_{0.8}Co_{1.2}Sc_{0.8}Fe_{24}O_{41}$ | 3.5 | | |
|  | $Al_2O_3$ | .1 | | |
| 48 | $Sr_{1.6}Na_{0.4}Sc_{0.4}Co_{1.6}Fe_{12}O_{22}$ | 46.5 | 6.4 | 18.6 |
|  | $Ba_{1.4}Sr_{0.8}Na_{0.8}Co_{1.2}Sc_{0.8}Fe_{24}O_{41}$ | 2.8 | | |
|  | $Ba_3Co_2Fe_{24}O_{41}$ | .7 | | |
|  | $Al_2O_3$ | .1 | | |
| 49 | $Sr_{1.6}Na_{0.4}Sc_{0.4}Co_{1.6}Fe_{12}O_{22}$ | 46.5 | 6.3 | 18.6 |
|  | $Ba_{1.4}Sr_{0.8}Na_{0.8}Co_{1.2}Sc_{0.8}Fe_{24}O_{41}$ | 2.1 | | |
|  | $Ba_3Co_2Fe_{24}O_{41}$ | 1.4 | | |
|  | $Al_2O_3$ | .1 | | |
| 50 | $Sr_{1.6}Na_{0.4}Sc_{0.4}Co_{1.6}Fe_{12}O_{22}$ | 46.5 | 6.2 | 18.5 |
|  | $Ba_{1.4}Sr_{0.8}Na_{0.8}Co_{1.2}Sc_{0.8}Fe_{24}O_{41}$ | 1.4 | | |
|  | $Ba_3Co_2Fe_{24}O_{41}$ | 2.1 | | |
|  | $Al_2O_3$ | .1 | | |
| 51 | $Sr_{1.6}Na_{0.4}Sc_{0.4}Co_{1.6}Fe_{12}O_{22}$ | 46.5 | 6 | 19.4 |
|  | $Ba_{1.4}Sr_{0.8}Na_{0.8}Co_{1.2}Sc_{0.8}Fe_{24}O_{41}$ | .7 | | |
|  | $Ba_3Co_2Fe_{24}O_{41}$ | 2.8 | | |
|  | $Al_2O_3$ | .1 | | |
| 52 | $Sr_{1.6}Na_{0.4}Sc_{0.4}Co_{1.6}Fe_{12}O_{22}$ | 46.5 | 6.4 | 14.5 |
|  | $Ba_3Co_2Fe_{24}O_{41}$ | 3.5 | | |
|  | $Al_2O_3$ | .1 | | |
| 53 | $Sr_{1.6}Na_{0.4}Sc_{0.4}Co_{1.6}Fe_{12}O_{22}$ | 46.5 | 7.1 | 16 |
|  | $Ba_{1.4}Sr_{0.8}Na_{0.8}Co_{1.2}Sc_{0.8}Fe_{24}O_{41}$ | 2.8 | | |
|  | $Sr_3Co_2Fe_{24}O_{41}$ | .7 | | |
|  | $Al_2O_3$ | .1 | | |
| 54 | $Sr_{1.6}Na_{0.4}Sc_{0.4}Co_{1.6}Fe_{12}O_{22}$ | 46.5 | 6.8 | 16.7 |
|  | $Ba_{1.4}Sr_{0.8}Na_{0.8}Co_{1.2}Sc_{0.8}Fe_{24}O_{41}$ | 2.1 | | |
|  | $Sr_3Co_2Fe_{24}O_{41}$ | 1.4 | | |
|  | $Al_2O_3$ | .1 | | |
| 55 | $Sr_{1.6}Na_{0.4}Sc_{0.4}Co_{1.6}Fe_{12}O_{22}$ | 46.5 | 6.8 | 17 |
|  | $Ba_{1.4}Sr_{0.8}Na_{0.8}Co_{1.2}Sc_{0.8}Fe_{24}O_{41}$ | 3.5 | | |
|  | $Al_2O_3$ | .2 | | |
| 56 | $Sr_{1.6}Na_{0.4}Sc_{0.4}Co_{1.6}Fe_{12}O_{22}$ | 46.5 | 6.7 | 17.5 |
|  | $Ba_{1.4}Sr_{0.8}Na_{0.8}Co_{1.2}Sc_{0.8}Fe_{24}O_{41}$ | 2.8 | | |
|  | $Ba_3Co_2Fe_{24}O_{41}$ | .7 | | |
|  | $Al_2O_3$ | .2 | | |
| 57 | $Sr_{1.6}Na_{0.4}Sc_{0.4}Co_{1.6}Fe_{12}O_{22}$ | 46.5 | 6.4 | 18 |
|  | $Ba_{1.4}Sr_{0.8}Na_{0.8}Co_{1.2}Sc_{0.8}Fe_{24}O_{41}$ | 2.1 | | |
|  | $Ba_3Co_2Fe_{24}O_{41}$ | 1.4 | | |
|  | $Al_2O_3$ | .2 | | |
| 58 | $Sr_{1.6}Na_{0.4}Sc_{0.4}Co_{1.6}Fe_{12}O_{22}$ | 46.5 | 6.1 | 16.9 |
|  | $Ba_{1.4}Sr_{0.8}Na_{0.8}Co_{1.2}Sc_{0.8}Fe_{24}O_{41}$ | 1.4 | | |
|  | $Ba_3Co_2Fe_{24}O_{41}$ | 2.1 | | |
|  | $Al_2O_3$ | .2 | | |
| 59 | $Sr_{1.6}Na_{0.4}Sc_{0.4}Co_{1.6}Fe_{12}O_{22}$ | 46.5 | 6.6 | 13.7 |
|  | $Ba_{1.4}Sr_{0.8}Na_{0.8}Co_{1.2}Sc_{0.8}Fe_{24}O_{41}$ | .7 | | |
|  | $Ba_3Co_2Fe_{24}O_{41}$ | 2.8 | | |
|  | $Al_2O_3$ | .2 | | |
| 60 | $Sr_{1.6}Na_{0.4}Sc_{0.4}Co_{1.6}Fe_{12}O_{22}$ | 46.5 | 6.6 | 12.4 |
|  | $Ba_3Co_2Fe_{24}O_{41}$ | 3.5 | | |
|  | $Al_2O_3$ | .2 | | |
| 61 | $Sr_{1.6}Na_{0.4}Sc_{0.4}Co_{1.6}Fe_{12}O_{22}$ | 46.5 | 7.1 | 16.5 |
|  | $Ba_{1.4}Sr_{0.8}Na_{0.8}Co_{1.2}Sc_{0.8}Fe_{24}O_{41}$ | 2.8 | | |
|  | $Sr_3Co_2Fe_{24}O_{41}$ | .7 | | |
|  | $Al_2O_3$ | .2 | | |
| 62 | $Sr_{1.6}Na_{0.4}Sc_{0.4}Co_{1.6}Fe_{12}O_{22}$ | 46.5 | 7.4 | 13.5 |
|  | $Ba_{1.4}Sr_{0.8}Na_{0.8}Co_{1.2}Sc_{0.8}Fe_{24}O_{41}$ | 2.1 | | |
|  | $Sr_3Co_2Fe_{24}O_{41}$ | 1.4 | | |
|  | $Al_2O_3$ | .2 | | |

In some embodiments, the composite material can be a mixture of $Sr_{1.6}Na_{0.4}Sc_{0.4}Co_{1.6}Fe_{12}O_{22}$ (Y-phase) and $Ba_3Co_2Fe_{24}O_{41}$ (Z-phase). The material can be 47 g (or about 47 g) $Sr_{1.6}Na_{0.4}Sc_{0.4}Co_{1.6}Fe_{12}O_{22}$ and 3 g (or about 3 g) $Ba_3Co_2Fe_{24}O_{41}$. In some embodiments, the material can be 46 g (or about 46 g) $Sr_{1.6}Na_{0.4}Sc_{0.4}Co_{1.6}Fe_{12}O_{22}$ and 4 g (or about 4 g) $Ba_3Co_2Fe_{24}O_{41}$.

In some embodiments, the composite material can be made of $Sr_{1.6}Na_{0.4}Sc_{0.4}Co_{1.6}Fe_{12}O_{22}$, $Ba_{1.4}Sr_{0.8}Na_{0.8}Co_{1.2}Sc_{0.8}Fe_{24}O_{41}$, $MnO_2$, $Al_2O_3$, and $SiO_2$. The material can be 46 g (or about 46 g) of $Sr_{1.6}Na_{0.4}Sc_{0.4}Co_{1.6}Fe_{12}O_{22}$, 4 g (or about 4 g) $Ba_{1.4}Sr_{0.8}Na_{0.8}Co_{1.2}Sc_{0.8}Fe_{24}O_{41}$, 0.03 g (or about 0.03 g) $MnO_2$, 0.1 g (or about 0.1 g) $Al_2O_3$, and 0.1 g (or about 0.1 g) $SiO_2$.

In some embodiments, the additional materials which can be included into the composite, such as $Al_2O_3$, $Sr_3Co_2Fe_{24}O_{41}$, etc. can be used to inhibit grain growth or modify grain boundary chemistry. In some embodiments, they may form into separate phases as well. In some embodiments, one or more of these tertiary phases can be added into the composite material.

Further, FIG. 6 shows a summary of the data in Table 2. As shown, embodiments of the disclosure can have a quality factor of greater than 15, 16, 17, 18, 19, or 20 (or greater than about 15, about 16, about 17, about 18, about 19, or about 20) at a 1 GHz frequency. In some embodiments, the material can have a quality factor of less than 25, 24, 23, 22, 21, 20, 19, 18, or 17 (or less than about 25, about 24, about 23, about 22, about 21, about 20, about 19, about 18, or about 17) at a 1 GHz frequency. In some embodiments, the material can have a quality factor of 25, 24, 23, 22, 21, 20, 19, 18, or 17 (or about 25, about 24, about 23, about 22, about 21, about 20, about 19, about 18, or about 17) at a 1 GHz frequency. Further, embodiments of the disclosure can have a real permeability of above 5, 6, 7, 8, or 9 (or above about 5, about 6, about 7, about 8, or about 9) at 1 GHz. In some embodiments, the material can have a real permeability of below 10, 9, 8, or 7 (or below about 10, about 9, about 8, or about 7) at 1 GHz. In some embodiments, the material can have a real permeability of below 10, 9, 8, 7, 6, 5 (or below about 10, about 9, about 8, about 7, about 6, or about 5) at 1 GHz. Thus, embodiments of the disclosure can contain both high quality factors as well as high real permeability, making the material particularly useful for radiofrequency applications.

Table 3 illustrates further compositions which can be useful for high frequency applications.

TABLE 3

Composition Compositions

| Composition-1 | Weight-1 | Composition-2 | Weight-2 | Total Weight (gr) |
|---|---|---|---|---|
| $(Sr_{1.6}Na_{0.4}Sc_{0.4}Co_{1.6}Fe_{12}O_{22})$ | 50 | $NaHCO_3$ | 0 | 50 |
| $(Sr_{1.6}Na_{0.4}Sc_{0.4}Co_{1.6}Fe_{12}O_{22})$ | 49.95 | $NaHCO_3$ | 0.05 | 50 |
| $(Sr_{1.6}Na_{0.4}Sc_{0.4}Co_{1.6}Fe_{12}O_{22})$ | 49.9 | $NaHCO_3$ | 0.1 | 50 |
| $(Sr_{1.6}Na_{0.4}Sc_{0.4}Co_{1.6}Fe_{12}O_{22})$ | 49.8 | $NaHCO_3$ | 0.2 | 50 |
| $(Sr_{1.6}Na_{0.4}Sc_{0.4}Co_{1.6}Fe_{12}O_{22})$ | 49.5 | $NaHCO_3$ | 0.5 | 50 |
| $(Sr_{1.6}Na_{0.4}Sc_{0.4}Co_{1.6}Fe_{12}O_{22})$ | 49.95 | $K_2CO_3$ | 0.05 | 50 |
| $(Sr_{1.6}Na_{0.4}Sc_{0.4}Co_{1.6}Fe_{12}O_{22})$ | 49.9 | $K_2CO_3$ | 0.1 | 50 |
| $(Sr_{1.6}Na_{0.4}Sc_{0.4}Co_{1.6}Fe_{12}O_{22})$ | 49.8 | $K_2CO_3$ | 0.2 | 50 |
| $(Sr_{1.6}Na_{0.4}Sc_{0.4}Co_{1.6}Fe_{12}O_{22})$ | 49.5 | $K_2CO_3$ | 0.5 | 50 |

Figure 7:
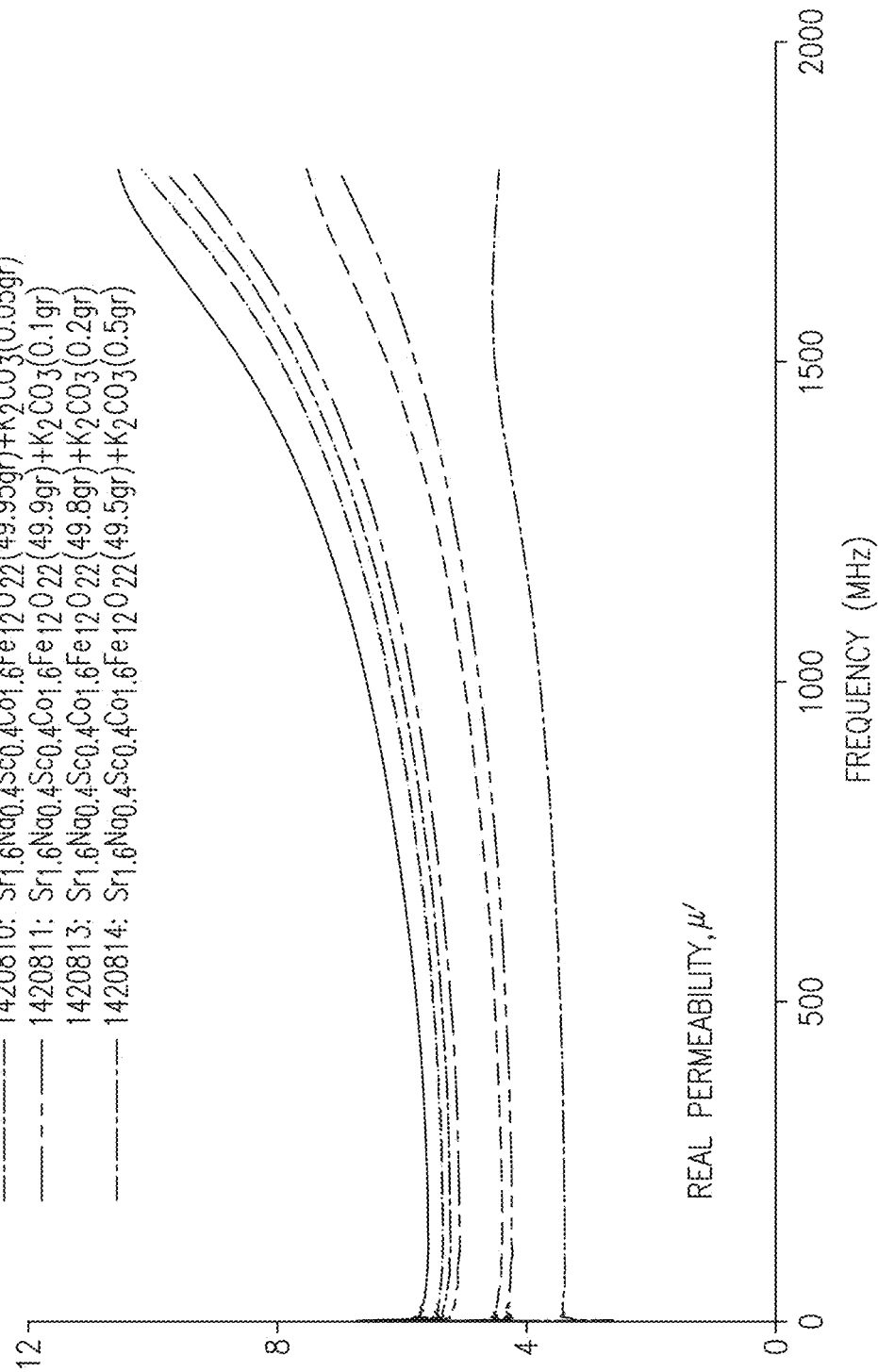
FIG. 7 illustrates real permeability of embodiments of the disclosure.
Figure 8:
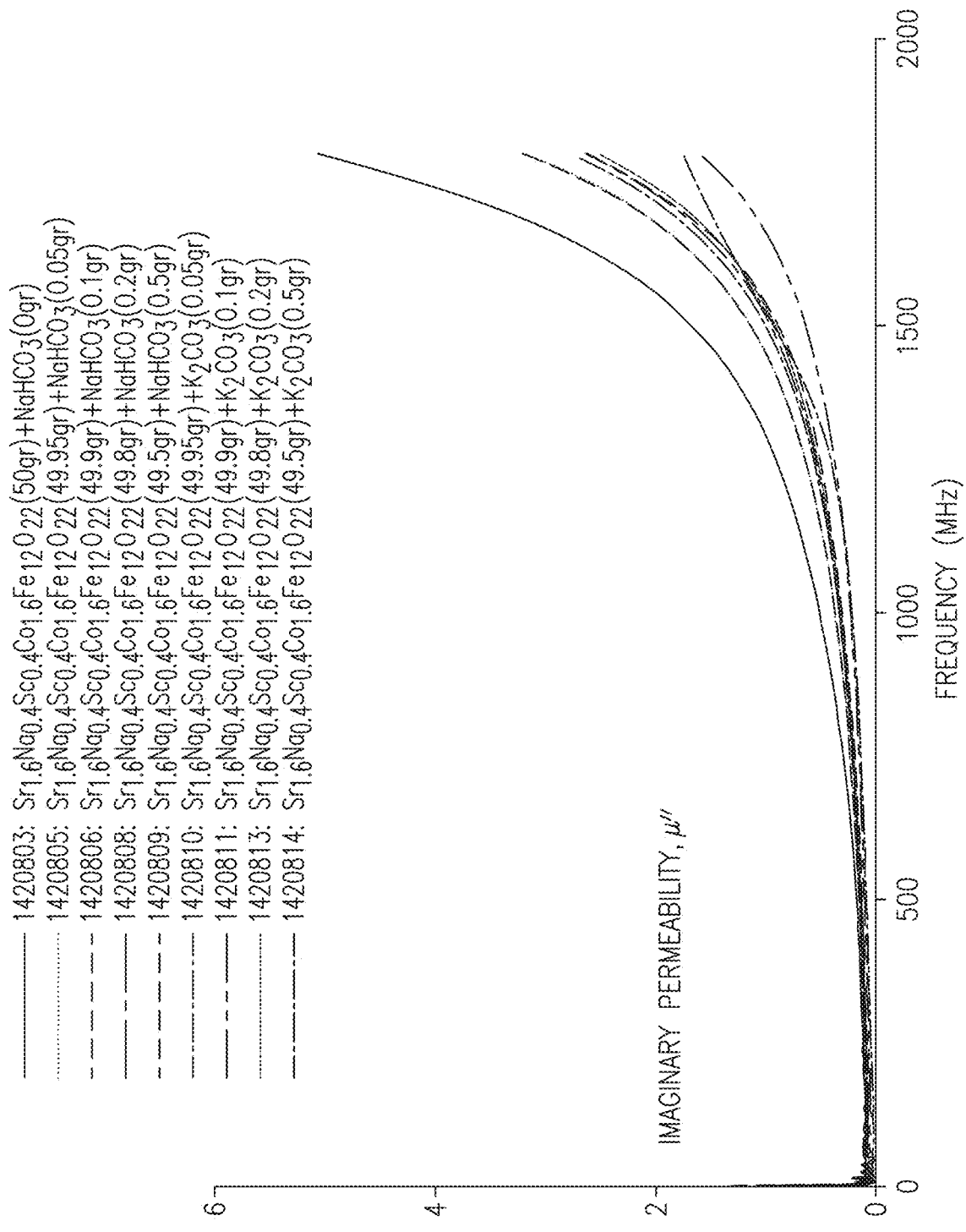
FIG. 8 illustrates imaginary permeability of embodiments of the disclosure.
Figure 9:
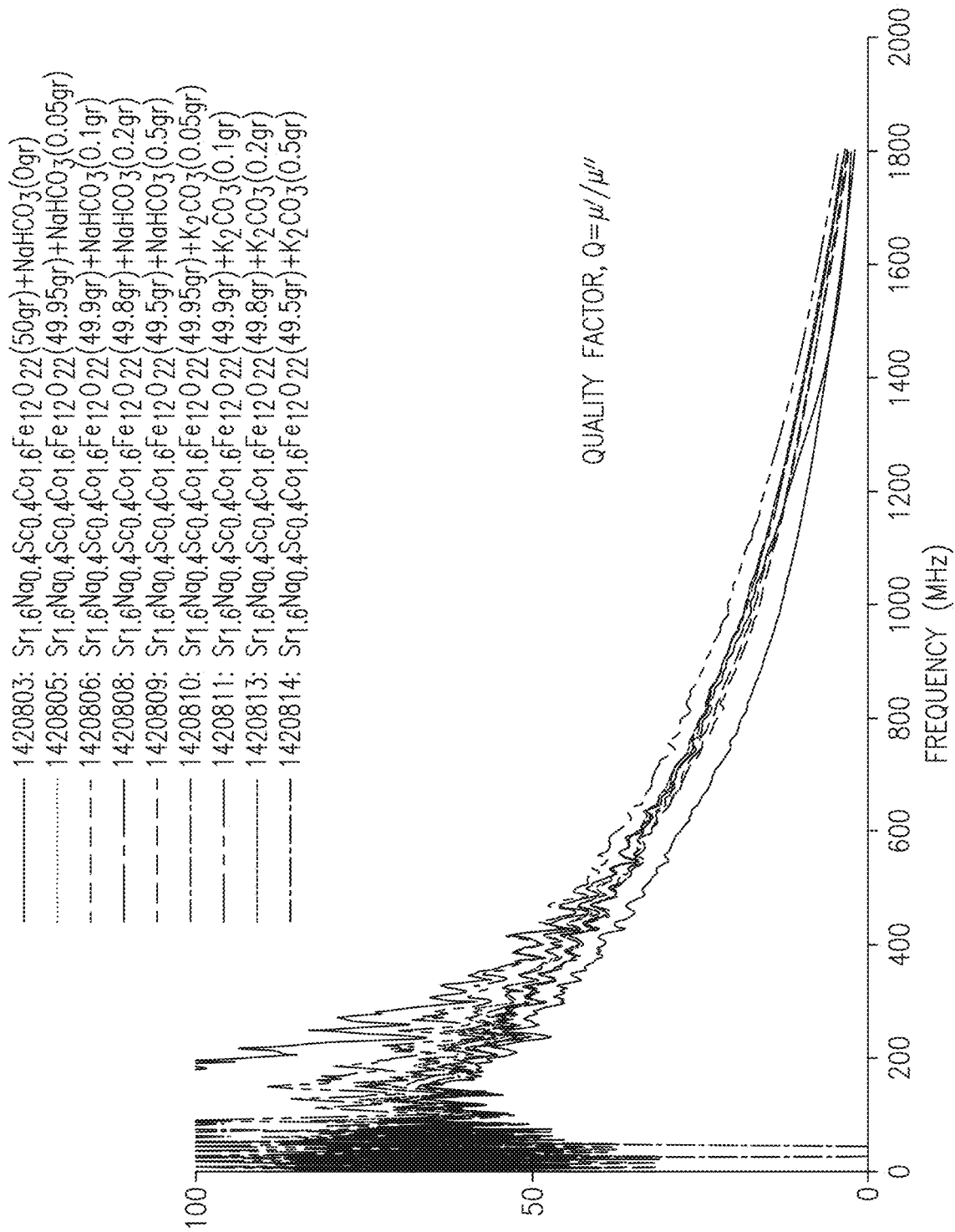
FIG. 9 illustrates the quality factor of embodiments of the disclosure.

As shown, embodiments of the disclosure can be doped with certain materials having a Z-phase stoichiometry, in particular $NaHCO_3$ and $K_2CO_3$, this Z-phase material being different from the material discussed above. This group can be known as alkali Y-phase hexagonal ferrites. FIGS. 7-9 illustrate the real permeability, imaginary permeability, and quality factor of the compositions listed in Table 3, which can have similar advantageous properties as discussed above.

Figure 10:
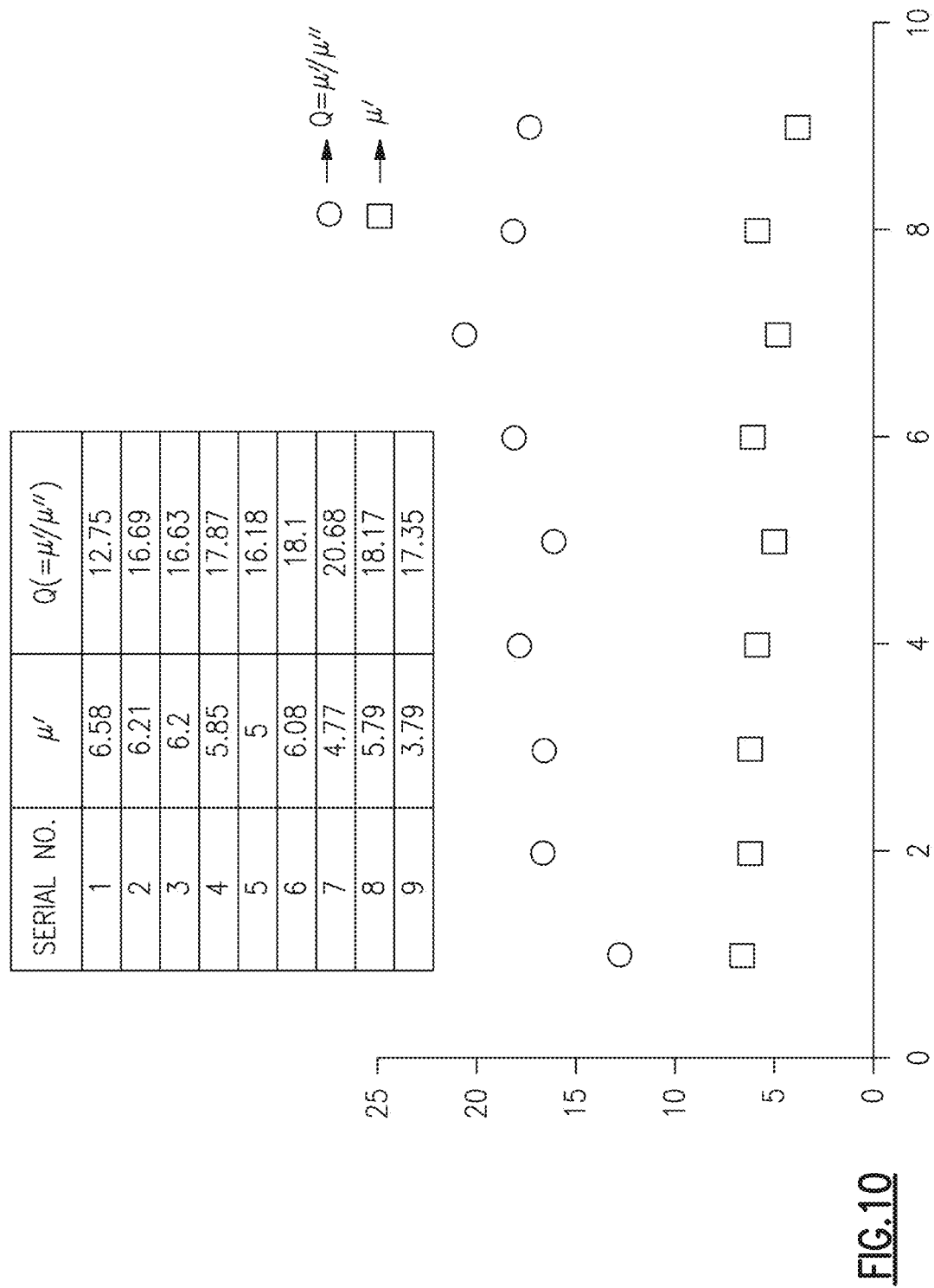
FIGS. 10-12 illustrates μ' and Q at 1 GHz for embodiments of the disclosure.

Further, FIG. 10 illustrates the particular material characteristics at 1 GHz. As shown, embodiments of the disclosure can have a quality factor of greater than 15, 16, 17, 18, 19, or 20 (or greater than about 15, about 16, about 17, about 18, about 19, or about 20) at a 1 GHz frequency. In some embodiments, the material can have a quality factor of less than 25, 24, 23, 22, 21, 20, 19, 18, or 17 (or less than about 25, about 24, about 23, about 22, about 21, about 20, about 19, about 18, or about 17) at a 1 GHz frequency. In some embodiments, the material can have a quality factor of 25, 24, 23, 22, 21, 20, 19, 18, or 17 (or about 25, about 24, about 23, about 22, about 21, about 20, about 19, about 18, or about 17) at a 1 GHz frequency. Further, embodiments of the disclosure can have a real permeability of above 5, 6, 7, 8, or 9 (or above about 5, about 6, about 7, about 8, or about 9) at 1 GHz. In some embodiments, the material can have a real permeability of below 10, 9, 8, or 7 (or below about 10, about 9, about 8, or about 7) at 1 GHz. In some embodiments, the material can have a real permeability of below 10, 9, 8, 7, 6, 5 (or below about 10, about 9, about 8, about 7, about 6, or about 5) at 1 GHz. Thus, embodiments of the disclosure can contain both high quality factors as well as high real permeability, making the material particularly useful for radiofrequency applications.

Table 4 shows further compositions of mixed composite materials which can be advantageous for high frequency applications. As shown, In can be doped in for Sr to reduce costs while still maintaining the advantageous properties.

TABLE 4

Composite Compositions

| Composition-1 | W-1 | Composition-2 | W-2 | Composition-3 | W-3 | Total W (gr) |
|---|---|---|---|---|---|---|
| $(Ba_{0.081}Sr_{1.497}Co_{1.542}Sc_{0.386}Na_{0.386}Fe_{12}O_{22.278})$ | 50 | $Ba_{0.081}Sr_{1.497}Co_{1.542}Sc_{0.386}Na_{0.386}Fe_{12}O_{22.278}$ | 0 | $Ba_{0.081}Sr_{1.497}Co_{1.542}Sc_{0.386}Na_{0.386}Fe_{12}O_{22.278}$ | 0 | 50 |
| $(Ba_{0.081}Sr_{1.497}Co_{1.542}Sc_{0.386}Na_{0.386}Fe_{12}O_{22.278})$ | 40 | $Ba_{0.081}Sr_{1.497}Co_{1.542}Sc_{0.386}Na_{0.386}Fe_{12}O_{22.278}$ | 0 | $Ba_{0.081}Sr_{1.497}Co_{1.542}Sc_{0.386}Na_{0.386}Fe_{12}O_{22.278}$ | 10 | 50 |
| $(Ba_{0.081}Sr_{1.497}Co_{1.542}Sc_{0.386}Na_{0.386}Fe_{12}O_{22.278})$ | 30 | $Ba_{0.081}Sr_{1.497}Co_{1.542}Sc_{0.386}Na_{0.386}Fe_{12}O_{22.278}$ | 0 | $Ba_{0.081}Sr_{1.497}Co_{1.542}Sc_{0.386}Na_{0.386}Fe_{12}O_{22.278}$ | 20 | 50 |
| $(Ba_{0.081}Sr_{1.497}Co_{1.542}Sc_{0.386}Na_{0.386}Fe_{12}O_{22.278})$ | 20 | $Ba_{0.081}Sr_{1.497}Co_{1.542}Sc_{0.386}Na_{0.386}Fe_{12}O_{22.278}$ | 0 | $Ba_{0.081}Sr_{1.497}Co_{1.542}Sc_{0.386}Na_{0.386}Fe_{12}O_{22.278}$ | 30 | 50 |
| $(Ba_{0.081}Sr_{1.497}Co_{1.542}Sc_{0.386}Na_{0.386}Fe_{12}O_{22.278})$ | 10 | $Ba_{0.081}Sr_{1.497}Co_{1.542}Sc_{0.386}Na_{0.386}Fe_{12}O_{22.278}$ | 0 | $Ba_{0.081}Sr_{1.497}Co_{1.542}Sc_{0.386}Na_{0.386}Fe_{12}O_{22.278}$ | 40 | 50 |
| $(Ba_{0.081}Sr_{1.497}Co_{1.542}Sc_{0.386}Na_{0.386}Fe_{12}O_{22.278})$ | 40 | $Ba_{0.081}Sr_{1.497}Co_{1.542}Sc_{0.386}Na_{0.386}Fe_{12}O_{22.278}$ | 10 | $Ba_{0.081}Sr_{1.497}Co_{1.542}Sc_{0.386}Na_{0.386}Fe_{12}O_{22.278}$ | 0 | 50 |
| $(Ba_{0.081}Sr_{1.497}Co_{1.542}Sc_{0.386}Na_{0.386}Fe_{12}O_{22.278})$ | 30 | $Ba_{0.081}Sr_{1.497}Co_{1.542}Sc_{0.386}Na_{0.386}Fe_{12}O_{22.278}$ | 20 | $Ba_{0.081}Sr_{1.497}Co_{1.542}Sc_{0.386}Na_{0.386}Fe_{12}O_{22.278}$ | 0 | 50 |
| $(Ba_{0.081}Sr_{1.497}Co_{1.542}Sc_{0.386}Na_{0.386}Fe_{12}O_{22.278})$ | 20 | $Ba_{0.081}Sr_{1.497}Co_{1.542}Sc_{0.386}Na_{0.386}Fe_{12}O_{22.278}$ | 30 | $Ba_{0.081}Sr_{1.497}Co_{1.542}Sc_{0.386}Na_{0.386}Fe_{12}O_{22.278}$ | 0 | 50 |
| $(Ba_{0.081}Sr_{1.497}Co_{1.542}Sc_{0.386}Na_{0.386}Fe_{12}O_{22.278})$ | 10 | $Ba_{0.081}Sr_{1.497}Co_{1.542}Sc_{0.386}Na_{0.386}Fe_{12}O_{22.278}$ | 40 | $Ba_{0.081}Sr_{1.497}Co_{1.542}Sc_{0.386}Na_{0.386}Fe_{12}O_{22.278}$ | 0 | 50 |
| $(Ba_{0.081}Sr_{1.497}Co_{1.542}Sc_{0.386}Na_{0.386}Fe_{12}O_{22.278})$ | 30 | $Ba_{0.081}Sr_{1.497}Co_{1.542}Sc_{0.386}Na_{0.386}Fe_{12}O_{22.278}$ | 10 | $Ba_{0.081}Sr_{1.497}Co_{1.542}Sc_{0.386}Na_{0.386}Fe_{12}O_{22.278}$ | 10 | 50 |
| $(Ba_{0.081}Sr_{1.497}Co_{1.542}Sc_{0.386}Na_{0.386}Fe_{12}O_{22.278})$ | 20 | $Ba_{0.081}Sr_{1.497}Co_{1.542}Sc_{0.386}Na_{0.386}Fe_{12}O_{22.278}$ | 20 | $Ba_{0.081}Sr_{1.497}Co_{1.542}Sc_{0.386}Na_{0.386}Fe_{12}O_{22.278}$ | 10 | 50 |
| $(Ba_{0.081}Sr_{1.497}Co_{1.542}Sc_{0.386}Na_{0.386}Fe_{12}O_{22.278})$ | 20 | $Ba_{0.081}Sr_{1.497}Co_{1.542}Sc_{0.386}Na_{0.386}Fe_{12}O_{22.278}$ | 10 | $Ba_{0.081}Sr_{1.497}Co_{1.542}Sc_{0.386}Na_{0.386}Fe_{12}O_{22.278}$ | 20 | 50 |
| $(Ba_{0.081}Sr_{1.497}Co_{1.542}Sc_{0.386}Na_{0.386}Fe_{12}O_{22.278})$ | 10 | $Ba_{0.081}Sr_{1.497}Co_{1.542}Sc_{0.386}Na_{0.386}Fe_{12}O_{22.278}$ | 30 | $Ba_{0.081}Sr_{1.497}Co_{1.542}Sc_{0.386}Na_{0.386}Fe_{12}O_{22.278}$ | 10 | 50 |
| $(Ba_{0.081}Sr_{1.497}Co_{1.542}Sc_{0.386}Na_{0.386}Fe_{12}O_{22.278})$ | 10 | $Ba_{0.081}Sr_{1.497}Co_{1.542}Sc_{0.386}Na_{0.386}Fe_{12}O_{22.278}$ | 10 | $Ba_{0.081}Sr_{1.497}Co_{1.542}Sc_{0.386}Na_{0.386}Fe_{12}O_{22.278}$ | 30 | 50 |
| $(Ba_{0.081}Sr_{1.497}Co_{1.542}Sc_{0.386}Na_{0.386}Fe_{12}O_{22.278})$ | 10 | $Ba_{0.081}Sr_{1.497}Co_{1.542}Sc_{0.386}Na_{0.386}Fe_{12}O_{22.278}$ | 20 | $Ba_{0.081}Sr_{1.497}Co_{1.542}Sc_{0.386}Na_{0.386}Fe_{12}O_{22.278}$ | 20 | 50 |
| $(Ba_{0.081}Sr_{1.497}Co_{1.542}Sc_{0.386}Na_{0.386}Fe_{12}O_{22.278})$ | 0 | $Ba_{0.081}Sr_{1.497}Co_{1.542}Sc_{0.386}Na_{0.386}Fe_{12}O_{22.278}$ | 50 | $Ba_{0.081}Sr_{1.497}Co_{1.542}Sc_{0.386}Na_{0.386}Fe_{12}O_{22.278}$ | 0 | 50 |
| $(Ba_{0.081}Sr_{1.497}Co_{1.542}Sc_{0.386}Na_{0.386}Fe_{12}O_{22.278})$ | 0 | $Ba_{0.081}Sr_{1.497}Co_{1.542}Sc_{0.386}Na_{0.386}Fe_{12}O_{22.278}$ | 40 | $Ba_{0.081}Sr_{1.497}Co_{1.542}Sc_{0.386}Na_{0.386}Fe_{12}O_{22.278}$ | 10 | 50 |
| $(Ba_{0.081}Sr_{1.497}Co_{1.542}Sc_{0.386}Na_{0.386}Fe_{12}O_{22.278})$ | 0 | $Ba_{0.081}Sr_{1.497}Co_{1.542}Sc_{0.386}Na_{0.386}Fe_{12}O_{22.278}$ | 30 | $Ba_{0.081}Sr_{1.497}Co_{1.542}Sc_{0.386}Na_{0.386}Fe_{12}O_{22.278}$ | 20 | 50 |
| $(Ba_{0.081}Sr_{1.497}Co_{1.542}Sc_{0.386}Na_{0.386}Fe_{12}O_{22.278})$ | 0 | $Ba_{0.081}Sr_{1.497}Co_{1.542}Sc_{0.386}Na_{0.386}Fe_{12}O_{22.278}$ | 25 | $Ba_{0.081}Sr_{1.497}Co_{1.542}Sc_{0.386}Na_{0.386}Fe_{12}O_{22.278}$ | 25 | 50 |
| $(Ba_{0.081}Sr_{1.497}Co_{1.542}Sc_{0.386}Na_{0.386}Fe_{12}O_{22.278})$ | 0 | $Ba_{0.081}Sr_{1.497}Co_{1.542}Sc_{0.386}Na_{0.386}Fe_{12}O_{22.278}$ | 10 | $Ba_{0.081}Sr_{1.497}Co_{1.542}Sc_{0.386}Na_{0.386}Fe_{12}O_{22.278}$ | | |
| $(Ba_{0.081}Sr_{1.497}Co_{1.542}Sc_{0.386}Na_{0.386}Fe_{12}O_{22.278})$ | 0 | $Ba_{0.081}Sr_{1.497}Co_{1.542}Sc_{0.386}Na_{0.386}Fe_{12}O_{22.278}$ | 0 | | | |

TABLE 4-continued

| Composite Compositions | | |
|---|---|---|
| $Ba_{0.081}Sr_{1.497}Co_{1.542}Sc_{0.386}Na_{0.386}Fe_{12}O_{22.278}$ | 40 | 50 |
| $Ba_{0.081}Sr_{1.497}Co_{1.542}Sc_{0.386}Na_{0.386}Fe_{12}O_{22.278}$ | 50 | 50 |

In some embodiments, the material can be fully (e.g., 50 g (or about 50 g)) of $Ba_{0.081}Sr_{1.497}Co_{1.542}Sc_{0.386}Na_{0.386}Fe_{12}O_{22.278}$. In some embodiments, the composite material can be a combination of $Ba_{0.081}Sr_{1.497}Co_{1.542}Sc_{0.386}Na_{0.386}Fe_{12}O_{22.278}$ and $Ba_{0.081}Sr_{1.497}Co_{1.542}In_{0.386}Na_{0.386}Fe_{12}O_{22.278}$. In some embodiments, the material can be 40 g (or about 40 g) $Ba_{0.081}Sr_{1.497}Co_{1.542}Sc_{0.386}Na_{0.386}Fe_{12}O_{22.278}$ and 10 g (or about 10 g) $Ba_{0.081}Sr_{1.497}Co_{1.542}In_{0.386}Na_{0.386}Fe_{12}O_{22.278}$. In some embodiments, the material can be 30 g (or about 30 g) $Ba_{0.081}Sr_{1.497}Co_{1.542}Sc_{0.386}Na_{0.386}Fe_{12}O_{22.278}$ and 20 g (or about 20 g) $Ba_{0.081}Sr_{1.497}Co_{1.542}In_{0.386}Na_{0.386}Fe_{12}O_{22.278}$.

As shown, Sr content can be reduced, thereby improving the general costs of the material. Further, a plurality of different mixes of Y-phase and Z-phase compositions can be added together to achieve different and unique properties. Table 5 illustrates the particular properties of the above compositions of Table 4 at 1 GHz, such as the Figure of Merit (FOM), defined for this material as the permeability multiplies by the magnetic Q of ($\mu'^2/\mu''$), and FIG. 11 graphical shows the real permeability and quality factor. The serial number in Table 5 is equivalent to the row number in Table 4.

TABLE 5

| Composite Properties at 1 GHz | | | |
|---|---|---|---|
| Serial No. | u' | Q | FOM (u'*Q) |
| 1 | 5.91 | 18.26 | 107.92 |
| 2 | 6.55 | 17.96 | 117.64 |
| 3 | 6.86 | 16.31 | 111.89 |
| 4 | 7.78 | 13.56 | 105.50 |
| 5 | 8.92 | 9.04 | 80.64 |
| 6 | 5.98 | 18.4 | 110.03 |
| 7 | 6.23 | 13.03 | 81.18 |
| 8 | 6.43 | 9.83 | 63.21 |
| 9 | 7.53 | 5.99 | 45.10 |
| 10 | 6.12 | 17.19 | 105.20 |
| 11 | 6.49 | 14.07 | 91.31 |
| 12 | 6.65 | 14 | 93.10 |
| 13 | 6.78 | 10.78 | 73.09 |
| 14 | 8.18 | 9.56 | 78.20 |
| 15 | 7.03 | 11.76 | 82.67 |
| 16 | 3.39 | 6.7 | 22.71 |
| 17 | 8.21 | 5.34 | 43.84 |
| 18 | 7.82 | 9.11 | 71.24 |
| 19 | 8.38 | 7.93 | 66.45 |
| 20 | 9.21 | 7.17 | 66.04 |
| 21 | 8.28 | 7.62 | 63.09 |

Figure 11:
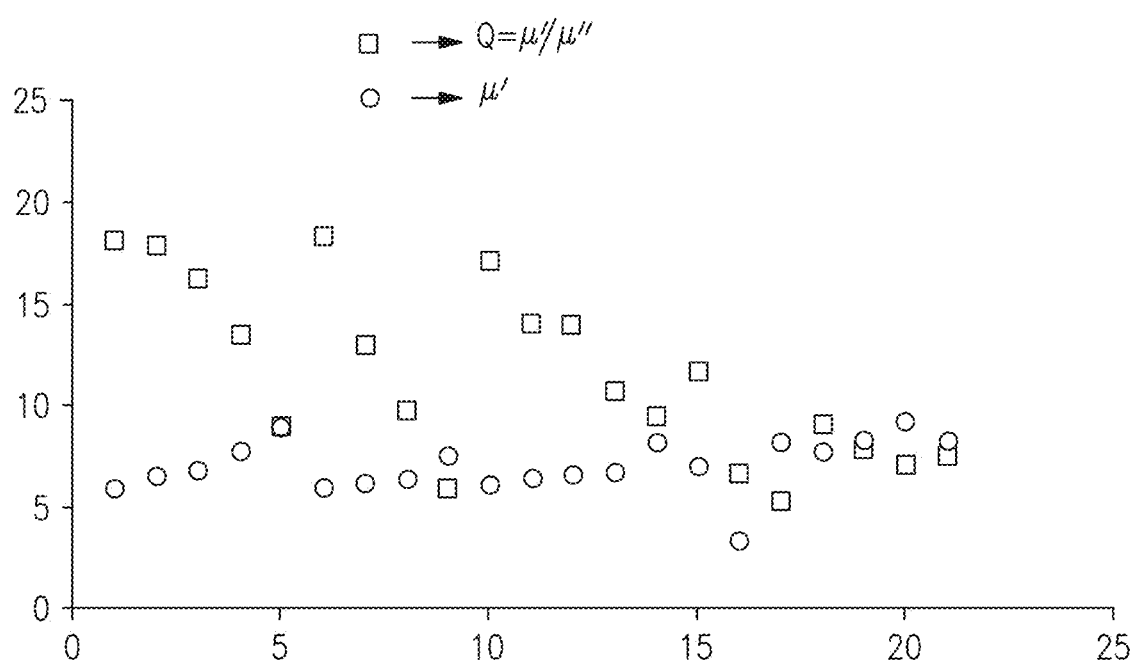

As mentioned, FIG. 11 shows a summary of the data in Table 5. As shown, embodiments of the disclosure can have a quality factor of greater than 15, 16, 17, 18, 19, or 20 (or greater than about 15, about 16, about 17, about 18, about 19, or about 20) at a 1 GHz frequency. In some embodiments, the material can have a quality factor of less than 25, 24, 23, 22, 21, 20, 19, 18, or 17 (or less than about 25, about 24, about 23, about 22, about 21, about 20, about 19, about 18, or about 17) at a 1 GHz frequency. In some embodiments, the material can have a quality factor of 25, 24, 23, 22, 21, 20, 19, 18, or 17 (or about 25, about 24, about 23, about 22, about 21, about 20, about 19, about 18, or about 17) at a 1 GHz frequency. Further, embodiments of the disclosure can have a real permeability of above 5, 6, 7, 8, or 9 (or above about 5, about 6, about 7, about 8, or about 9) at 1 GHz. In some embodiments, the material can have a real permeability of below 10, 9, 8, or 7 (or below about 10, about 9, about 8, or about 7) at 1 GHz. In some embodiments, the material can have a real permeability of below 10, 9, 8, 7, 6, 5 (or below about 10, about 9, about 8, about 7, about 6, or about 5) at 1 GHz. Thus, embodiments of the disclosure can contain both high quality factors as well as high real permeability, making the material particularly useful for radiofrequency applications.

Tables 6 shows further compositions of mixed composite materials which can be advantageous for high frequency applications. In these compositions, the compositions can be doped by zirconium.

TABLE 6

| Composite Compositions | | | |
|---|---|---|---|
| Composition-1 | W-1 | Composition-2 | W-2 |
| $(Ba_{0.081}Sr_{1.497}Co_{1.542}Sc_{0.386}Na_{0.386}Fe_{12}O_{22.278})$ | 50 | $Ba_{0.081}Sr_{1.304}Co_{1.542}In_{0.193}Zr_{0.193}K_{0.579}Fe_{12}O_{22.278}$ | 0 |
| $(Ba_{0.081}Sr_{1.497}Co_{1.542}Sc_{0.386}Na_{0.386}Fe_{12}O_{22.278})$ | 40 | $Ba_{0.081}Sr_{1.304}Co_{1.542}In_{0.193}Zr_{0.193}K_{0.579}Fe_{12}O_{22.278}$ | 0 |
| $(Ba_{0.081}Sr_{1.497}Co_{1.542}Sc_{0.386}Na_{0.386}Fe_{12}O_{22.278})$ | 30 | $Ba_{0.081}Sr_{1.304}Co_{1.542}In_{0.193}Zr_{0.193}K_{0.579}Fe_{12}O_{22.278}$ | 0 |
| $(Ba_{0.081}Sr_{1.497}Co_{1.542}Sc_{0.386}Na_{0.386}Fe_{12}O_{22.278})$ | 20 | $Ba_{0.081}Sr_{1.304}Co_{1.542}In_{0.193}Zr_{0.193}K_{0.579}Fe_{12}O_{22.278}$ | 0 |
| $(Ba_{0.081}Sr_{1.497}Co_{1.542}Sc_{0.386}Na_{0.386}Fe_{12}O_{22.278})$ | 10 | $Ba_{0.081}Sr_{1.304}Co_{1.542}In_{0.193}Zr_{0.193}K_{0.579}Fe_{12}O_{22.278}$ | 0 |
| $(Ba_{0.081}Sr_{1.497}Co_{1.542}Sc_{0.386}Na_{0.386}Fe_{12}O_{22.278})$ | 40 | $Ba_{0.081}Sr_{1.304}Co_{1.542}In_{0.193}Zr_{0.193}K_{0.579}Fe_{12}O_{22.278}$ | 10 |
| $(Ba_{0.081}Sr_{1.497}Co_{1.542}Sc_{0.386}Na_{0.386}Fe_{12}O_{22.278})$ | 30 | $Ba_{0.081}Sr_{1.304}Co_{1.542}In_{0.193}Zr_{0.193}K_{0.579}Fe_{12}O_{22.278}$ | 20 |
| $(Ba_{0.081}Sr_{1.497}Co_{1.542}Sc_{0.386}Na_{0.386}Fe_{12}O_{22.278})$ | 20 | $Ba_{0.081}Sr_{1.304}Co_{1.542}In_{0.193}Zr_{0.193}K_{0.579}Fe_{12}O_{22.278}$ | 30 |
| $(Ba_{0.081}Sr_{1.497}Co_{1.542}Sc_{0.386}Na_{0.386}Fe_{12}O_{22.278})$ | 10 | $Ba_{0.081}Sr_{1.304}Co_{1.542}In_{0.193}Zr_{0.193}K_{0.579}Fe_{12}O_{22.278}$ | 40 |
| $(Ba_{0.081}Sr_{1.497}Co_{1.542}Sc_{0.386}Na_{0.386}Fe_{12}O_{22.278})$ | 30 | $Ba_{0.081}Sr_{1.304}Co_{1.542}In_{0.193}Zr_{0.193}K_{0.579}Fe_{12}O_{22.278}$ | 10 |
| $(Ba_{0.081}Sr_{1.497}Co_{1.542}Sc_{0.386}Na_{0.386}Fe_{12}O_{22.278})$ | 20 | $Ba_{0.081}Sr_{1.304}Co_{1.542}In_{0.193}Zr_{0.193}K_{0.579}Fe_{12}O_{22.278}$ | 20 |
| $(Ba_{0.081}Sr_{1.497}Co_{1.542}Sc_{0.386}Na_{0.386}Fe_{12}O_{22.278})$ | 20 | $Ba_{0.081}Sr_{1.304}Co_{1.542}In_{0.193}Zr_{0.193}K_{0.579}Fe_{12}O_{22.278}$ | 10 |
| $(Ba_{0.081}Sr_{1.497}Co_{1.542}Sc_{0.386}Na_{0.386}Fe_{12}O_{22.278})$ | 10 | $Ba_{0.081}Sr_{1.304}Co_{1.542}In_{0.193}Zr_{0.193}K_{0.579}Fe_{12}O_{22.278}$ | 30 |
| $(Ba_{0.081}Sr_{1.497}Co_{1.542}Sc_{0.386}Na_{0.386}Fe_{12}O_{22.278})$ | 10 | $Ba_{0.081}Sr_{1.304}Co_{1.542}In_{0.193}Zr_{0.193}K_{0.579}Fe_{12}O_{22.278}$ | 10 |
| $(Ba_{0.081}Sr_{1.497}Co_{1.542}Sc_{0.386}Na_{0.386}Fe_{12}O_{22.278})$ | 10 | $Ba_{0.081}Sr_{1.304}Co_{1.542}In_{0.193}Zr_{0.193}K_{0.579}Fe_{12}O_{22.278}$ | 20 |

TABLE 6-continued

Composite Compositions

| | | |
|---|---|---|
| $(Ba_{0.081}Sr_{1.497}Co_{1.542}Sc_{0.386}Na_{0.386}Fe_{12}O_{22.278})$ | 0 | $Ba_{0.081}Sr_{1.304}Co_{1.542}In_{0.193}Zr_{0.193}K_{0.579}Fe_{12}O_{22.278}$ 0 |
| $(Ba_{0.081}Sr_{1.497}Co_{1.542}Sc_{0.386}Na_{0.386}Fe_{12}O_{22.278})$ | 0 | $Ba_{0.081}Sr_{1.304}Co_{1.542}In_{0.193}Zr_{0.193}K_{0.579}Fe_{12}O_{22.278}$ 10 |
| $(Ba_{0.081}Sr_{1.497}Co_{1.542}Sc_{0.386}Na_{0.386}Fe_{12}O_{22.278})$ | 0 | $Ba_{0.081}Sr_{1.304}Co_{1.542}In_{0.193}Zr_{0.193}K_{0.579}Fe_{12}O_{22.278}$ 20 |
| $(Ba_{0.081}Sr_{1.497}Co_{1.542}Sc_{0.386}Na_{0.386}Fe_{12}O_{22.278})$ | 0 | $Ba_{0.081}Sr_{1.304}Co_{1.542}In_{0.193}Zr_{0.193}K_{0.579}Fe_{12}O_{22.278}$ 30 |
| $(Ba_{0.081}Sr_{1.497}Co_{1.542}Sc_{0.386}Na_{0.386}Fe_{12}O_{22.278})$ | 0 | $Ba_{0.081}Sr_{1.304}Co_{1.542}In_{0.193}Zr_{0.193}K_{0.579}Fe_{12}O_{22.278}$ 40 |
| $(Ba_{0.081}Sr_{1.497}Co_{1.542}Sc_{0.386}Na_{0.386}Fe_{12}O_{22.278})$ | 0 | $Ba_{0.081}Sr_{1.304}Co_{1.542}In_{0.193}Zr_{0.193}K_{0.579}Fe_{12}O_{22.278}$ 50 |

| Composition-3 | W-3 | Total W (gr) |
|---|---|---|
| $Ba_{0.081}Sr_{1.304}Co_{1.542}In_{0.193}Zr_{0.193}K_{0.579}Fe_{12}O_{22.278}$ | 0 | 50 |
| $Ba_{0.081}Sr_{1.304}Co_{1.542}In_{0.193}Zr_{0.193}K_{0.579}Fe_{12}O_{22.278}$ | 10 | 50 |
| $Ba_{0.081}Sr_{1.304}Co_{1.542}In_{0.193}Zr_{0.193}K_{0.579}Fe_{12}O_{22.278}$ | 20 | 50 |
| $Ba_{0.081}Sr_{1.304}Co_{1.542}In_{0.193}Zr_{0.193}K_{0.579}Fe_{12}O_{22.278}$ | 30 | 50 |
| $Ba_{0.081}Sr_{1.304}Co_{1.542}In_{0.193}Zr_{0.193}K_{0.579}Fe_{12}O_{22.278}$ | 40 | 50 |
| $Ba_{0.081}Sr_{1.304}Co_{1.542}In_{0.193}Zr_{0.193}K_{0.579}Fe_{12}O_{22.278}$ | 0 | 50 |
| $Ba_{0.081}Sr_{1.304}Co_{1.542}In_{0.193}Zr_{0.193}K_{0.579}Fe_{12}O_{22.278}$ | 0 | 50 |
| $Ba_{0.081}Sr_{1.304}Co_{1.542}In_{0.193}Zr_{0.193}K_{0.579}Fe_{12}O_{22.278}$ | 0 | 50 |
| $Ba_{0.081}Sr_{1.304}Co_{1.542}In_{0.193}Zr_{0.193}K_{0.579}Fe_{12}O_{22.278}$ | 0 | 50 |
| $Ba_{0.081}Sr_{1.304}Co_{1.542}In_{0.193}Zr_{0.193}K_{0.579}Fe_{12}O_{22.278}$ | 10 | 50 |
| $Ba_{0.081}Sr_{1.304}Co_{1.542}In_{0.193}Zr_{0.193}K_{0.579}Fe_{12}O_{22.278}$ | 10 | 50 |
| $Ba_{0.081}Sr_{1.304}Co_{1.542}In_{0.193}Zr_{0.193}K_{0.579}Fe_{12}O_{22.278}$ | 20 | 50 |
| $Ba_{0.081}Sr_{1.304}Co_{1.542}In_{0.193}Zr_{0.193}K_{0.579}Fe_{12}O_{22.278}$ | 10 | 50 |
| $Ba_{0.081}Sr_{1.304}Co_{1.542}In_{0.193}Zr_{0.193}K_{0.579}Fe_{12}O_{22.278}$ | 30 | 50 |
| $Ba_{0.081}Sr_{1.304}Co_{1.542}In_{0.193}Zr_{0.193}K_{0.579}Fe_{12}O_{22.278}$ | 20 | 50 |
| $Ba_{0.081}Sr_{1.304}Co_{1.542}In_{0.193}Zr_{0.193}K_{0.579}Fe_{12}O_{22.278}$ | 50 | 50 |
| $Ba_{0.081}Sr_{1.304}Co_{1.542}In_{0.193}Zr_{0.193}K_{0.579}Fe_{12}O_{22.278}$ | 40 | 50 |
| $Ba_{0.081}Sr_{1.304}Co_{1.542}In_{0.193}Zr_{0.193}K_{0.579}Fe_{12}O_{22.278}$ | 30 | 50 |
| $Ba_{0.081}Sr_{1.304}Co_{1.542}In_{0.193}Zr_{0.193}K_{0.579}Fe_{12}O_{22.278}$ | 20 | 50 |
| $Ba_{0.081}Sr_{1.304}Co_{1.542}In_{0.193}Zr_{0.193}K_{0.579}Fe_{12}O_{22.278}$ | 10 | 50 |
| $Ba_{0.081}Sr_{1.304}Co_{1.542}In_{0.193}Zr_{0.193}K_{0.579}Fe_{12}O_{22.278}$ | 0 | 50 |

In some embodiments, the material can be fully (e.g., 50 g (or about 50 g)) of $Ba_{0.081}Sr_{1.497}Co_{1.542}Sc_{0.386}Na_{0.386}Fe_{12}O_{22.278}$. In some embodiments, the composite material can be a combination of $Ba_{0.081}Sr_{1.497}Co_{1.542}Sc_{0.386}Na_{0.386}Fe_{12}O_{22.278}$ and $Ba_{0.081}Sr_{1.304}Co_{1.542}In_{0.193}Zr_{0.193}Na_{0.579}Fe_{12}O_{22.278}$. In some embodiments, the material can be 40 g (or about 40 g) $Ba_{0.081}Sr_{1.497}Co_{1.542}Sc_{0.386}Na_{0.386}Fe_{12}O_{22.278}$ and 10 g (or about 10 g) $Ba_{0.081}Sr_{1.304}Co_{1.542}In_{0.193}Zr_{0.193}Na_{0.579}Fe_{12}O_{22.278}$. In some embodiments, the material can be 30 g (or about 30 g) $Ba_{0.081}Sr_{1.497}Co_{1.542}Sc_{0.386}Na_{0.386}Fe_{12}O_{22.278}$ and 20 g (or about 20 g) $Ba_{0.081}Sr_{1.304}Co_{1.542}In_{0.193}Zr_{0.193}Na_{0.579}Fe_{12}O_{22.278}$.

Figure 12:
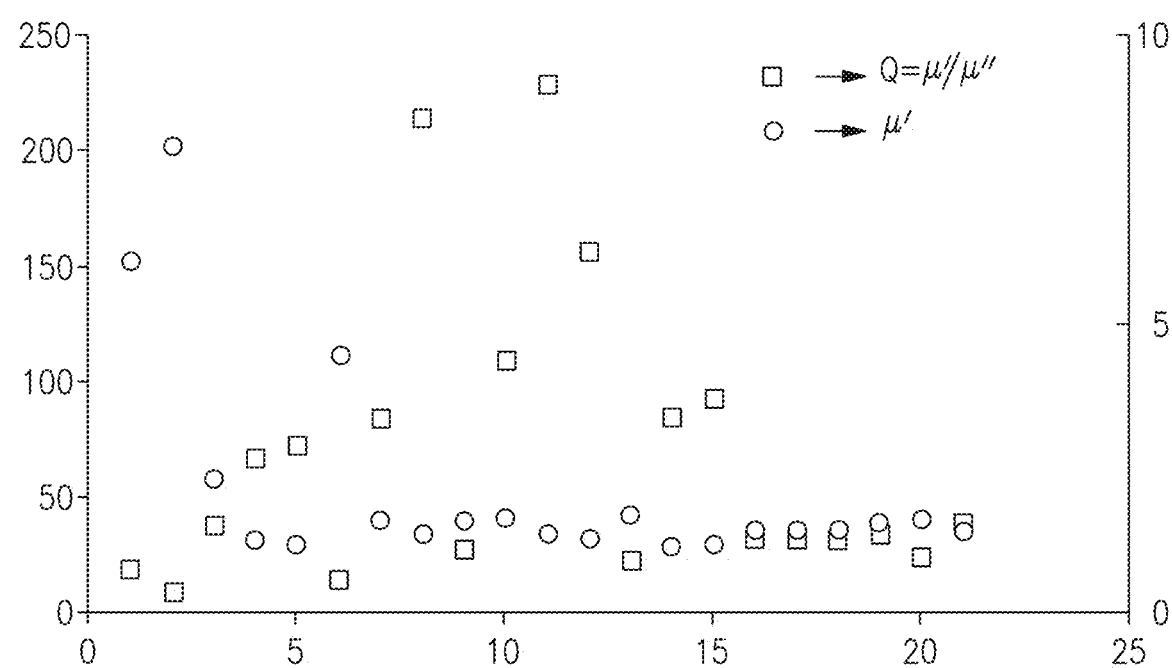

Table 7 illustrates the particular properties of the above compositions of Table 4 at 1 GHz and FIG. 12 graphical shows the real permeability and quality factor. As shown, the zirconium doped materials can have significantly higher quality factors, but may have reduced real permeability. The Serial No. in Table 7 relate to the row of Table 6.

TABLE 7

Composite Properties at 1 GHz

| Serial No. | µ' | Q | FOM (µ'*Q) |
|---|---|---|---|
| 1 | 6.1 | 19.17 | 116.94 |
| 2 | 8.1 | 9.62 | 77.92 |
| 3 | 2.3 | 38.86 | 89.38 |
| 4 | 1.24 | 66.8 | 82.83 |
| 5 | 1.16 | 72.36 | 83.94 |
| 6 | 4.47 | 14.6 | 65.26 |
| 7 | 1.6 | 84.13 | 134.61 |
| 8 | 1.38 | 214.23 | 295.64 |
| 9 | 1.58 | 28.08 | 44.37 |
| 10 | 1.63 | 110.06 | 179.40 |
| 11 | 1.37 | 228.54 | 313.10 |
| 12 | 1.26 | 156.86 | 197.64 |

TABLE 7-continued

Composite Properties at 1 GHz

| Serial No. | µ' | Q | FOM (µ'*Q) |
|---|---|---|---|
| 13 | 1.68 | 23.14 | 38.88 |
| 14 | 1.16 | 85.69 | 99.40 |
| 15 | 1.17 | 92.81 | 108.59 |
| 16 | 1.42 | 33.36 | 47.37 |
| 17 | 1.42 | 32.87 | 46.68 |
| 18 | 1.43 | 32.33 | 46.23 |
| 19 | 1.54 | 34.46 | 53.07 |
| 20 | 1.63 | 24.2 | 39.45 |
| 21 | 1.42 | 39.53 | 56.13 |

As shown in FIG. 12, embodiments of the disclosure can have a quality factor of greater than 20, 30, 40, 50, 60, 70, 80, 90, 100, 150, or 200 (or greater than about 20, about 30, about 40, about 50, about 60, about 70, about 80, about 90, about 100, about 150, or about 200) at a 1 GHz frequency. In some embodiments, the material can have a quality factor of less than 20, 30, 40, 50, 60, 70, 80, 90, 100, 150, or 200 (or less than about 20, about 30, about 40, about 50, about 60, about 70, about 80, about 90, about 100, about 150, or about 200) at a 1 GHz frequency. In some embodiments, the material can have a quality factor of 20, 30, 40, 50, 60, 70, 80, 90, 100, 150, or 200 (or about 20, about 30, about 40, about 50, about 60, about 70, about 80, about 90, about 100, about 150, or about 200) at a 1 GHz frequency. Further, embodiments of the disclosure can have a real permeability of above 1, 1.2, 1.3, 1.4, 1.5, 1.6, 1.7, 1.8, 1.9 or 2 (or above about 1, about 1.2, about 1.3, about 1.4, about 1.5, about 1.6, about 1.7, about 1.8, about 1.9 or about 2) at 1 GHz. In some embodiments, the material can have a real permeability of below 1, 1.2, 1.3, 1.4, 1.5, 1.6, 1.7, 1.8, 1.9 or 2 (or below about 1, about 1.2, about 1.3, about 1.4, about 1.5, about 1.6, about 1.7, about 1.8, about 1.9 or about 2) at 1 GHz. In some embodiments, the material can have a real permeability of 1, 1.2, 1.3, 1.4, 1.5, 1.6, 1.7, 1.8, 1.9 or 2 (or about 1, about 1.2, about 1.3, about 1.4, about 1.5, about 1.6, about 1.7, about 1.8, about 1.9 or about 2) at 1 GHz. Thus, embodiments of the disclosure can contain both high quality factors as well as high real permeability, making the material particularly useful for radiofrequency applications.

In some embodiments, the material can be fully (e.g., 50 g (or about 50 g)) of $Ba_{0.081}Sr_{1.497}Co_{1.542}Sc_{0.386}Na_{0.386}Fe_{12}O_{22.278}$.

Processing

Below lists an example processing method for creating the above-disclosed materials. The materials are formulated so that a combination of Y and Z phases can be thermodynamically stable after the sintering heat treatment.

Figure 13:
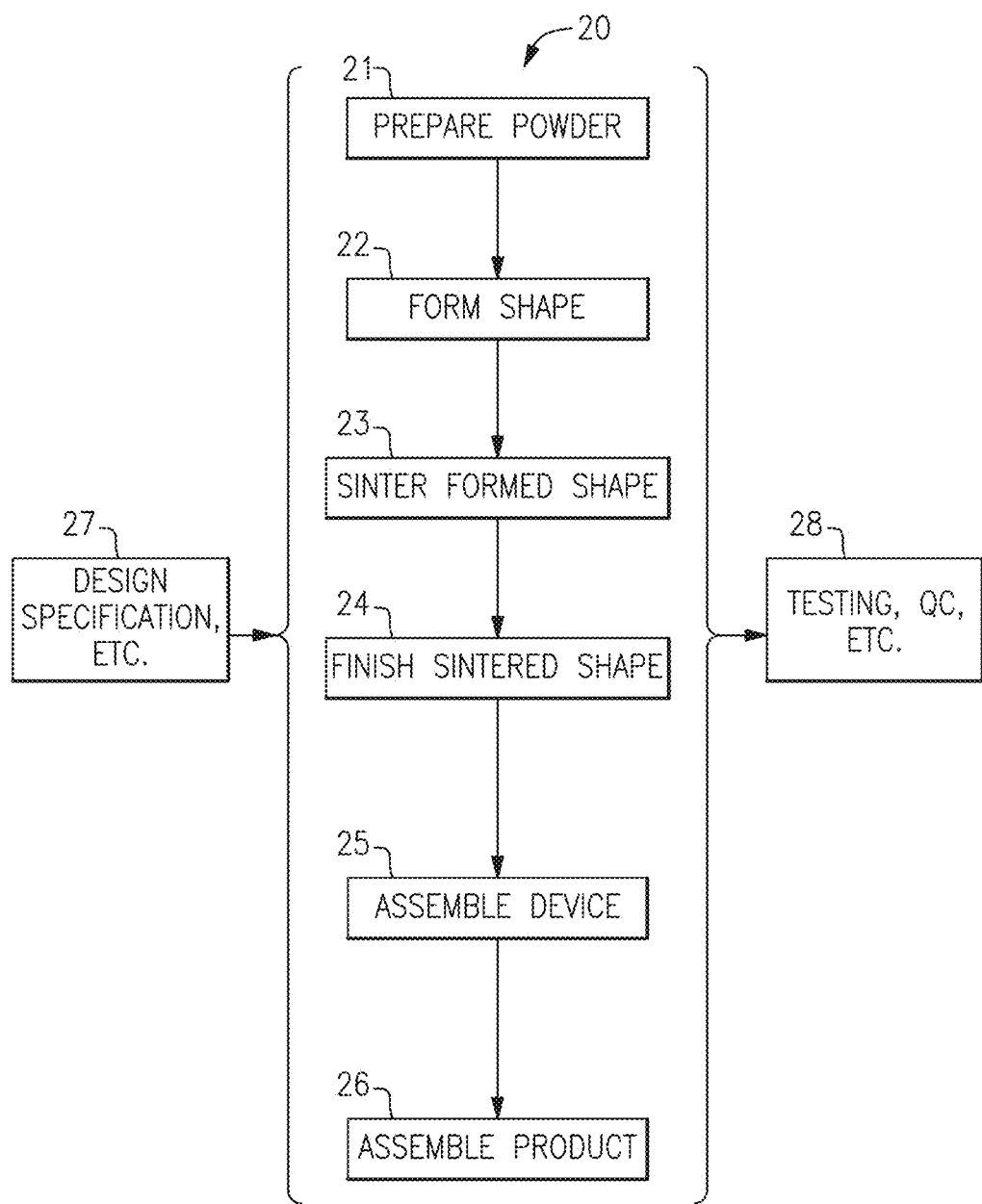
FIG. 13 shows an embodiment of a process that can be implemented to fabricate a ceramic material incorporating embodiments of Y-phase hexagonal ferrite.

FIGS. 13-17 illustrate processes for fabricating ferrite devices, such as radio frequency antennas, using one or more of the embodiments of the above disclosed hexagonal ferrite materials and having one or more features as described herein. FIG. 13 shows a process 20 that can be implemented to fabricate a ceramic material having one or more of the foregoing properties. In block 21, powder can be prepared. In block 22, a shaped object can be formed from the prepared powder. In block 23, the formed object can be sintered. In block 24, the sintered object can be finished to yield a finished ceramic object having one or more desirable properties.

In implementations where the finished ceramic object is part of a device, the device can be assembled in block 25. In implementations where the device or the finished ceramic object is part of a product, the product can be assembled in block 26.

FIG. 13 further shows that some or all of the steps of the example process 20 can be based on a design, specification, etc. Similarly, some or all of the steps can include or be subjected to testing, quality control, etc.

Powder prepared can include one or more properties as described herein, and/or facilitate formation of ceramic objects having one or more properties as described herein.

Figure 14:
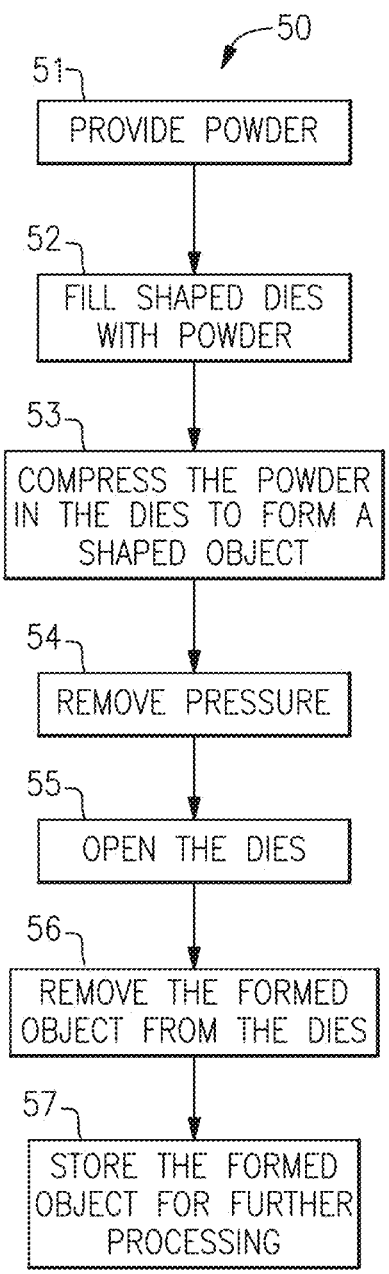
FIG. 14 shows an embodiment of a process that can be implemented to form a shaped object from powder material incorporating embodiments of the composite hexagonal ferrite.
Figure 15:
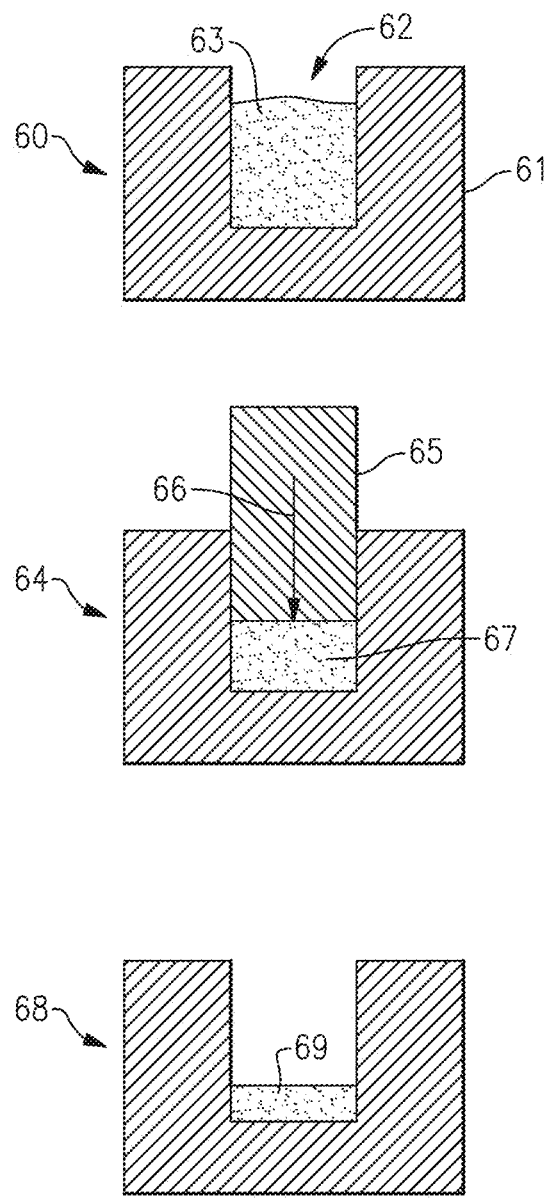
FIG. 15 shows examples of various stages of the process of FIG. 14.

In some implementations, powder prepared as described herein can be formed into different shapes by different forming techniques. By way of examples, FIG. 14 shows a process 50 that can be implemented to press-form a shaped object from a powder material prepared as described herein. In block 52, a shaped die can be filled with a desired amount of the powder. In FIG. 15, configuration 60 shows the shaped die as 61 that defines a volume 62 dimensioned to receive the powder 63 and allow such power to be pressed. In block 53, the powder in the die can be compressed to form a shaped object. Configuration 64 shows the powder in an intermediate compacted form 67 as a piston 65 is pressed (arrow 66) into the volume 62 defined by the die 61. In block 54, pressure can be removed from the die. In block 55, the piston (65) can be removed from the die (61) so as to open the volume (62). Configuration 68 shows the opened volume (62) of the die (61) thereby allowing the formed object 69 to be removed from the die. In block 56, the formed object (69) can be removed from the die (61). In block 57, the formed object can be stored for further processing. Additional forming methods familiar to those skilled in the art include but are not limited to isostatic pressing, tape casting, tape calendaring and extrusion In some implementations, formed objects fabricated as described herein can be sintered to yield desirable physical properties as ceramic devices. FIG. 16 shows a process 70 that can be implemented to sinter such formed objects. In block 71, formed objects can be provided. In block 72, the formed objects can be introduced into a kiln. In FIG. 17, a plurality of formed objects 69 are shown to be loaded into a sintering tray 80. The example tray 80 is shown to define a recess 83 dimensioned to hold the formed objects 69 on a surface 82 so that the upper edge of the tray is higher than the upper portions of the formed objects 69. Such a configuration allows the loaded trays to be stacked during the sintering process. The example tray 80 is further shown to define cutouts 83 at the side walls to allow improved circulation of hot gas at within the recess 83, even when the trays are stacked together. FIG. 17 further shows a stack 84 of a plurality of loaded trays 80. A top cover 85 can be provided so that the objects loaded in the top tray generally experience similar sintering condition as those in lower trays.

In block 73, heat can be applied to the formed objects so as to yield sintered objects, such as antennas. Such application of heat can be achieved by use of a kiln. In block 74, the sintered objects can be removed from the kiln. In FIG. 17, the stack 84 having a plurality of loaded trays is depicted as being introduced into a kiln 87 (stage 86a). Such a stack can be moved through the kiln (stages 86b, 86c) based on a desired time and temperature profile. In stage 86d, the stack 84 is depicted as being removed from the kiln so as to be cooled.

In block 75, the sintered objects can be cooled. Such cooling can be based on a desired time and temperature profile. In block 206, the cooled objects can undergo one or more finishing operations. In block 207, one or more tests can be performed.

Heat treatment of various forms of powder and various forms of shaped objects are described herein as calcining, firing, annealing, and/or sintering. It will be understood that such terms may be used interchangeably in some appropriate situations, in context-specific manners, or some combination thereof.

Textured Hexagonal Ferrite

Certain aspects of the present disclosure provide processing techniques for increasing the permeability of composite hexaferrites at higher frequencies. It can be used instead of or in conjunction with the above disclosed methodology. In one implementation, the processing techniques involve methods of magnetic texturing of composite hexaferrites to result in a textured ceramic with improved magnetic properties. In one embodiment, the method of magnetic texturing used in forming involves using a reaction sintering method, which includes the steps of aligning M-phase ($BaFe_{12}O_{19}$ uniaxial magnetization) with non-magnetic additives in a static magnetic field and reacting with BaO source and CoO to form the Y-phase ($Sr_2Me_2Fe_{12}O_{22}$). In another embodiment, the method of magnetic texturing used in forming Sr—$Co_2$Y involves using a rotating magnetic field method, which includes the steps of aligning Sr—$Co_2$Y phase (planar magnetization) with magnetic texturing occurring in a rotating magnetic field. The inventor has found that the degree of alignment, thus permeability gain, is far superior in a rotating magnetic field.

In some embodiments, the processing technique for forming the Y phase material includes making Y phase Fe deficient to inhibit reduction of Fe as the inventor believes that dielectric and magnetic loss is increased by reduction of Fe ($Fe^{3+} \rightarrow Fe^{2+}$) at high temperatures. The processing technique includes the step of heat treatment or annealing in oxygen to inhibit reduction of Fe and cause $Fe^{2+} \rightarrow Fe^{3}$.

Both the Y and Z phase hexagonal ferrites have their easy axis of magnetization parallel to the crystallogphic hexagonal basal plane. They can be magnetically aligned together.

In some other embodiments, the processing technique for forming Sr—$Co_2Y$ includes forming fine grain hexagonal ferrite particles. The process involves using high energy milling to reduce the particle size.

Figure 18:
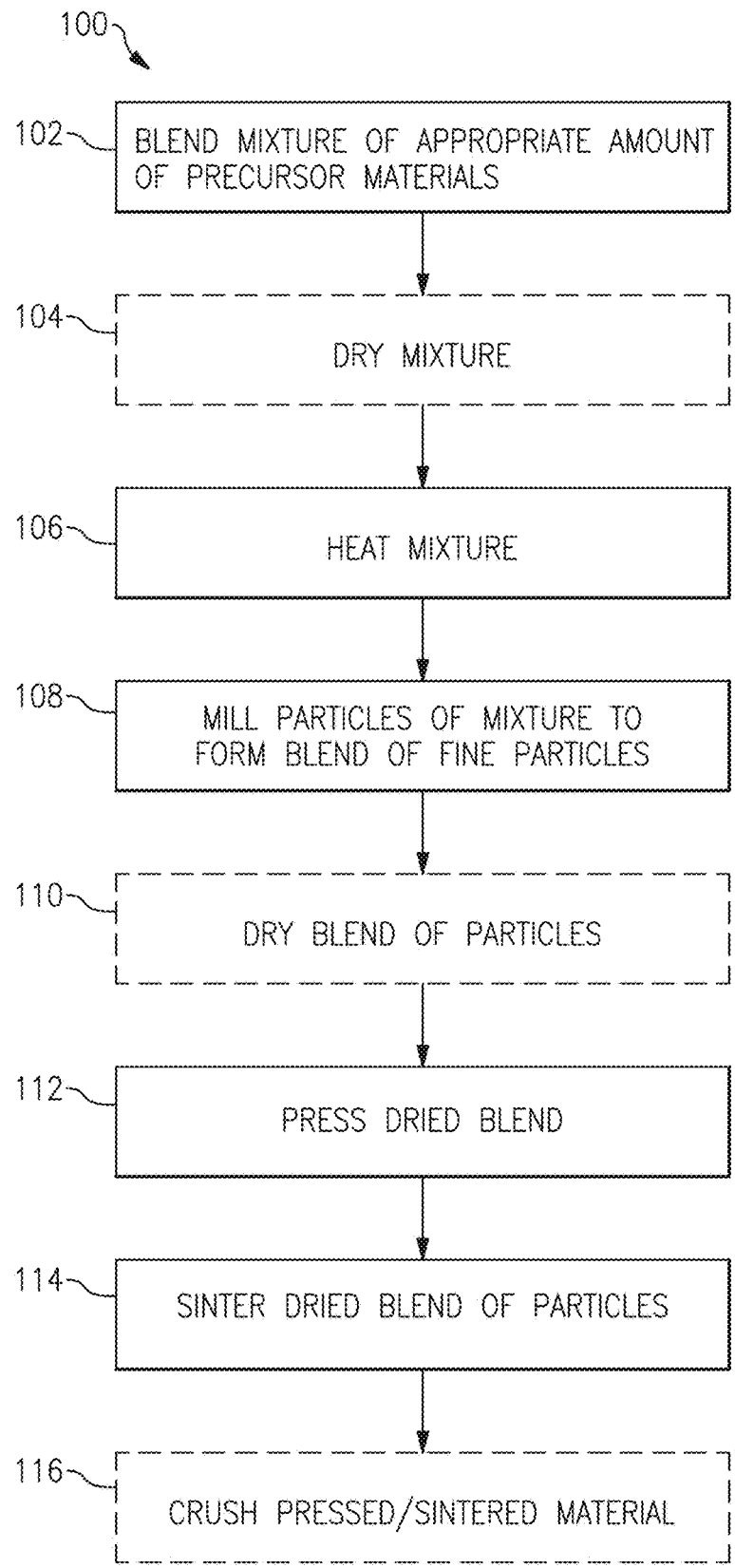
FIG. 18 is a flow chart illustrating an embodiment of a method of forming a composite hexagonal ferrite material.

FIG. 18 illustrates a method 100 of forming a Sr—$Co_2Y$ material according to a preferred embodiment. As shown in FIG. 18, appropriate amounts of precursor materials—reactants that may provide strontium, cobalt, iron, one or more alkali metals, scandium, indium, aluminum, silica, manganese and oxygen that can form the magnetic material—are mixed together in Step 102. In some aspects, at least a portion of the oxygen may be provided in the form of an oxygen-containing compound of strontium (Sr), cobalt (Co), iron (Fe), or one or more alkali metals. For example, these elements may be provided in carbonate or oxide forms, or in other oxygen-containing precursor forms known in the art. In one or more aspects, one or more precursor materials may be provided in a non-oxygen-containing compound, or in a pure elemental form. In other aspects, oxygen could be supplied from a separate compound, such as, for example, $H_2O_2$ or from gaseous oxygen or air. For example, in one embodiment, $SrCO_3$, $Co_3O_4$, $NaHCO_3$, $Sc_2O_3$ and $Fe_2O_3$ precursors are mixed in a ratio appropriate for the formation of the Y phase material. These precursor compounds may be mixed or blended in water or alcohol using, for example, a Cowles mixer, a ball mill, or a vibratory mill. These precursors may also be blended in a dry form.

The blended mixture may then be dried if necessary in Step 104. The mixture may be dried in any of a number of ways, including, for example, pan drying or spray drying. The dried mixture may then be heated in Step 106 at a temperature and for a period of time to promote calcination. For example, the temperature in the heating system used in heating Step 106 may increase at a rate of between about 20° C. per hour and about 200° C. per hour to achieve a soak temperature of about 1000° C.-1300° C., or about 1100° C. to 1250° C., which may be maintained for about two hours to about twelve hours. The heating system may be, for example, an oven or a kiln. The mixture may experience a loss of moisture, and/or reduction or oxidation of one or more components, and/or the decomposition of carbonates and/or organic compounds which may be present. At least a portion of the mixture may form a hexaferrite solid solution.

The temperature ramp rate, the soak temperature, and the time for which the mixture is heated may be chosen depending on the requirements for a particular application. For example, if small crystal grains are desired in the material after heating, a faster temperature ramp, and/or lower soak temperature, and/or shorter heating time may be selected as opposed to an application where larger crystal grains are desired. In addition, the use of different amounts and/or forms of precursor materials may result in different requirements for parameters such as temperature ramp rate and soaking temperature and/or time to provide desired characteristics to the post-heated mixture.

After heating, the mixture, which may have formed agglomerated particles of hexaferrite solid solution, may be cooled to room temperature, or to any other temperature that would facilitate further processing. The cooling rate of the heating system may be, for example, 80° C. per hour. In step 108, the agglomerated particles may be milled. Milling may take place in water, in alcohol, in a ball mill, a vibratory mill, or other milling apparatus. In some embodiments, the milling is continued until the median particle diameter of the resulting powdered material is from about one to about four microns, although other particle sizes, for example, from about one to about ten microns in diameter, may be acceptable in some applications. In a preferred embodiment, high energy milling is used to mill the particles to a fine particle size of 0.2 to 0.9 microns in diameter. This particle size may be measured using, for example, a sedigraph or a laser scattering technique. A target median particle size may be selected to provide sufficient surface area of the particles to facilitate sintering in a later step. Particles with a smaller median diameter may be more reactive and more easily sintered than larger particles. In some methods, one or more alkali metals or alkali metal precursors or other dopant materials may be added at this point rather than, or in addition to, in step 102.

The powdered material may be dried if necessary in step 110 and the dried powder may be pressed into a desired shape using, for example, a uniaxial press or an isostatic press in step 112. The pressure used to press the material may be, for example, up to 80,000 N/m, and is typically in the range of from about 20,000 N/m to about 60,000 $N/m^2$. A higher pressing pressure may result in a more dense material subsequent to further heating than a lower pressing pressure.

In step 114, the pressed powdered material may be sintered to form a solid mass of doped hexaferrite. The solid mass of doped hexaferrite may be sintered in a mold having the shape of a component desired to be formed from the doped hexaferrite. Sintering of the doped hexaferrite may be performed at a suitable or desired temperature and for a time period sufficient to provide one or more desired characteristics, such as, but not limited to, crystal grain size, level of impurities, compressibility, tensile strength, porosity, and in some cases, magnetic permeability. Preferably, the sintering conditions promote one or more desired material characteristics without affecting, or at least with acceptable changes to other undesirable properties. For example, the sintering conditions may promote formation of the sintered doped hexaferrite with little or minimal iron reduction. In one embodiment, the temperature used in the sintering step 114 is preferably between 1100° C. to 1250° C. According to some embodiments, the temperature in the heating system used in the sintering step 114 may be increased at a rate of between about 20° C. per hour and about 200° C. per hour to achieve a soak temperature of about 1000° C.-1450° C. or about 1100° C. to 1150° C. or about 1100° C.-1250° C. which may be maintained for about two hours to about twelve hours. The heating system may be, for example, an oven or a kiln. A slower ramp, and/or higher soak temperature, and/or longer sintering time may result in a more dense sintered material than might be achieved using a faster temperature ramp, and/or lower soak temperature, and/or shorter heating time. Increasing the density of the final sintered material by making adjustments, for example, to the sintering process can be performed to provide a material with a desired magnetic permeability, saturation magnetization, and/or magnetostriction coefficient. According to some embodiments of methods according to the present disclosure, the density range of the sintered hexaferrite may be between about 4.50 $g/cm^3$ and about 5.36 $g/cm^3$. A desired magnetic permeability of the doped hexaferrite may also be achieved by tailoring the heat treatment of the material to produce grains with desired sizes. The hexaferrite may also be crush pressed and further sintered in step 116 to form a final hexaferrite product.

The grain size of material produced by embodiments of the above method may vary from between about five micrometers and one millimeter in diameter depending upon the processing conditions, with even larger grain sizes possible in some aspects of methods according to the present disclosure. In some aspects, each crystal of the material may comprise a single magnetic domain. Both doped Sr—$Co_2$Y and chemically substituted (for example, Na and Sc) Sr—$Co_2$Y may be members of the planar hexaferrite family called ferroxplana, having a Y-type ferrite crystal structure.

Figure 19:
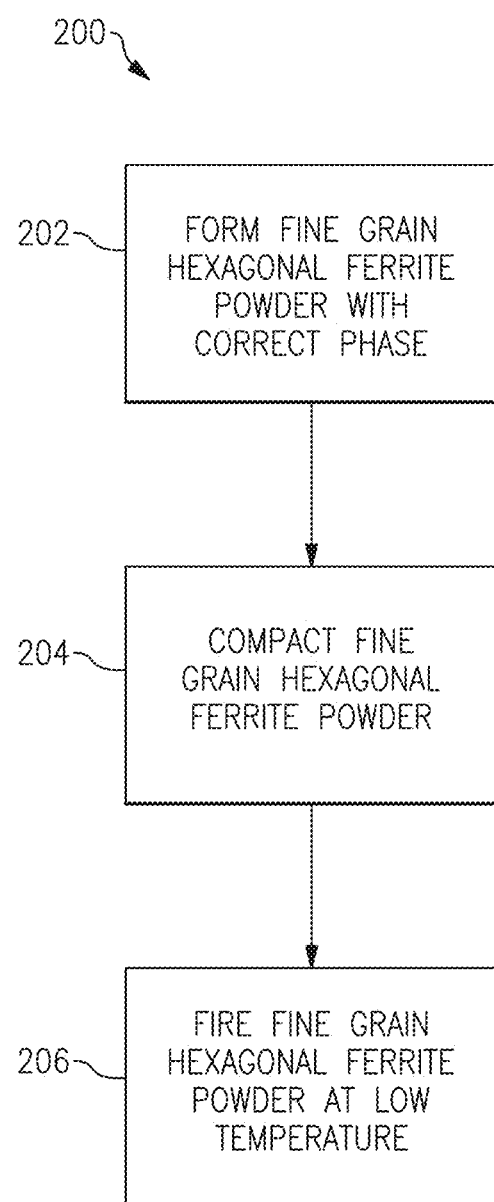
FIG. 19 is a flow chart illustrating an embodiment of a method of forming a composite hexagonal ferrite material.

FIG. 19 illustrates a method 200 of forming textured Sr—$Co_2$Y according to another embodiment adapted to reduce the magnetorestriction and improve the resonant frequency of the material. The method 200 begins with step 202 in which a fine grain hexagonal ferrite powder is formed. In one implementation, the fine grain hexagonal ferrite powder is a strontium cobalt ferrite Y-phase powder. This powder can be synthesized using a chemical process known in the art such as co-precipitation. The Sr—$Co_2$Y can also be synthesized via sol-gel, calcining, and mechanical milling using a Netzsch zeta-mill or the like. In one embodiment, the Sr—$Co_2$Y powder has particle sizes of less than about 1 micron and surface areas of greater than about 6 $m^2/g$. In another embodiment, the Sr—$Co_2$Y powder has an average particle size of less than about 1 micron and an average surface area of greater than about 6 $m^2/g$.

As FIG. 19 further shows, the method 200 further comprises step 204 in which the hexagonal ferrite powder is compacted by a known process such as cold isostatic pressing, uniaxial pressing, extrusion, or the like. As also shown in FIG. 19, the hexagonal powder is subsequently fired at step 206 at a temperature between about 1100° C. to 1250° C., which is lower than the standard, conventional sintering temperature for the same material. The resulting material is preferably a fine grained hexagonal ferrite material.

Application of the Material

Figure 20:
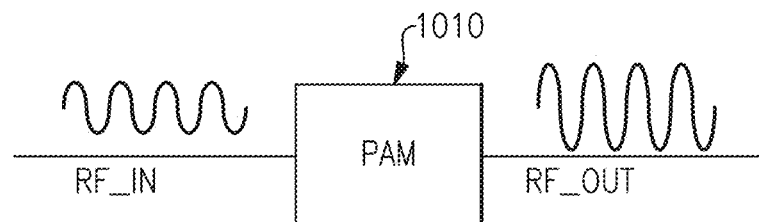
FIG. 20 illustrates an embodiment of a power amplifier module which can use embodiments of the disclosed material.
Figure 21:
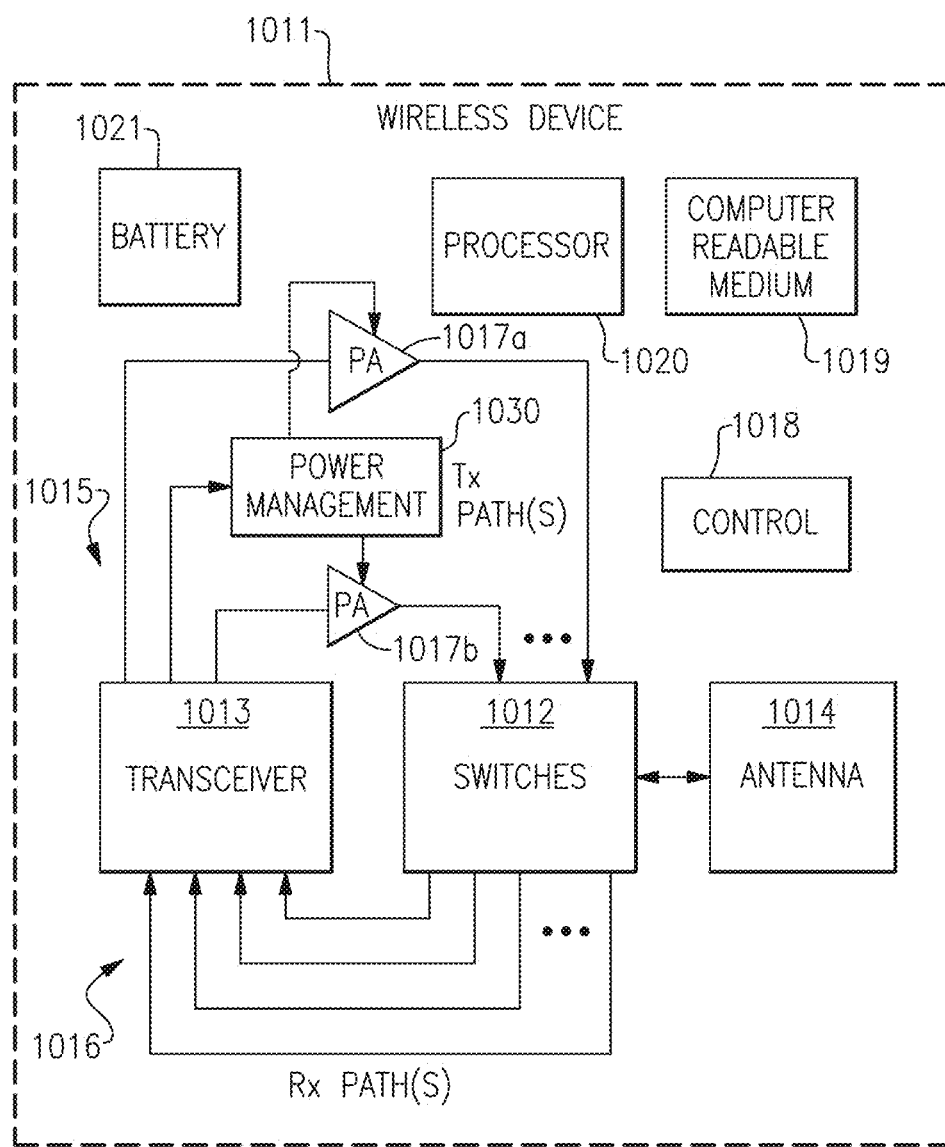
FIG. 21 illustrates an embodiment of a wireless device which can use embodiments of the disclosed material.

FIGS. 20 and 21 respectively illustrate a power amplifier module 1010 and wireless device 1011 which can include one or more radio frequency devices implemented using any of the methods, materials, and devices of the present disclosure. For instance, the power amplifier module 1010 and the wireless device 1011 can include one or more antennas, transformers, inductors, circulators, absorbers, or other RF devices or other devices implemented according to the present disclosure, including devices incorporating an embodiment of the disclosed composite ceramic.

FIG. 20 is a schematic diagram of a power amplifier module (PAM) 1010 for amplifying a radio frequency (RF) signal. The illustrated power amplifier module 1010 amplifies an RF signal (RF_IN) to generate an amplified RF signal (RF_OUT).

FIG. 21 is a schematic block diagram of an example wireless or mobile device 1011. The example wireless device 1011 depicted in FIG. 21 can represent a multi-band and/or multi-mode device such as a multi-band/multi-mode mobile phone. By way of examples, Global System for Mobile (GSM) communication standard is a mode of digital cellular communication that is utilized in many parts of the world. GSM mode mobile phones can operate at one or more of four frequency bands: 850 MHz (approximately 824-849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain W-CDMA and Long Term Evolution (LTE) devices can operate over, for example, 22 or more radio frequency spectrum bands.

One or more features of the present disclosure can be implemented in the foregoing example modes and/or bands, and in other communication standards. For example, 802.11, 2G, 3G, 4G, LTE, and Advanced LTE are non-limiting examples of such standards. To increase data rates, the wireless device 1011 can operate using complex modulated signals, such as 64 QAM signals.

In certain embodiments, the wireless device 1011 can include switches 1012, a transceiver 1013, an antenna 1014, power amplifiers 1017a, 1017b, a control component 1018, a computer readable medium 1019, a processor 1020, a battery 1021, and a power management system 1030, any of which can include embodiments of the disclosed material.

The transceiver 1013 can generate RF signals for transmission via the antenna 1014. Furthermore, the transceiver 1013 can receive incoming RF signals from the antenna 1014.

It will be understood that various functionalities associated with the transmission and receiving of RF signals can be achieved by one or more components that are collectively represented in FIG. 21 as the transceiver 1013. For example, a single component can be configured to provide both transmitting and receiving functionalities. In another example, transmitting and receiving functionalities can be provided by separate components.

Similarly, it will be understood that various antenna functionalities associated with the transmission and receiving of RF signals can be achieved by one or more components that are collectively represented in FIG. 21 as the antenna 1014. For example, a single antenna can be configured to provide both transmitting and receiving functionalities. In another example, transmitting and receiving functionalities can be provided by separate antennas. In yet another example, different bands associated with the wireless device 1011 can operate using different antennas.

In FIG. 21, one or more output signals from the transceiver 1013 are depicted as being provided to the antenna 1014 via one or more transmission paths 1015. In the example shown, different transmission paths 1015 can represent output paths associated with different bands and/or different power outputs. For instance, the two example power amplifiers 1017a, 1017b shown can represent amplifications associated with different power output configurations (e.g., low power output and high power output), and/or amplifications associated with different bands. Although FIG. 21 illustrates a configuration using two transmission paths 1015 and two power amplifiers 1017a, 1017b, the wireless device 1011 can be adapted to include more or fewer transmission paths 1015 and/or more or fewer power amplifiers.

In FIG. 21, one or more detected signals from the antenna 1014 are depicted as being provided to the transceiver 1013 via one or more receiving paths 1016. In the example shown, different receiving paths 1016 can represent paths associated with different bands. For example, the four example receiving paths 1016 shown can represent quad-band capability that some wireless devices are provided with. Although FIG. 21 illustrates a configuration using four receiving paths 1016, the wireless device 1011 can be adapted to include more or fewer receiving paths 1016.

To facilitate switching between receive and transmit paths, the switches 1012 can be configured to electrically connect the antenna 1014 to a selected transmit or receive path. Thus, the switches 1012 can provide a number of switching functionalities associated with operation of the wireless device 1011. In certain embodiments, the switches 1012 can include a number of switches configured to provide functionalities associated with, for example, switching between different bands, switching between different power modes, switching between transmission and receiving modes, or some combination thereof. The switches 1012 can also be configured to provide additional functionality, including filtering and/or duplexing of signals.

FIG. 21 shows that in certain embodiments, a control component 1018 can be provided for controlling various control functionalities associated with operations of the switches 1012, the power amplifiers 1017a, 1017b, the power management system 1030, and/or other operating components.

In certain embodiments, a processor 1020 can be configured to facilitate implementation of various processes described herein. The processor 1020 can implement various computer program instructions. The processor 1020 can be a general purpose computer, special purpose computer, or other programmable data processing apparatus.

In certain embodiments, these computer program instructions may also be stored in a computer-readable memory 1019 that can direct the processor 1020 to operate in a particular manner, such that the instructions stored in the computer-readable memory 1019.

The illustrated wireless device 1011 also includes the power management system 1030, which can be used to provide power amplifier supply voltages to one or more of the power amplifiers 1017a, 1017b. For example, the power management system 1030 can be configured to change the supply voltages provided to the power amplifiers 1017a, 1017b to improve efficiency, such as power added efficiency (PAE). The power management system 1030 can be used to provide average power tracking (APT) and/or envelope tracking (ET). Furthermore, as will be described in detail further below, the power management system 1030 can include one or more low dropout (LDO) regulators used to generate power amplifier supply voltages for one or more stages of the power amplifiers 1017a, 1017b. In the illustrated implementation, the power management system 1030 is controlled using a power control signal generated by the transceiver 1013. In certain configurations, the power control signal is provided by the transceiver 1013 to the power management system 1030 over an interface, such as a serial peripheral interface (SPI) or Mobile Industry Processor Interface (MIPI).

In certain configurations, the wireless device 1011 may operate using carrier aggregation. Carrier aggregation can be used for both Frequency Division Duplexing (FDD) and Time Division Duplexing (TDD), and may be used to aggregate a plurality of carriers or channels, for instance up to five carriers. Carrier aggregation includes contiguous aggregation, in which contiguous carriers within the same operating frequency band are aggregated. Carrier aggregation can also be non-contiguous, and can include carriers separated in frequency within a common band or in different bands.

From the foregoing description, it will be appreciated that an inventive hexagonal ferrites and manufacturing methods are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A composite hexagonal ferrite material, the material comprising:
    a base y-phase hexagonal ferrite composition; and
    a doped-in z phase hexagonal ferrite material having a formula $Sr_{3-x-y}Ba_xNa_yCo_{2-y}Sc_yFe_{24}O_{41}$, $0<x<3$, $0<y<1.5$, forming a composite hexagonal ferrite material having a Q value of greater than 15 at 1 GHz.

2. The composite hexagonal ferrite material of claim 1 wherein the composite hexagonal ferrite material includes two phases.

3. The composite hexagonal ferrite material of claim 1 wherein the composite hexagonal ferrite material has a Q value of greater than 20 at 1 GHz.

4. The composite hexagonal ferrite material of claim 1 wherein the composite hexagonal ferrite material has a real permeability of between 3 and 7 at 1 GHz.

5. The composite hexagonal ferrite material of claim 1 wherein the composite hexagonal ferrite material has a real permeability of greater than 6 at 1 GHz.

6. The composite hexagonal ferrite material of claim 1 wherein the composite hexagonal ferrite material has an imaginary permeability of less than 1 at 1 GHz.

7. The composite hexagonal ferrite material of claim 1 wherein the composite hexagonal ferrite material has a quality factor of greater than 15 at 1 GHz.

8. The composite hexagonal ferrite material of claim 1 wherein the y-phase hexagonal ferrite composition includes $Sr_{1.6}Na_{0.4}Sc_{0.4}Co_{1.6}Fe_{12}O_{22}$.

9. A method of forming a composite hexagonal ferrite material, the method comprising combining a y-phase hexagonal composition at least partially with a z phase hexagonal ferrite material having a formula $Sr_{3-x-y}Ba_xNa_yCo_{2-y}Sc_yFe_{24}O_{41}$, $0<x<3$, $0<y<1.5$, thereby forming a composite hexagonal ferrite material having a Q value of greater than 15 at 1 GHz.

10. The method of claim 9 further including doping the composite hexagonal ferrite material with indium or zirconium to reduce strontium.

11. The method of claim 9 wherein the composite hexagonal ferrite material has a Q value of greater than about 20 at 1 GHz.

12. The method of claim 9 wherein the composite hexagonal ferrite material has a real permeability of between 3 and 7 at 1 GHz.

13. The method of claim 9 wherein the y-phase hexagonal ferrite composition includes $Sr_{1.6}Na_{0.4}Sc_{0.4}Co_{1.6}Fe_{12}O_{22}$.

14. An antenna formed from a composite hexagonal ferrite material, the antenna comprising:
    a base y-phase hexagonal ferrite composition; and
    a doped-in z phase hexagonal ferrite material having a formula $Sr_{3-x-y}Ba_xNa_yCo_{2-y}Sc_yFe_{24}O_{41}$, $0<x<3$, $0<y<1.5$, forming a composite hexagonal ferrite material having a Q value of greater than 15 at 1 GHz.

15. The antenna of claim 14 wherein the antenna is part of a wireless device.

16. The antenna of claim 14 wherein the antenna is part of a tablet.

17. The antenna of claim 14 wherein the antenna is usable at frequencies of 1 GHz and above.

18. The antenna of claim 14 wherein the composite hexagonal ferrite material has a Q value of greater than about 20 at 1 GHz.

19. The antenna of claim 14 wherein the composite hexagonal ferrite material has a real permeability of between 3 and 7 at 1 GHz.

20. The antenna of claim 14 wherein the y-phase hexagonal ferrite composition includes $Sr_{1.6}Na_{0.4}Sc_{0.4}Co_{1.6}Fe_{12}O_{22}$.

* * * * *